(12) United States Patent
Yuki et al.

(10) Patent No.: US 9,778,411 B2
(45) Date of Patent: Oct. 3, 2017

(54) LIGHTING DEVICE AND DISPLAY DEVICE

(71) Applicant: Sharp Kabushiki Kaisha, Sakai, Osaka (JP)

(72) Inventors: Ryuzo Yuki, Sakai (JP); Takeshi Ishida, Sakai (JP); Mitsuhiro Murata, Sakai (JP); Hirotoshi Yasunaga, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/306,800

(22) PCT Filed: May 15, 2015

(86) PCT No.: PCT/JP2015/063998
§ 371 (c)(1),
(2) Date: Oct. 26, 2016

(87) PCT Pub. No.: WO2015/178299
PCT Pub. Date: Nov. 26, 2015

(65) Prior Publication Data
US 2017/0059771 A1 Mar. 2, 2017

(30) Foreign Application Priority Data
May 23, 2014 (JP) .................. 2014-107349

(51) Int. Cl.
*G02F 1/1339* (2006.01)
*F21V 8/00* (2006.01)
(Continued)

(52) U.S. Cl.
CPC ............ *G02B 6/0088* (2013.01); *B60K 35/00* (2013.01); *B60K 37/02* (2013.01); *G02F 1/1339* (2013.01);
(Continued)

(58) Field of Classification Search
CPC ............ G02F 1/1339; G02F 1/133615; G02F 1/133308; G02F 2001/133322; B60K 37/02; B60K 35/00
See application file for complete search history.

(56) References Cited

U.S. PATENT DOCUMENTS

2005/0243238 A1* 11/2005 Cha ...................... G02B 6/0088
349/58
2009/0051636 A1 2/2009 Natori
(Continued)

FOREIGN PATENT DOCUMENTS

| JP | 6-76936 U | 10/1994 |
|---|---|---|
| JP | 09-90361 A | 4/1997 |
| JP | 2009-047902 A | 3/2009 |

OTHER PUBLICATIONS

Official Communication issued in International Patent Application No. PCT/JP2015/063998, dated Aug. 11, 2015.

*Primary Examiner* — James Dudek
(74) *Attorney, Agent, or Firm* — Keating & Bennett, LLP

(57) ABSTRACT

A backlight device 12 includes LEDs 17, an optical member 16 that applies optical effects to light from the LEDs 17 and has a through hole 23 that is through a thickness thereof, and a restricting member 26 having a communication hole 27 that is communicated with the through hole 23. The restricting member 26 is inserted in the through hole 23 to be in contact with an inner surface of the through hole 23 to restrict movement of the optical member 16 along a plate surface of the optical member 16.

13 Claims, 48 Drawing Sheets

(51) Int. Cl.
*B60K 35/00* (2006.01)
*B60K 37/02* (2006.01)
*G02F 1/1335* (2006.01)
*G02F 1/1333* (2006.01)

(52) U.S. Cl.
CPC .. *G02F 1/133615* (2013.01); *B60K 2350/106* (2013.01); *B60K 2350/203* (2013.01); *G02B 6/005* (2013.01); *G02F 2001/133322* (2013.01); *G02F 2201/46* (2013.01); *G02F 2201/54* (2013.01)

(56) References Cited

U.S. PATENT DOCUMENTS

| | | | |
|---|---|---|---|
| 2012/0170311 A1* | 7/2012 | Huang | G02B 6/0088 362/611 |
| 2013/0258717 A1* | 10/2013 | Hur | G02B 6/0011 362/613 |
| 2017/0153485 A1* | 6/2017 | Kim | G02F 1/133308 |
| 2017/0153486 A1* | 6/2017 | Ahn | G02F 1/133308 |
| 2017/0153487 A1* | 6/2017 | Kim | G02F 1/133308 |

* cited by examiner

FIG.39
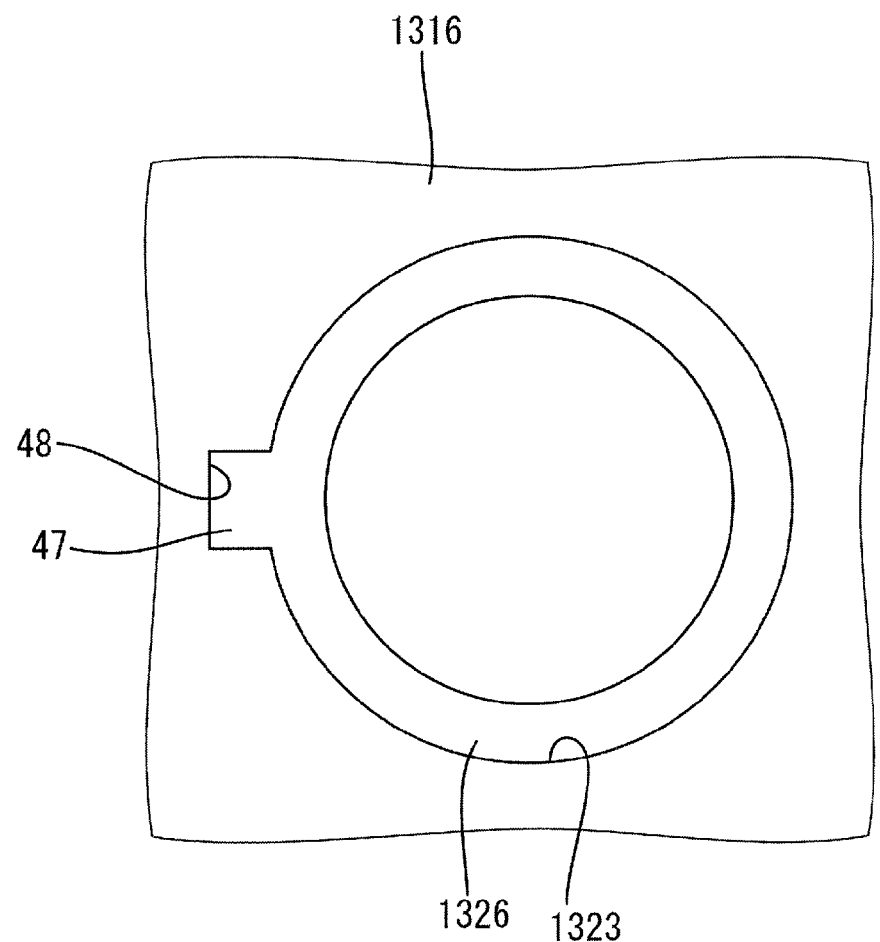
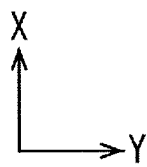

LIGHTING DEVICE AND DISPLAY DEVICE

TECHNICAL FIELD

The present invention relates to a lighting device and a display device.

BACKGROUND ART

There has been a liquid crystal display device including a liquid crystal panel that does not emit light by itself as a display panel and such a liquid crystal display device is disclosed in Patent Document 1. Patent Document 1 describes that a liquid crystal panel includes a window part in apart of a display area and the window part is a non-display area and a rear surface side can be seen through the window part. In such a configuration, traces that are disconnected by the window part are electrically connected with connection traces.

RELATED ART DOCUMENT

Patent Document

Patent Document 1: Japanese Unexamined Patent Application Publication No. 2009-47902

Problem to be Solved by the Invention

Patent Document 1 describes that the liquid crystal panel includes the window part, which is a non-display area, in a part of the display area. However, Patent Document 1 does not disclose a backlight device that supplies light to the liquid crystal panel that does not emit light by itself for displaying. A backlight device that is preferable to be used in such a liquid crystal panel, and particularly, a backlight device that is less likely to cause unevenness in brightness has been demanded.

DISCLOSURE OF THE PRESENT INVENTION

The technology disclosed herein was made in view of the above circumstances. An object is to restrain occurrence of unevenness in brightness.

Means for Solving the Problem

A lighting device according to the present technology includes a light source, an optical member that is a sheet and applies optical effects to light from the light source and has a through hole being through a thickness thereof, and a restricting member having a communication hole that is communicated with the through hole, the restricting member being inserted in the through hole to be in contact with an inner surface of the through hole to restrict movement of the optical member along a plate surface of the optical member.

According to such a configuration, light emitted by the light source exits outside while the optical member having a sheet-like shape adding a specific optical property to the light. The optical member has a through hole that is through the thickness direction thereof. With such a configuration, an object arranged on an opposite side to the light exit side with respect to the lighting device can be seen clearly through the through hole from the light exit side with respect to the lighting device. Warping or wrinkles may be likely to be caused and rubbing may be likely to be caused in the vicinity of the through hole that is through the thickness direction on the optical member when the optical member thermally expands or shrinks. The restricting member that is inserted through the through hole of the optical member and in contact with the inner surface of the through hole restricts movement of the optical member along the plate surface thereof. With such a configuration, warping or wrinkles is less likely to be caused and rubbing is less likely to be caused in the vicinity of the through hole on the optical member even if the optical member thermally expands or shrinks. Thus, unevenness in brightness of exit light is less likely to be caused in the vicinity of the through hole on the optical member. The restricting member has the communication hole that is communicated with the through hole and therefore, the original function of the through hole is maintained even with inserting the restricting member through the through hole.

The lighting device of the present technology may include following configurations.

(1) The optical member may include an optical member-side recessed portion or an optical member-side projection portion, and the optical member-side recessed portion may be recessed from a part of an inner peripheral surface of the through hole with respect to a circumferential direction, and the optical member-side projection portion may be projected from a part of the inner peripheral surface of the through hole with respect to the circumferential direction. The restricting member may include a restricting member-side projection portion or a restricting member-side recessed portion, and the restricting member-side projection portion may be projected from a part of an outer peripheral surface of the restricting member with respect to a circumferential direction and fit in the optical member-side recessed portion, and the restricting member-side recessed portion may be recessed from a part of the outer peripheral surface with respect to the circumferential direction and receives the optical member-side projection portion. According to such a configuration, when the restricting member is inserted in the through hole of the optical member, the optical member-side projection portion that projects from a part of the inner peripheral surface of the through hole with respect to the circumferential direction is fit in the restricting member-side recessed portion that is recessed from a part of the outer peripheral surface of the restricting member with respect to the circumferential direction, or the restricting member-side projection portion that projects from a part of the outer peripheral surface of the restricting member with respect to the circumferential direction is fit in the optical member-side recessed portion that is recessed from a part of the inner peripheral surface of the through hole. Accordingly, the optical member is not rotated with respect to the restricting member and is positioned with respect to the circumferential direction of the through hole.

(2) The optical member may include the optical member-side projection portion and the restricting member may include the restricting member-side recessed portion that is open to be communicated with the communication hole. According to such a configuration, the restricting member-side recessed portion receiving the optical member-side projection portion is recessed from a part of the outer peripheral surface of the restricting member with respect to the circumferential direction and is open to the communication hole. Therefore, the restricting member is easily manufactured compared to a configuration that the restricting member-side recessed portion is not open to the communication hole.

(3) The optical member may include the optical member-side projection portion and the restricting member may include the restricting member-side recessed portion that is recessed from a part of the outer peripheral surface with respect to a circumferential direction without being open to the communication hole and having a thin portion in the restricting member. According to such a configuration, the restricting member including the restricting member-side recessed portion has the thin portion and therefore, the through hole of the optical member is surrounded by the restricting member over an entire periphery. Thus, light is less likely to leak through the inner surface of the through hole to outside.

(4) The optical member may include a light guide plate having a light entrance surface through which light from the light source enters the light guide plate, and a light exit surface through which the light exits the light guide plate, and an optical sheet arranged on the light guide plate to be layered on the light exit surface. The optical member-side recessed portion or the optical member-side projection portion may be selectively included on the inner peripheral surface of the through hole in the optical sheet so as not to be included on the inner peripheral surface of the through hole of the light guide plate, and the restricting member-side projection portion or the restricting member-side recessed portion may be selectively included on a part of the outer peripheral surface of the restricting member opposite the inner peripheral surface of the through hole of the optical sheet. According to such a configuration, the optical sheet is not rotated. The light guide plate has no optical member-side recessed portion or optical member-side projection portion on the inner peripheral surface of the through hole of the light guide plate. Therefore, the shape of the through hole in the light guide plate is simplified. The light guide plate generally has a thickness dimension greater than that of the optical sheet. Therefore, it is difficult to form the through hole in the light guide plate with punching and a manufacturing cost is likely to be increased to form the through hole having complicated shape. The shape of the through hole is simple in the present embodiment, and the manufacturing cost for the light guide plate can be reduced. The optical sheet generally has a thickness dimension smaller than that of the light guide plate. Therefore, the through hole can be easily formed in the optical sheet with punching at a low cost even if the through hole has a complicated shape.

(5) The restricting member may include the restricting member-side recessed portion and a positioning pin projecting from the restricting member-side recessed portion along a thickness of the optical member, and the optical member may include the optical member-side projection portion and a positioning hole that is through the optical member-side projection portion in a thickness direction thereof and the positioning pin may be inserted in the positioning hole. According to such a configuration, when the restricting member is inserted through the through hole, the optical member-side projection portion is fit in the restricting member-side recessed portion and the positioning pin is inserted in the positioning hole so that the optical member is doubly positioned.

(6) The optical member may include optical members that are layered on each other, and the optical member-side recessed portion or the optical member-side projection portion may be included in each of the optical members such that at least one of a number, a planar shape, and a planar arrangement thereof varies among the optical members. According to such a configuration, at least one of the number, the planar shape, and the planar arrangement of the optical member-side recessed portion or the optical member-side projection portion differs in every optical member and therefore, each of the optical members can be easily identified. Accordingly, the optical members are less likely to be layered in a wrong order in a process of manufacturing the lighting device.

(7) The optical member may include optical members layered on each other, and the optical members may include optical member-side recessed portions or optical member-side projection portions and the optical member-side recessed portions or the optical member-side projection portions included in the optical members may have a same planar arrangement. The restricting member-side projection portion or the restricting member-side recessed portion included in the restricting member may commonly receive the optical member-side recessed portions or the optical member-side projection portions having the same planar arrangement. According to such a configuration, the restricting member-side projection portion or the restricting member-side recessed portion includes one that commonly receives the optical member-side recessed portions or the optical member-side projection portions that are disposed on the same plane so that the configuration of the restricting member is less likely to be complicated. Therefore, the restricting member is easily manufactured.

(8) The optical member-side recessed portion or the optical member-side projection portion may include optical member-side recessed portions or optical member-side projection portions that are asymmetrically arranged with respect to an asymmetric line passing through a center of the through hole. According to such a configuration, if the optical member is mounted with being turned over with respect to the front and rear surfaces, the optical member-side recessed portion or the optical member-side projection portion may not be fit in the restricting member-side projection portion or the restricting member-side recessed portion. Therefore, the optical member is less likely to be mounted erroneously with being turned over with respect to the front and rear surfaces.

(9) The lighting device may further include a fixing member that fixes a hole edge portion around the through hole in the optical member with respect to the restricting member. According to such a configuration, the hole edge portion around the through hole of the optical member is fixed to the restricting member with the fixing member. Therefore, even if the optical member thermally expands or shrinks, warping or wrinkles is less likely to be caused near the through hole in the optical member and rubbing is further less likely to occur. Accordingly, unevenness in brightness is less likely to be caused in the exit light near the through hole in the optical member.

(10) The fixing member may be adhered to the hole edge portion around the through hole in the optical member and the restricting member, and the fixing member may have a surface that is adhered to the optical member and the restricting member and is a reflection surface that reflects light, and the fixing member may have a light blocking surface that is opposite to the reflection surface and blocks light. According to such a configuration, the fixing member is disposed between and adhered to the hole edge portion around the through hole in the optical member and the restricting member so that the hole edge portion around the through hole in the optical member is fixed with respect to the restricting member. Even if light leaks along the inner surface of the through hole in the optical member, the light reflects off the reflection surface of the fixing member adhered to the optical member and the restricting member to be directed back toward the optical member. Accordingly, the light use efficiency is improved. Further, a surface of the fixing member opposite to the reflection surface is the light blocking surface. Therefore, the hole edge portion around the through hole in the optical member 116 is less likely to be seen directly from the light exit side. Accordingly, unevenness in brightness is less likely to be caused in the exit light near the through hole in the optical member.

(11) The lighting device may further include a support member that supports the optical member from a side opposite to the light exit side. The support member may include the restricting member such that the communication hole is through the support member, and the fixing member may be a stopper portion included in the restricting member and stopped by a hole edge portion around the through hole in the optical member from a light exit side. According to such a configuration, the optical member is supported by the support member from the side opposite to the light exit side, and the stopper portion, which is the fixing member included in the restricting member of the chassis, is stopped by the hole edge portion around the through hole from the light exit side to fix the optical member. The number of parts is reduced and the number of mounting steps in manufacturing the lighting device is reduced compared to a configuration that the fixing member is provided separately from the restricting member. Thus, a manufacturing cost is reduced.

To solve the above problem, a display device of the present technology includes the above lighting device, and a display panel arranged on a light exit side with respect to the lighting device and displaying with using light from the lighting device.

According to the display device of the above configuration, unevenness in brightness is less likely to be caused in exiting light from the lighting device and display with excellent display quality is achieved.

The display device of the present technology may include following configurations.

(1) The display panel may have a panel-side through hole that is communicated with the through hole and through a thickness thereof. According to such a configuration, the display panel has the panel-side through hole that is through the thickness thereof, and the panel-side through hole is communicated with the through hole formed in the optical member. Therefore, the object that is arranged on an opposite side to the display panel side with respect to the lighting device can be seen through the panel-side through hole, the through hole, and the communication hole from the light exit side with respect to the display panel.

(2) The display panel may include a pair of substrates each having the panel-side through hole, liquid crystals sandwiched between the substrates, an outer peripheral side sealing member that surrounds the liquid crystals and is between outer peripheral edge portions of the respective substrates to seal the liquid crystals therebetween, and a through hole-side sealing member that surrounds the panel-side through hole and is between hole edge portions around the panel-side through hole to seal the liquid crystals therebetween. According to such a configuration, the liquid crystals that are held between the pair of substrates included in the display panel are sealed by the outer peripheral side sealing member that is between the outer peripheral end portions of the respective substrates. The liquid crystals are sealed by the through hole-side sealing member that is between the hole edge portions around the panel-side through hole in the substrates, although the substrates have the panel-side through hole.

(3) The display device may further include an outer peripheral side holding member that sandwiches and holds an outer peripheral edge portion of the display panel with the lighting device therebetween, and a through hole-side holding member that sandwiches and holds a hole edge portion around the panel-side through hole in the display panel with the lighting device therebetween. The through hole-side holding member may have a surface that has a light blocking property. According to such a configuration, the outer peripheral edge portion of the display panel is held between the lighting device and the outer peripheral side holding member and the hole edge portion around the panel-side through hole is held between the lighting device and the through hole-side holding member so that the display panel is held stably. Further, the through hole-side holding member has a light blocking property at least on the surface thereof and therefore, the hole edge portion around the panel-side through hole in the display panel is less likely to be directly seen from the light exit side. Accordingly, display error in displayed images is less likely to be caused in the vicinity of the panel-side through hole in the display panel.

Advantageous Effect of the Invention

According to the technology disclosed in this specification, unevenness in brightness is less likely to occur.

BRIEF DESCRIPTION OF THE DRAWINGS

FIG. 39 is a plan view illustrating a planar configuration of the through hole and the restricting member.

MODE FOR CARRYING OUT THE INVENTION

First Embodiment

A first embodiment of the present technology will be described with reference to FIGS. 1 to 5. In this embodiment, a liquid crystal display device (a display device) 10 including a liquid crystal panel 11 as a display panel will be described. X-axis, Y-axis and Z-axis may be indicated in some of the drawings. The axes in each drawing correspond to the respective axes in other drawings. An upper-lower direction is referred with reference to FIGS. 3 and 4, and an upper side is a front-surface side and a lower side is a rear-surface side in FIGS. 3 and 4.

Figure 1:
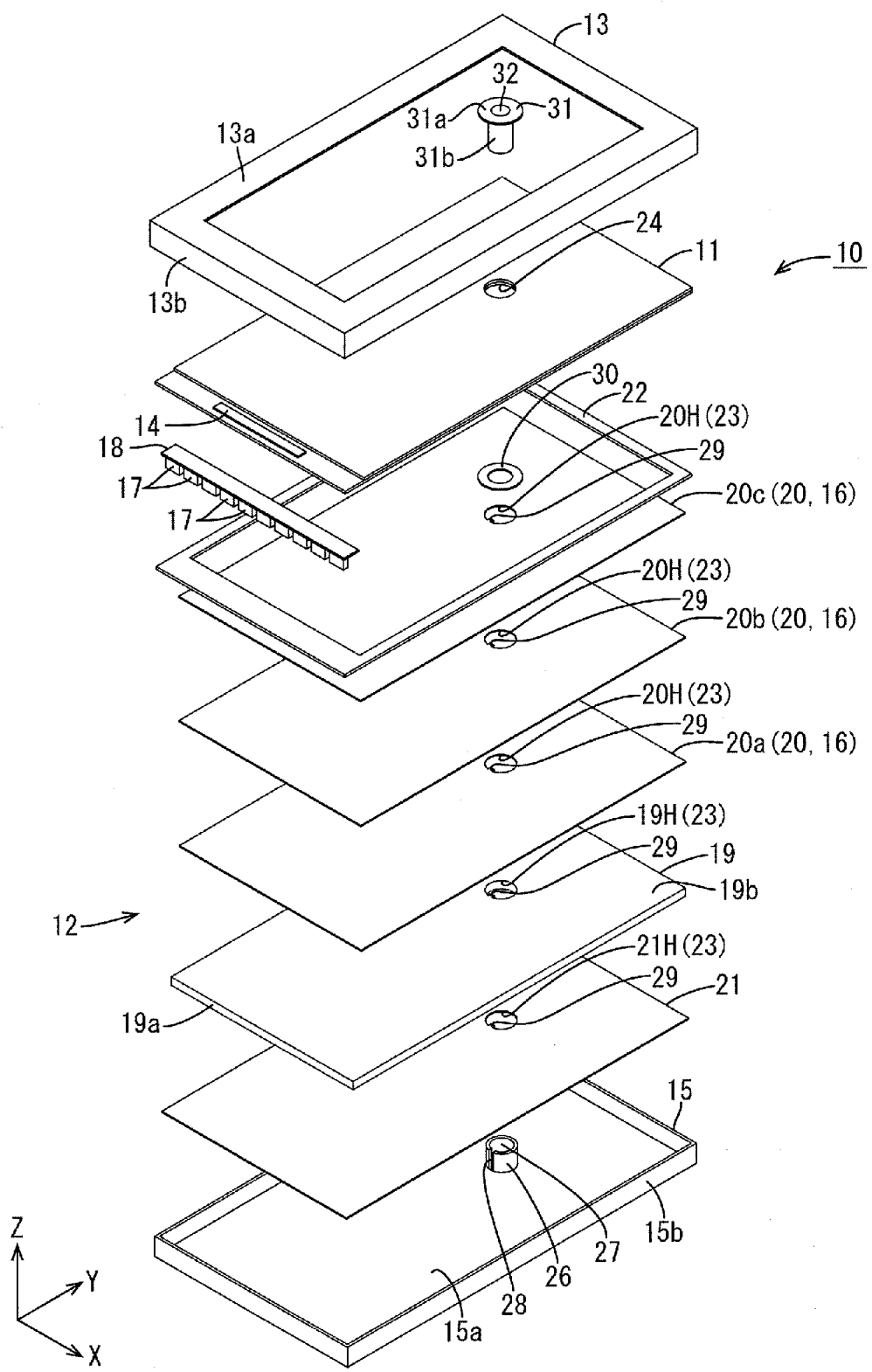
FIG. 1 is an exploded perspective view of a liquid crystal display device according to a first embodiment of the present technology.

As illustrated in FIG. 1, the liquid crystal display device 10 has a rectangular overall shape. The liquid crystal display device 10 includes a liquid crystal panel (a display panel) 11 for displaying images thereon, a backlight device (a lighting device) 12 on the rear-surface side with respect to the liquid crystal panel 11) for providing light toward the liquid crystal panel 11 for displaying, and a bezel (an outer periphery holding member) 13 for holding an outer peripheral edge portion of the liquid crystal panel 11 with the backlight device 12. The liquid crystal display device 10 of the present embodiment is mounted on a dashboard of a vehicle, for example, and is a part of an instrument panel and configured to display a part of a meter of the instrument panel, various warning images, map images of car navigation system, and images taken by an on-vehicle camera.

Figure 3:
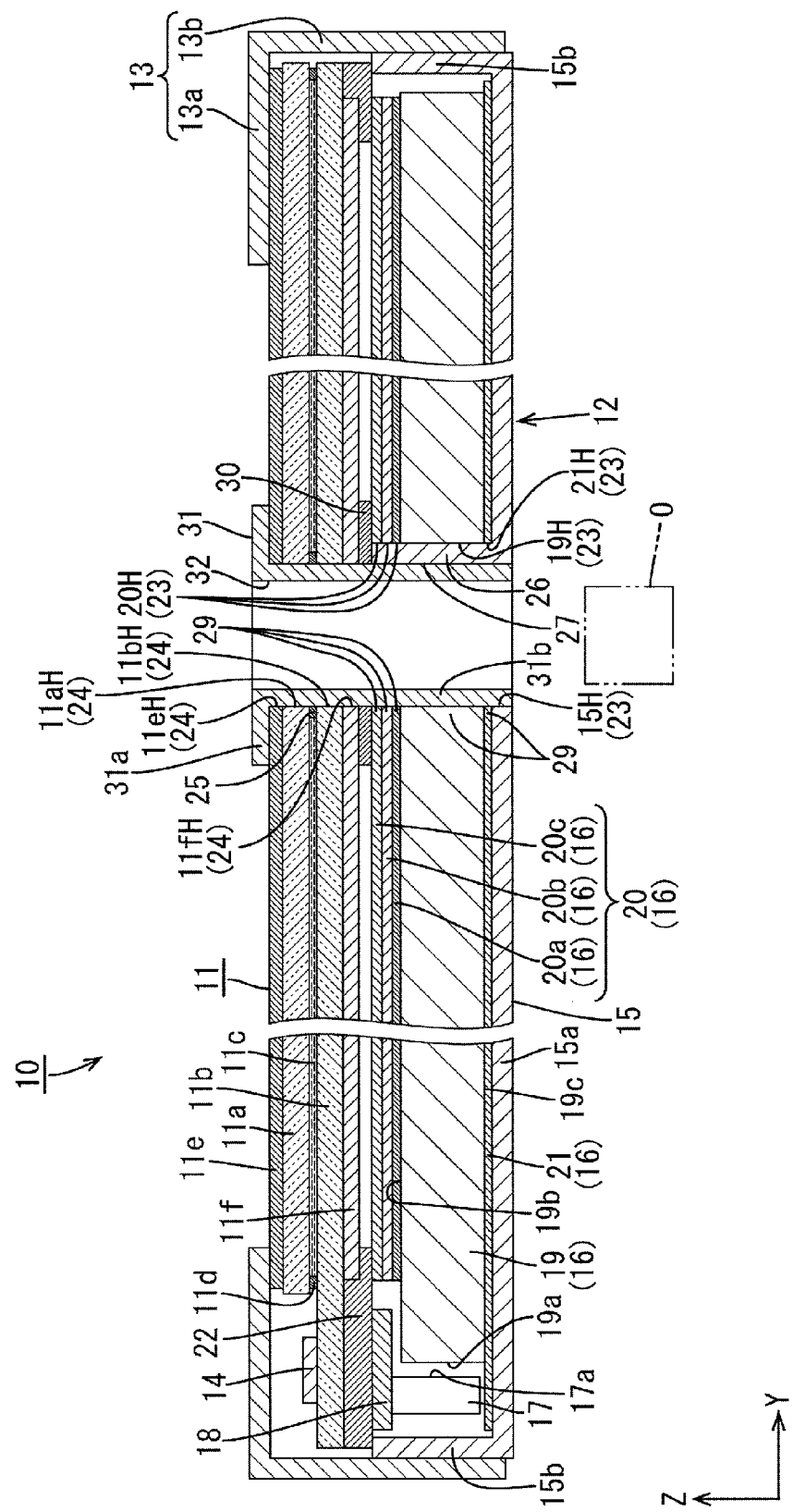
FIG. 3 is a cross-sectional view of the liquid crystal display device taken along line A-A in FIG. 2.

The liquid crystal panel 11 will be described. The liquid crystal panel 11 has a rectangular overall plan-view shape. As illustrated in FIGS. 1 and 3, the liquid crystal panel 11 at least includes a pair of transparent glass substrates 11a, 11b having light transmissivity, liquid crystals 11c in between the substrates 11a and 11b, and an outer peripheral side sealing member 11d. The liquid crystals 11c contain liquid crystal molecules, which are substances that change optical characteristics when electromagnetic field is applied. The outer peripheral side sealing member 11d surrounds the liquid crystals 11c and is arranged between outer peripheral end portions of the respective substrates 11a and 11b to seal the liquid crystals 11c therein. The liquid crystal panel 11 includes a display area (an active area) in a middle portion of a screen and images appear on the display area. The liquid crystal panel 11 further includes a non-display area (a non-active area) in an outer peripheral portion of the screen and has a frame shape surrounding the display area, and no images appears on the non-display area. The liquid crystal panel 11 displays images in the display area with using light supplied from the backlight device 12 and the front-surface side of the liquid crystal panel 11 is a light exit side. A long-side direction of the liquid crystal panel 11 corresponds with the Y-axis direction, a short-side direction corresponds with the X-axis direction, and a thickness direction corresponds with the Z-axis direction.

One of the substrates 11a, 11b included in the liquid crystal panel 11 on the front-surface side (a front side) is a CF substrate 11a and the other one of the substrates 11a, 11b on the rear-surface side (a rear side) is an array board 11b. As illustrated in FIGS. 1 and 3, a long dimension of the array board 11b is greater than that of the CF board 11a. One of short-side edges of each of the CF board 11a and the array board 11b is aligned with each other and another one of the short-side edges of the array board 11b extends outward from that of the CF board 11a. On an extended end portion on the other side, a driver (a panel driving portion) 14 for driving the liquid crystal panel 11 and a flexible board (not illustrated) from which various signals are supplied to the driver 14 are mounted on. The driver 14 is directly mounted on the extended end portion of the array board 11b with a chip-on-glass method (COG). The driver 14 processes the input signals supplied from a panel driving circuit board (not illustrated) via the flexible board and supplies the processed signals to the TFTs within the display area. Polarizing plates 11e, 11f are bonded to outer surfaces of the substrates 11a, 11b, respectively.

An inside configuration (not illustrated) of the liquid crystal panel 11 in the display area will be described. A large number of thin film transistors (TFTs) and a large number of pixel electrodes are arranged in a matrix on the inner surface of the array board 11b (a surface facing the liquid crystals 11c and the CF board 11a). The TFTs 17 are switching components. Gate lines and source lines are arranged in a matrix around the TFTs and the pixel electrodes. Signals relating images are supplied from the driver 14 to the gate lines and the source lines. The pixel electrode arranged in a square area surrounded by the gate lines and the source lines are transparent electrodes made of indium tin oxide (ITO) or zinc oxide (ZnO).

Multiple color filters are arranged on an inner surface of the CF board 11a corresponding with each pixel. The color filters of three colors of R, G, and B are arranged alternately. A light blocking layer (black matrix) for reducing mixing of the colors is formed between the respective color filters. Counter electrodes are provided on surfaces of the color filters and the light blocking layer to be opposite the respective pixel electrodes on the array board 11b side. The CF board 11a is smaller than the array board 11b. Alignment films (not illustrated) are formed on the respective inner surfaces of the boards 11a, 11b. The liquid crystal molecules included in the liquid crystals 11c are oriented by the alignment film.

Figure 4:
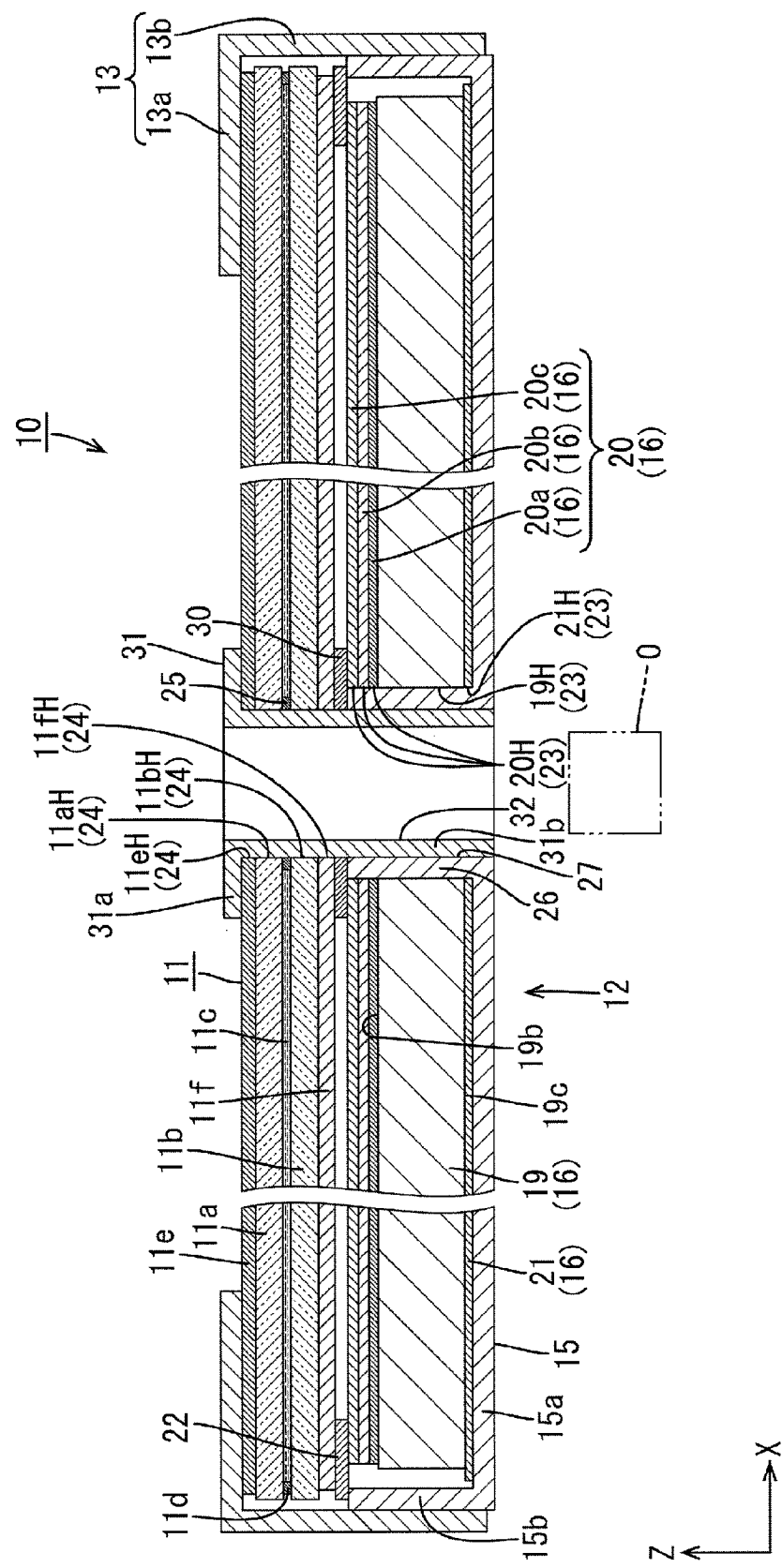
FIG. 4 is a cross-sectional view of the liquid crystal display device taken along line B-B in FIG. 2.

Next, prior to describing the backlight device 12, the bezel 13 will be described. The bezel 13 is made of metal material (such as aluminum) and has a rectangular overall frame shape as illustrated in FIG. 1. As illustrated in FIGS. 3 and 4, the bezel 13 includes a panel holding portion 13a and an outer wall portion 13b. The panel holding portion 13a presses an outer peripheral edge portion of the liquid crystal panel 11 over an entire periphery thereof from a front-surface side. The outer wall portion 13b projects from the outer peripheral edge portion of the panel holding portion 13a toward a rear-surface side and surrounds the backlight device 12 from an outer peripheral side thereof. The liquid crystal panel 11 is held between the bezel 13 and the backlight device 12 and fixed to the backlight device 12 with a panel fixing tape (a panel fixing member) 22 which will be described later. The panel fixing tape 22 is made of synthetic resin and is a rectangular frame base member formed along the outer peripheral edge portion of the liquid crystal panel 11 coated with an adhesive material thereon. The base member of the panel fixing tape 22 has a black surface having light blocking properties and accordingly, light leaking from the backlight device 12 is less likely to transmit through the non-display area of the liquid crystal panel 11.

Next, a configuration of the backlight device 12 will be described in detail. The backlight device 12 has a substantially overall rectangular block plan view shape similar to the liquid crystal panel 11. As illustrated in FIGS. 1 and 3, the backlight device 12 at least includes a chassis (a support member) 15, light emitting diodes (LEDs) 17 that are light source, an LED board (a light source board) 18 where the LEDs 17 are mounted, and an optical member 16. The chassis 15 has a substantially box shape opening toward the liquid crystal panel 11. The optical member 16 optically acts on the light from the LEDs 17 and the light exits the optical member 16 toward the liquid crystal panel 11. The optical member 16 at least includes a light guide plate (an optical member) 19, optical sheets (optical members) 20, and a reflection sheet (an optical member, a reflection member) 21. The light from the LEDs 17 travels within light guide plate 19. The optical sheets 20 are layered on the front-surface side of the light guide plate 19. The reflection sheet 21 is layered on the rear-surface side of the light guide plate 19. In the backlight device 12, the LEDs 17 (a LED board 18) are arranged on one of short-side edge portion of the backlight device 12 and the liquid crystal panel 11. Thus, the backlight device 12 is an edge light type (one edge surface light entrance type, a side light type) device where the light enters the light guide plate 19 through one side surface. In the backlight device 12, the optical member 16 adds a specific optical property to the light from the LEDs 17 and converts the light into planar light and directs the light toward the liquid crystal panel 11 on the front-surface side through the opening of the chassis 15. Namely, the front-surface side with respect to the backlight device 12 is a light exit side. Hereinafter, components of the backlight device 12 will be described.

The chassis 15 is made of metal material (such as aluminum) and has substantially a box shape opening toward the front-surface side as illustrated in FIGS. 1 and 3. The LED board 18 and the optical member 16 are arranged in the chassis 15. The chassis 15 includes a bottom plate portion 15a having a rectangular plan view shape similar to the liquid crystal panel 11 and side plate portions 15b each of which extends from each outer side edge (a pair of long sides and a pair of short sides) of the bottom plate portion 15a. The chassis 15 (the bottom plate portion 15a) has a long-side direction that corresponds with the Y-axis direction and a short-side direction that corresponds with the X-axis direction. The bottom plate portion 15a has a plate surface that is parallel to each plate surface of the liquid crystal panel 11 and the optical member 16. The bottom plate portion 15a supports the optical member 16 arranged in the chassis 15 from the rear-surface side. The side plate portions 15b are arranged to surround the optical member 16 in the chassis 15 from an outer peripheral side and have an overall vertical rectangular frame shape. The side plate portions 15b are surrounded by the outer wall portion 13b of the bezel 13 from the outer peripheral side thereof. The side plate portions 15b and the outer wall portion 13b have holding mechanism which is not illustrated, and the chassis 15 and the bezel 13 are held with the holding mechanism. Top surfaces of the side plate portions 15b are fixed to a rear surface of the panel fixing tape 22.

Figure 2:
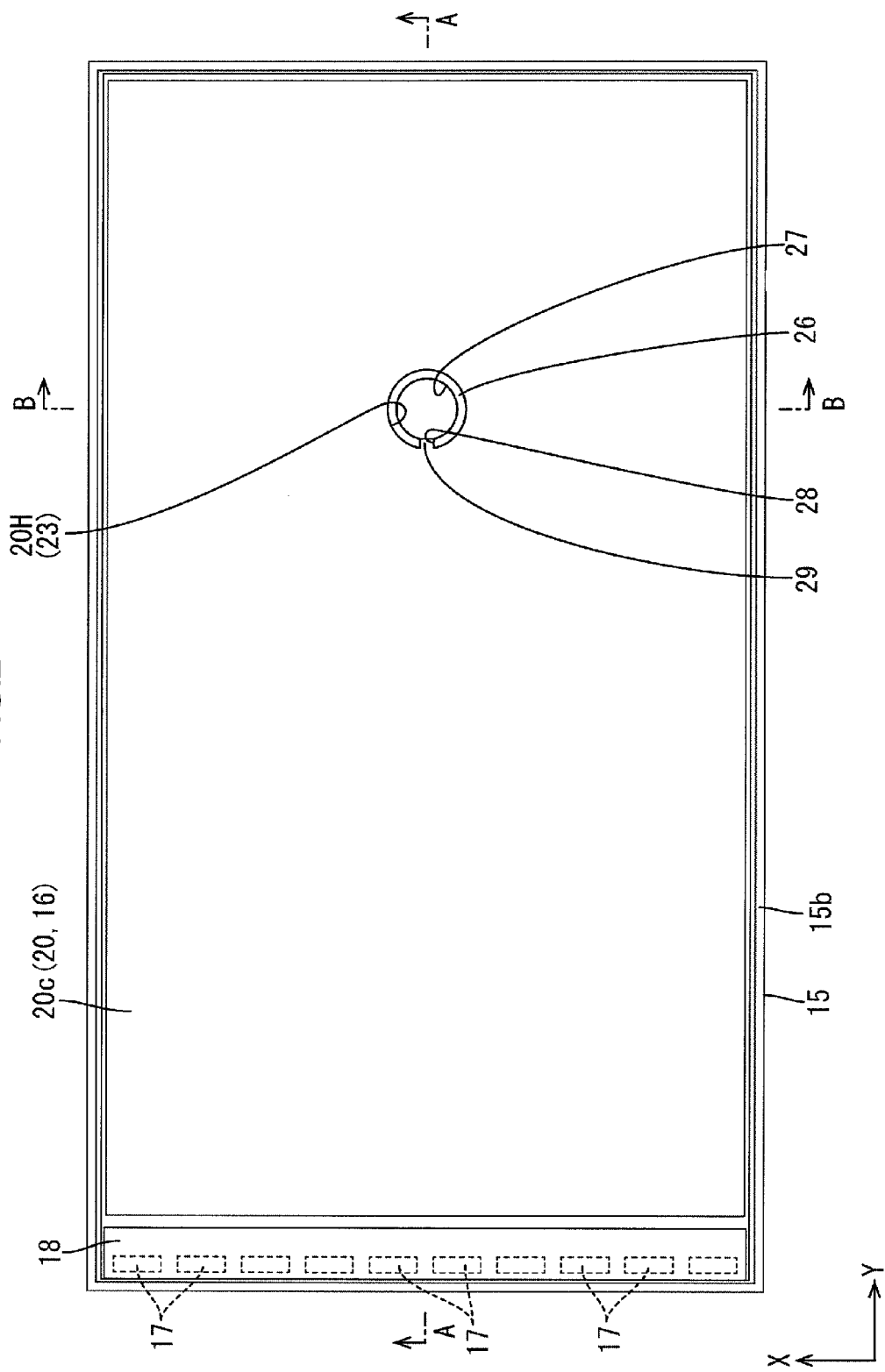
FIG. 2 is a plan view of a backlight device included in the liquid crystal display device.

As illustrated in FIGS. 1 to 3, a base board is fixed on the plate surface of the LED board 18 and the LEDs 17 are configured by enclosing the LED chips (LED elements), which are semiconductor light emitting elements, with resin material on the base board. The LED chips mounted on the base board emit light having one main light emitting wavelength and specifically emit single blue light. Phosphors are dispersed in the resin material enclosing the LED chips and the phosphors are excited by blue light emitted by the LED chips and emit light of predetermined color and. The LED chips emit white light as a whole. The LEDs 17 are side-surface emitting type where side surfaces of the LEDs 17 are light emitting surfaces 17*a*. The side surfaces of the LEDs 17 are next to mounting surface that are mounted on the LED board 18.

As illustrated in FIGS. 1 to 3, the LED board 18 has a base board (a base member) of a film (a sheet) made of insulation material having flexibility and has a plate surface that is parallel to the plate surfaces of the liquid crystal panel 11 and the optical member 16. The LEDs 17 are surface-mounted and a traces pattern (not illustrated) for supplying power to the LEDs 17 is formed on the rear-surface side plate surface of the LED board 18 (a plate surface of the LED board 18 opposite of the liquid crystal panel 11 side surface, a plate surface opposite the light guide plate 19). The LED board 18 has a rectangular shape extending in the short-side direction (the X-axis direction) of the backlight device 12 and the LEDs 17 are mounted on the LED board 18 at an interval in the extending direction. The LED board 18 has a long-side dimension that is substantially same as a short-side dimension of the optical member 16 and has a short-side dimension that is greater than a distance between the side wall portions 15*b* of the chassis 15 and the light guide plate 19. Therefore, a part of the LED board 18 near the light guide plate 19 with respect to the short-side direction (the Y-axis direction) overlaps the light guide plate 19 on the front-surface side. As illustrated in FIG. 3, the LED board 18 is on the rear-surface side with respect to the liquid crystal panel 11 and the Z-axis direction and fixed to the liquid crystal panel 11 with the panel fixing tape 22.

As illustrated in FIGS. 1 and 3, the light guide plate 19 included in the optical member 16 is a rectangular plate shape that is smaller than that of the bottom plate portion 15*a* of the chassis 15. The plate surface of the light guide plate 19 is parallel to the liquid crystal panel 11, the bottom plate portion 15*a* of the chassis 15, and a plate surface of other optical member 16. On the plate surface of the light guide plate 19, the long-side direction corresponds with the Y-axis direction and the short-side direction corresponds with the X-axis direction, and a plate thickness direction that is perpendicular to the plate surface corresponds with the Z-axis direction. The light guide plate 19 is arranged in the chassis 15 with the periphery thereof being surrounded by the side plate portions 15*b*, and the light guide plate 19 is arranged directly below the liquid crystal panel 11 and the optical sheets 20. The light guide plate 19 has the outer peripheral edge surfaces and a short-side edge surface on a left side in FIG. 3 is opposite the LEDs 17 and is a light entrance surface (a light source opposite edge surface) 19*a* through which light from the LEDs 17 enters. Three outer peripheral edge surfaces of the light guide plate 19 other than the light entrance surface 19*a* (a short-side edge surface on a right side in FIG. 3, a pair of long-side edge surfaces) are LED non-opposite edge surfaces (light source non-opposite edge surfaces) that are not opposite the LEDs 17. The light guide plate 19 has front and rear plate surfaces and one of the plate surfaces facing the front-surface side (the liquid crystal panel 11 side) is a light exit surface 19*b* through which light exits toward the liquid crystal panel 11. The other one of the plate surfaces of the light guide plate 19 facing the rear-surface side is an opposite plate surface 19*c* that is opposite to the light exit surface 19*b*. According to such a configuration, a direction in which the LEDs 17 and the light guide plate 19 are arranged corresponds with the Y-axis direction, and a direction in which the optical sheets 20 (the liquid crystal panel 11) and the light guide plate 19 are arranged corresponds with the Z-axis direction. The directions are perpendicular to each other. The light emitted by the LEDs 17 and directed in the Y-axis direction enters the light guide plate 19 through the light entrance surface 19*a* and travels within the light guide plate 19 to be directed toward the optical sheets 20 (the front-surface side, the light exit side). Thus, the light exits the light guide plate 19 through the light exit surface 19*b* that is the front-surface side plate surface. The opposite plate surface 19*c* of the light guide plate 19 has a light reflection pattern (not illustrated) that is a light reflection portion for reflecting light within the light guide plate 19 toward the light exit surface 19*b* and accelerating exit of light through the light exit surface 19*b*.

As illustrated in FIGS. 1 and 3, the optical sheets 20 included in the optical member 16 have a rectangular plan view shape similar to the light guide plate 19. The optical sheets 20 have plate surfaces that are parallel to the bottom plate portion 15*a* of the chassis 15 and the plate surface of other optical member 16. On the plate surfaces of the optical sheets 20, the long-side direction corresponds with the Y-axis direction and the short-side direction corresponds with the X-axis direction and the plate thickness direction that is perpendicular to the plate surfaces corresponds with the Z-axis direction. The optical sheets 20 are arranged on the front-surface side of the light exit surface 19*b* of the light guide plate 19 and between the liquid crystal panel 11 and the light guide plate 19 so that the light from the light guide plate 19 transmits through the optical sheets 20 and exits toward the liquid crystal panel 11 while the optical sheets 20 adding a specific optical property to the transmitted light. The optical sheets 20 of the present embodiment include three optical sheets of a diffuser sheet 20*a* and two prism sheets 20*b*, 20*c* (a first prism sheet 20*b* and a second prism sheet 20*c*). The diffuser sheet 20*a* contains a large number of diffuser particles with dispersed for diffusing light within a substantially transparent synthetic resin substrate. The diffuser sheet 20*a* is disposed directly on the light guide plate 10 and is closest to the light guide plate 19 among the optical sheets 20. Each of the two prism sheets 20*b*, 20*c* includes a substantially transparent substrate made of synthetic resin and unit prisms that are arranged on one plate surface of the substrate. Each of the unit prisms extends in a first direction that is parallel to the one plate surface and the unit prisms are arranged in a second direction that is perpendicular to the first direction. The prism sheets 20*b*, 20*c* selectively apply light condensing action (anisotropic light condensing action) to the exiting light with respect to the second direction that is a direction in which the unit prisms are arranged. One of the two prism sheets 20*b*, 20*c* that is layered directly on the diffuser sheet 20*a* is the first prism sheet 20*b*, and the other one that is layered on the first prism sheet 20*b* and closest to the liquid crystal panel 11 is the second prism sheet 20*c*. The rear surface of the panel fixing tape 22 is fixed to an outer peripheral edge portion of the second prism sheet 20*c*.

As illustrated in FIGS. 1 and 3, the reflection sheet 21 included in the optical member 16 is arranged on the rear-surface side of the light guide plate 19 and covers the opposite plate surface 19*c* that is a surface opposite to the light exit surface 19*b*. The reflection sheet 21 is a synthetic resin sheet member having a white surface with good light reflection properties. Therefore, light that travels within the light guide plate 19 and exits the light guide plate 19 through the opposite plate surface 19c is effectively directed toward the front-surface side (the light exit surface 19b) by the reflection sheet 21. The reflection sheet 21 has a rectangular plan-view shape similar to that of other optical member 16. Most of the middle portion of the reflection sheet 21 is sandwiched between the light guide plate 19 and the bottom plate portion 15a of the chassis 15. The outer peripheral edge portion of the reflection sheet 21 extends outward than the outer peripheral edge portion of the light guide plate 19. Particularly, the outer peripheral edge portion of the reflection sheet 21 on the LED board 18 side extends further than the light entrance surface 19a of the light guide plate 19 and further than the LEDs 17. According to such a configuration, the extended portion of the reflection sheet 21 effectively reflects light from the LEDs 17 to be incident on the light entrance surface 19a.

As illustrated in FIGS. 3 and 4, the backlight device 12 and the liquid crystal panel 11 have a through hole 23 and a panel-side through hole 24, respectively. The through hole (a lighting device side through hole) 23 and the panel-side through hole 24 are communicated with each other and are overlapped with each other in a plan view with respect to an object O such as mechanical scales included in the instrument panel and disposed on the rear-surface side of the liquid crystal display device 10. According to such a configuration, the object O can be seen from the front-surface side of the liquid crystal display device 10 through the through hole 23 and the panel-side through hole 24. In FIGS. 3 and 4, the object O is illustrated by a two-dot line. The through hole 23 and the panel-side through hole 24 are physically through the liquid crystal display device 10 in a thickness direction. Therefore, the object O can be seen clearly and surely through the through hole 23 and the panel-side through hole 24, and the object O can be arranged directly in the through hole 23 and the panel-side through hole 24 compared to a configuration that a part of the members having transmissivity included in the liquid crystal display device 10 (such as substrates 11a, 11b, the polarizing plates 11e, 11f, and the optical member 16 of the backlight device 12) is not penetrated through.

The through hole 23 is a plan view circular hole and has an inner peripheral surface that is an endless loop. The through hole 23 is through the chassis 15 and the optical member 16 of the backlight device 12 in the thickness direction (the Z-axis direction). Specifically, a chassis-side through hole 15H through the bottom plate portion 15a of the chassis 15, a light guide plate-side through hole 19H through the light guide plate 19 included in the optical member 16, an optical sheet-side through hole 20H through the optical sheets 20 included in the optical member 16, and a reflection sheet-side through hole 21H through the reflection sheet 21 are communicated with each other to be the through hole 23. The panel-side through hole 24 has a plan view circular hole similar to the through hole 23 and has an inner peripheral surface that is an endless loop. The panel-side through hole 24 is through the pair of substrates 11a, 11b and the pair of polarizing plates 11e, 11f included in the liquid crystal panel 11 in the thickness direction. Specifically, substrate-side through holes 11aH, 11bH through the substrates 11a, 11b, and polarizing plate-side through holes 11eH, 11fH through the polarizing plates 11e, 11f are communicated with each other to be the panel-side through hole 24. A through hole-side sealing member 25 is disposed between hole edge portions around the substrate-side through holes 11aH, 11bH of the substrates 11a, 11b. The liquid crystals 11c are sealed by the through hole-side sealing member 25. As illustrated in FIGS. 1 and 2, the through hole 23 and the panel-side through hole 24 that are communicated with each other are included in the liquid crystal panel 11 and the backlight device 12 closer to a side opposite to the LED board 18 side in the Y-axis direction with respect to the center of a plain surface of the liquid crystal panel 11 and the backlight device 12.

In the backlight device 12 including the optical member 16 having the through hole 23, following problems may be caused. The backlight device 12 includes heat generating source such as the LEDs 17 and therefore, temperature environment is likely to be changed in the backlight device 12. Therefore, according to the change of the temperature, the optical member 16 made of synthetic resin may thermally expand or shrink. If the optical member 16 may thermally expand or shrink, warping or wrinkles may be easily caused and friction may easily occur near the through hole 23 of the optical member 16.

According to the present embodiment, as illustrated in FIGS. 3 and 4, the backlight device 12 includes a restricting member 26 that is inserted in the through hole 23 of the optical member 16 and in contact with the inner surface of the through hole 23 so that the optical member 16 is less likely to be moved along the plate surface. The restricting member 26 has a communication hole 27 that is communicated with the through hole 23. Even if the optical member 16 thermally expands or shrinks, the restricting member 26 that is inserted in the through hole 23 of the optical member 16 and in contact with the inner surface of the through hole 23 restricts the optical member 16 from moving along the plate surface thereof. Therefore, warping, wrinkles, and rubbing are less likely to be caused on the optical member near the through hole 23. Accordingly, unevenness in brightness is less likely to occur in the light exiting the optical member 16 near the through hole 23. The restricting member 26 has the communication hole 27 that is communicated with the through hole 23 and therefore, original function of the through hole 23 is less likely to be impaired due to the insertion of the restricting member 26 in the through hole 23.

As illustrated in FIGS. 1 and 2, the restricting member 26 has a substantially tubular shape that matches a planar shape of the through hole 23, and an outer peripheral surface of the restricting member 26 is along the inner peripheral surface of the through hole 23. The restricting member 26 has an outer diameter that is smaller than a diameter of the through hole 23 so as to be inserted in the through hole 23. The outer peripheral surface of the restricting member 26 that is inserted in the through hole 23 is in contact with the inner peripheral surface of the through hole 23. The inner peripheral surface of the restricting member 26 defines the communication hole 27 and has a substantially circular plan view shape similarly to the through hole 23. As illustrated in FIGS. 3 and 4, the restricting member 26 extends from a hole edge of the chassis-side through hole 15H of the bottom plate portion 15a of the chassis 15 in the Z-axis direction toward the front-surface side. The restricting member 26 is integrally included in the chassis 15. Therefore, the communication hole 27 of the restricting member 26 is communicated with the chassis-side through hole 15H that is through the bottom plate portion 15a. The restricting member 26 has a height dimension that is substantially equal to a total dimension of the thickness dimensions of the light guide plate 19, the three optical sheets 20 and the reflection sheet 21 included in the optical member 16. The restricting member 26 has a projected top surface that is substantially on a same plane as a front-surface side plate surface of the second prism sheet 20c that is disposed on an upper most front-surface side among the optical member 16.

Figure 5:
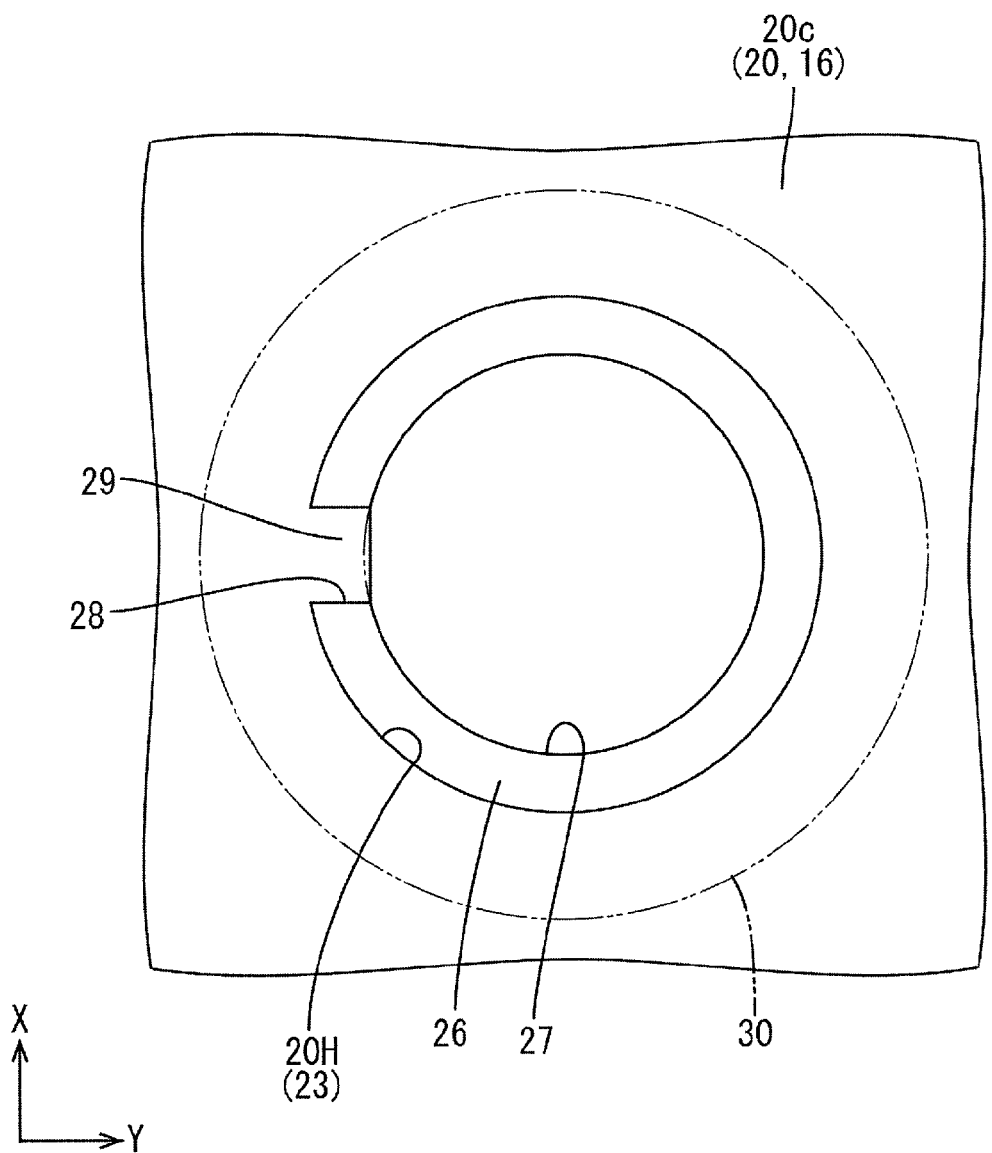
FIG. 5 is a plan view illustrating a planar configuration of a through hole and a restricting member included in the backlight device.

As illustrated in FIG. 5, the restricting member 26 includes a restricting member-side recessed portion 28 that is recessed from a part of the outer peripheral surface with respect to a circumferential direction. The optical member 16 includes an optical member-side projection portion 29 that projects from a part of the inner peripheral surface of the through hole 23 with respect to the circumferential direction. When the restricting member 26 is inserted in the through hole 23 of the optical member 16, the optical member-side projection portion 29 is fit in the restricting member-side recessed portion 28 so that the optical member 16 is restricted by the restricting portion from being rotated, namely, the optical member 16 is positioned with respect to the circumferential direction of the through hole 23 and the restricting member 26.

specifically, as illustrated in FIG. 5, the restricting member-side recessed portion 28 is formed by cutting away a part of the restricting member 26 over an entire area in the thickness direction (a radial direction) and open to the communication hole 27. Thus, the restricting member 26 is formed in a tubular loop shape having peripheral ends by cutting off a part of the restricting member 26 with respect to the circumferential direction and forming the restricting member-side recessed portion 28. The restricting member 26 includes the restricting member-side recessed portion 28 extending over an entire height length thereof in the Z-axis direction (a height direction). The restricting member-side recessed portion 28 is included in the outer peripheral surface of the restricting member 26 closest to the LEDs 17 such that the communication hole 27 is open toward the LEDs 17 (the LED board 18). The optical member-side projection portion 29 projects from the inner surface of the through hole 23 toward a center of the through hole 23 and a projection dimension is substantially same as a thickness of the restricting member 26, namely, substantially same as a recessed amount (a cut-away dimension) of the restricting member-side recessed portion 28. The optical member-side projection portion 29 has a substantially rectangular plan view shape. The optical member-side projection portion 29 is arranged closest to the LEDs 17 on the inner peripheral surface of the through hole 23. Each of the light guide plate 19, the three optical sheets 20, and the reflection sheet 21 has the optical member-side projection portion 29. The optical member-side projection portion 29 separately included in each component of the optical member 16 has substantially same plan view arrangement and a plan view shape. Therefore, when the light guide plate 19, the three optical sheets 20, and the reflection sheet 21 included in the optical member 16 are arranged in the chassis 15, the optical member-side projection portions 29 included in the optical member 16 are overlapped with each other and all the optical member-side projection portions 29 are collectively fit in the restricting member-side recessed portion 28. Thus, each component included in the optical member 16 is positioned.

As illustrated in FIGS. 3 and 4, the backlight device 12 includes a fixing tape (a fixing member) 30 for fixing the hole edge portion around the through hole 23 included in the optical member 16 to the restricting member 26. The fixing tape 30 includes a synthetic resin substrate and an adhesive member that is coated over two surfaces of the substrate. A rear side surface of the fixing tape 30 is adhered to the hole edge portion around the through hole 23 and the restricting member 26 of the optical member 16, and a front side surface of the fixing tape 30 is adhered to the hole edge portion around the panel-side through hole 24. As illustrated in FIG. 5, the fixing tape 30 has a plan view ring (donut) shape and has a width dimension greater than the thickness dimension of the restricting member 26. In FIG. 5, the fixing tape 30 is illustrated by a two-dot line. Specifically, the fixing tape 30 has an inner diameter dimension substantially equal to the diameter dimension of the through hole 23 and the inner diameter dimension of the restricting member 26 and has an outer diameter dimension greater than the outer diameter dimension of the restricting member 26. Therefore, the fixing tape 30 is bonded to an entire area of the projected end surface of the restricting member 26 and the hole edge portion around the optical sheet-side through hole (the through hole 23) 20H of the second prism sheet 20c that is disposed on the upper most front-surface side among the optical member 16. The fixing tape 30 is adhered to the hole edge portion around the optical sheet-side through hole 20H of the second prism sheet 20c and the optical member-side projection portion 29 of the second prism sheet 20c. The substrate of the fixing tape 30 has a black surface having light block properties. Accordingly, if light leaks along the inner peripheral surface of the through hole 23 of the optical member 16, the leaking light is absorbed by the fixing tape 30 so that the hole edge portion around the through hole 23 is less likely to be seen locally as a bright portion. Therefore, unevenness in brightness is less likely to be caused by the through hole 23.

As illustrated in FIGS. 3 and 4, the liquid display device 10 includes a cap member (through hole-side holding member) 31 that holds the hole edge portion around the panel-side through hole 24 of the liquid crystal panel 11 with the backlight device 12 therebetween. The cap member 31 is made of metal similar to the bezel 13. The cap member 31 has a cap-side through hole (a holding member-side communication hole) 32 that is communicated with the panel-side through hole 24 and the through hole 23. The cap-side through hole 32 penetrates a center of the cap member 31 in the Z-axis direction. The cap member 31 includes a pressing portion 31a and an insertion portion (a shaft portion) 31b. The pressing portion 31a is in contact with the hole edge portion around the panel-side through hole 24 of the liquid crystal panel 11 from the front-surface side, that is opposite to the backlight device 12 side. The insertion portion 31b is inserted in the panel-side through hole 24 and the communication hole 27 of the restricting member 26. The pressing portion 31a has a plan view ring (donut) shape and has a width dimension substantially same as the width dimension of the fixing tape 30. The insertion portion 31b has substantially a tubular shape and has an outer diameter smaller than the diameter of the panel-side through hole 24 and smaller than the diameter of the communication hole 27 of the restricting member 26. According to such a configuration, the insertion portion 31b can be inserted in the panel-side through hole 24 and the communication hole 27. An outer peripheral surface of the insertion portion 31b of the cap member 31 is in contact with the inner peripheral surface of the restricting member 26. Each of the insertion portion 31b and the restricting member 26 that are in contact with each other includes a holding mechanism, which is not illustrated. The cap member 31 and the chassis 15 including the restricting member 26 are mounted in each other with the holding mechanism. The cap member 31 is made of metal and has light blocking property on the surface thereof. With such a configuration, the hole edge portion around the panel-side through hole 24 of the liquid crystal panel 11 is covered with the pressing portion 41a and therefore, the hole edge portion is less likely to be directly seen from the light exit side.

The liquid crystal display device 10 according to the present embodiment has the configuration described before, and operations thereof will be described. The liquid crystal display device 10 is mounted after the liquid crystal panel 11 is previously manufactured and the components of the backlight device 12. Among the components of the backlight device 12, each of the optical sheets 20 is manufactured by molding a rolled base material with a die. The die for molding includes molding parts for forming the optical sheet-side through hole 20H and the optical member-side projection 29 so that the optical sheet-side through hole 20H and the optical member-side projection portion 29 are formed easily and at a low cost in manufacturing of the optical sheets 20. The reflection sheet 21 is manufactured similarly to the optical sheets 20. Among the components of the backlight device 12, the light guide plate 19 is manufactured by injection molding, for example. The molding die previously has a molding shape on a molding surface thereof for molding the light guide plate-side through hole 19H and the optical member-side projection portion 29. Accordingly, the light guide plate-side through hole 19H and the optical member-side projection portion 29 are formed in manufacturing of the light guide plate 19.

In mounting of the liquid crystal display device 10, the reflection sheet 21, the light guide plate 19, and the optical sheets 20 included in the optical member 16 are arranged in the chassis 15 in a predetermined order. Each component included in the optical member 16 is positioned with respect to the chassis 15 in the X-axis direction and the Y-axis direction by fitting the through hole 23 to the restricting member 26, and is positioned with respect to the circumferential direction of the through hole 23 and the restricting member 26 by fitting the optical member-side projection portion 29 in the restriction member-side recessed portion 28. Accordingly, each of the optical members 26 is positioned with respect to the chassis 15 precisely and position displacement is less likely to be caused.

Next, the fixing tape 30 is mounted on the optical sheet. The fixing tape 30 is mounted on the hole edge portion around the optical sheet-side through hole 20H of the second prism sheet 20c that is an uppermost front-surface side one of the optical member 16 and on the projected top surface of the restricting member 26. Thus, the hole edge portion around the second prism sheet 20c and the restricting member 26 are connected and fixed to each other. The optical member-side projection portion 29 of the second prism sheet 20c is fixed to the restricting member 26 via the fixing tape 30. Therefore, the optical member-side projection portion 29 that projects from a part of the inner peripheral surface of the optical sheet-side through hole 20H is less likely to be deformed. The fixing tape 30 may be previously adhered to the liquid crystal panel 11 side similarly to a panel fixing tape 22, which will be described later.

Next, the panel fixing tape 22 is adhered to the rear surface of the outer peripheral edge portion of the liquid crystal panel 11 with a front surface thereof. The LED board 18 is adhered to the panel fixing tape 22 in one of the short-side portions (a wide short-side portion). Then, the liquid crystal panel 11 is disposed over the chassis 15 from the front-surface side. The rear surface of the panel fixing tape 22 is adhered to the side plate portion 15b of the chassis 15, and the outer peripheral edge portion of the second prism sheet 20c that is an uppermost front-surface side one of the optical member 16. Accordingly, the LED board 18 and the LEDs 17 are arranged in the chassis 15 and the liquid crystal panel 11 is fixed to the backlight device 12. Then, the bezel 13 and the cap member 31 are mounted on the chassis 15. According to the mounting of the bezel 13, the outer peripheral edge portion of the liquid crystal panel 11 is pressed by the panel pressing portion 13a from the front-surface side, and the outer wall portion 13b that is mounted on the side plate portion 15b of the chassis 15 is held in the mounted position by a holding mechanism, which is not illustrated. According to the mounting of the cap member 31, the hole edge portion around the panel-side through hole 24 of the liquid crystal panel 11 is pressed by the pressing portion 31a from the front-surface side, and the insertion portion 31b that is inserted in the panel-side through hole 24 and the communication hole 27 of the restricting member 26 is mounted in the restricting member 26 and the mounted portion is held by a holding mechanism, which is not illustrated. The assembled liquid crystal display device 10 is mounted in the dashboard of a vehicle and used. In the mounted position that the liquid crystal display device 10 is mounted in the dashboard, as illustrated in FIGS. 3 and 4, with the liquid crystal display device seen from the front, the through hole 23, the panel-side through hole 24, the communication hole 27, and the cap-side communication hole 32 are overlapped with each other with respect to the object O such as a mechanical scale included in the instrument panel. Accordingly, the object O is clearly and surely seen through the through hole 23, the panel-side through hole 24, the communication hole 27, and the cap-side communication hole 32.

If the power of the assembled liquid crystal display device 10 is turned on, driving of the liquid crystal panel 11 is controlled by a panel control circuit, which is not illustrated, and driving of the LEDs 17 on the LED board 18 is controlled by an LED driving board, which is not illustrated. As illustrated in FIG. 3, light from the lighted LEDs 17 enters the light guide plate 19 through the light entrance surface 19a and travels within the light guide plate 19 with reflecting off the reflection sheet 21. Then, the light exits the light guide plate 19 through the light exit surface 19b. The optical sheets 20 add a specific optical property to the light exiting the light guide plate 19 and direct the light to the liquid crystal panel 11 as uniform planar light so that images appear on the display area of the liquid crystal panel 11. The optical member 16 has the through hole 23 and light may leak along the inner peripheral surface or the hole edge portion around the through hole 23. However, the fixing tape 30 having light blocking properties is adhered from the front-surface side to the hole edge portion around the optical sheet-side through hole 20H of the second prism sheet 20c that is disposed on the uppermost front-surface side. Therefore, the leaking light is absorbed by the fixing tape 30. Accordingly, the vicinity of the through hole 23 is less likely to be seen as a bright portion and unevenness in brightness is less likely to occur. Similarly, the liquid crystal panel 11 includes the panel-side through hole 24, and light may leak along the inner peripheral surface or the hole edge portion of the panel-side through hole 24. However, the hole edge portion around the panel-side through hole 24 is covered with the pressing portion 31a of the cap member 31 having light blocking properties from the front-surface side. With such a configuration, leaking light is blocked by the pressing portion 31a. Thus, the vicinity of the panel-side through hole 24 is less likely to be seen as a bright portion and unevenness in brightness is less likely to occur.

If the power of the liquid crystal display device 10 is turned on, the LEDs 17 are lighted on and heat is generated.

Particularly, the temperature of the backlight device 12 is increased. If the power of the liquid crystal display device 10 is turned off, the LEDs 17 are lighted off and the temperature of the backlight device 12 with high temperature is lowered as the time elapses. As the temperature of the backlight device 12 changes, the optical member 16 made of resin having a great thermal expansion rate among the components of the backlight device 12 may thermally expand or shrink. Even if the optical member 16 may expand or shrink, the restricting member 26 that is in contact with the inner surface of the through hole 23 restricts displacement of the optical member 16 near the through hole 23 due to the expansion or shrinkage. Accordingly, the warping or wrinkles are less likely to be caused and rubbing is less likely to occur in the vicinity of the through hole 23 in the optical member 16. If warping or rubbing occurs on the optical members, unevenness may occur in the in-plane contribution of exit light. The warping or wrinkles is less likely to be caused and the unevenness in brightness is less likely to be caused in the light exited from the backlight device 12. The rubbing is less likely to occur on the optical member 16 and scraping is less likely to be caused in the optical member 16. Thus, the unevenness in brightness is less likely to be caused by the scraping. Accordingly, display quality of images on the liquid crystal panel 11 is improved.

As described before, the backlight device (the lighting device) 12 of the present embodiment includes LEDs (a light source) 17, the optical member 16, and the restricting member 26. The optical member 16 has a sheet-like shape and adds a specific optical property to the light from the LEDs 17. The optical member 16 has the through hole 23 through the thickness direction. The restricting member 26 has the communication hole 27 that is communicated with the through hole 23, and the restricting member 26 is inserted in the through hole 23 and in contact with the inner surface thereof. Thus, the restricting member 26 restricts the displacement of the optical member 16 along the plate surface thereof.

According to such a configuration, light emitted by the LEDs 17 exits outside while the optical member 16 having a sheet-like shape adding a specific optical property to the light. The optical member 16 has a through hole 23 that is through the thickness direction thereof. With such a configuration, an object O arranged on an opposite side to the light exit side with respect to the backlight device 12 can be seen clearly through the through hole 23 from the light exit side with respect to the backlight device 12. Warping or wrinkles may be likely to be caused and rubbing may be likely to be caused in the vicinity of the through hole 23 that is through the thickness direction on the optical member 16 when the optical member 16 thermally expands or shrinks. The restricting member 26 that is inserted through the through hole 23 of the optical member 16 and in contact with the inner surface of the through hole 23 restricts movement of the optical member 16 along the plate surface thereof. With such a configuration, warping or wrinkles is less likely to be caused and rubbing is less likely to be caused in the vicinity of the through hole 23 on the optical member 16 even if the optical member 16 thermally expands or shrinks. Thus, unevenness in brightness of exit light is less likely to be caused in the vicinity of the through hole 23 on the optical member 16. The restricting member 26 has the communication hole 27 that is communicated with the through hole 23 and therefore, the original function of the through hole 23 is maintained even with inserting the restricting member 26 through the through hole 23.

The optical member 16 has the optical member-side projection portion 29 that projects from a part of the inner peripheral surface of the through hole 27 with respect to a circumferential direction. The restricting member 26 has the restricting member-side recessed portion 28 that receives the optical member-side projection portion 29. The restricting member-side recessed portion 28 is recessed from a part of the outer peripheral surface of the restricting member 26 with respect to the circumferential direction. According to such a configuration, when the restricting member 26 is inserted in the through hole 23 of the optical member 16, the optical member-side projection portion 29 that projects from a part of the inner peripheral surface of the through hole 23 with respect to the circumferential direction is fit in the restricting member-side recessed portion 28 that is recessed from a part of the outer peripheral surface of the restricting member 26 with respect to the circumferential direction. Accordingly, the optical member 16 is not rotated with respect to the restricting member 26 and is positioned with respect to the circumferential direction of the through hole 23.

The optical member 16 has the optical member-side projection portion 29 and the restricting member 26 has the restricting member-side recessed portion 28 that is open toward the communication hole 27. According to such a configuration, the restricting member-side recessed portion 28 receiving the optical member-side projection portion 29 is recessed from a part of the outer peripheral surface of the restricting member 26 with respect to the circumferential direction and is open to the communication hole 27. Therefore, the restricting member 26 is easily manufactured compared to a configuration that the restricting member-side recessed portion is not open to the communication hole 27.

The optical member 16 includes multiple members that are layered on each other and some of the multiple members of the optical member 16 have same planar arrangement. The restricting member-side recessed portion 28 of the restricting member 26 is configured to commonly receive the optical member-side projection portions 29 having the same planar arrangement. According to such a configuration, the restricting member-side recessed portion 28 commonly receives the optical member-side projection portions 29 having the same planar arrangement. Therefore, the configuration of the restricting member 26 is less likely to be complicated and the restricting member 26 is easily manufactured.

The backlight device includes the fixing tape (a fixing member) 30 for fixing the hole edge portion around the through hole 23 of the optical member 16 to the restriction member 26. According to such a configuration, the hole edge portion around the through hole 23 of the optical member 16 is fixed to the restricting member 26 with the fixing tape 30. Therefore, even if the optical member 16 thermally expands or shrinks, warping or wrinkles is less likely to be caused near the through hole 23 in the optical member 16 and rubbing is further less likely to occur. Accordingly, unevenness in brightness is less likely to be caused in the exit light near the through hole 23 in the optical member 16.

Further, the liquid crystal display device (the display device) 10 of the present embodiment includes the backlight device 12 and the liquid crystal panel (the display panel) 11. The liquid crystal panel 11 is arranged on the light exit side with respect to the backlight device 12 and displays images with using light from the backlight device 12. According to the liquid crystal display device 10 having such a configuration, unevenness in brightness is less likely to be caused in the exit light from the backlight device 12. Therefore, display with good display quality is achieved.

The liquid crystal panel 11 has the panel-side through hole 24 that is communicated with the through hole 23 and through the thickness thereof. According to such a configuration, the liquid crystal panel 11 has the panel-side through hole 24 that is through in the thickness direction thereof, and the panel-side through hole 24 is communicated with the through hole 23 formed in the optical member 16. Therefore, the object O that is arranged on an opposite side to the liquid crystal panel 11 side with respect to the backlight device 12 can be seen through the panel-side through hole 24, the through hole 23, and the communication hole 27 from the light exit side with respect to the liquid crystal panel 11.

The liquid crystal panel 11 at least includes the pair of substrates 11a, 11b, the liquid crystals 11c held between the substrates 11a, 11b, the outer peripheral side sealing member 11d, and the through hole-side sealing member 25. Each of the substrates 11a, 11b has the panel-side through hole 24. The outer peripheral side sealing member 11d surrounds the liquid crystals 11c and is arranged between the outer peripheral end portions of the respective substrates 11a and 11b to seal the liquid crystals 11c therein. The through hole-side sealing member 25 is disposed between the hole edge portions around the panel-side through hole 24 of the substrates 11a, 11b. Thus, the liquid crystals 11c are sealed by the through hole-side sealing member 25. Accordingly, the liquid crystals 11c that are held between the pair of substrates 11a, 11b included in the liquid crystal panel 11 are sealed by the outer peripheral side sealing member 11d that is between the outer peripheral end portions of the respective substrates 11a and 11b. The liquid crystals 11c are sealed by the through hole-side sealing member 25 that is between the hole edge portions around the panel-side through hole 24 in the substrates 11a, 11b, although the substrates 11a, 11b have the panel-side through hole 24.

The liquid crystal display device 10 includes the bezel (the outer peripheral-side holding member) 13 and the cap member (the through hole-side holding member) 31. The bezel 13 holds the outer peripheral edge portion of the liquid crystal panel 11 with the backlight device 12. The cap member 31 holds the hole edge portion around the panel-side through hole 24 of the liquid crystal panel 11 with the backlight device 12 therebetween. The cap member 31 has a light blocking property on the surface thereof. With such a configuration, the outer peripheral edge portion of the liquid crystal panel 11 is held between the backlight device 12 and the bezel 13 and the hole edge portion around the panel-side through hole 24 is held between the backlight device 12 and the cap member 31 so that the liquid crystal panel 11 is held stably. Further, the cap member 31 has a light blocking property at least on the surface thereof and therefore, the hole edge portion around the panel-side through hole 24 in the liquid crystal panel 11 is less likely to be directly seen from the light exit side. Accordingly, display error in displayed images is less likely to be caused in the vicinity of the panel-side through hole 24 in the liquid crystal panel 11.

Second Embodiment

A second embodiment of the present technology will be described with reference to FIGS. 6 and 7. In the second embodiment, multiple members included in an optical member 116 selectively have an optical member-side projection portion 129. Similar configurations, operations, and effects to the first embodiment will not be described.

Figure 6:
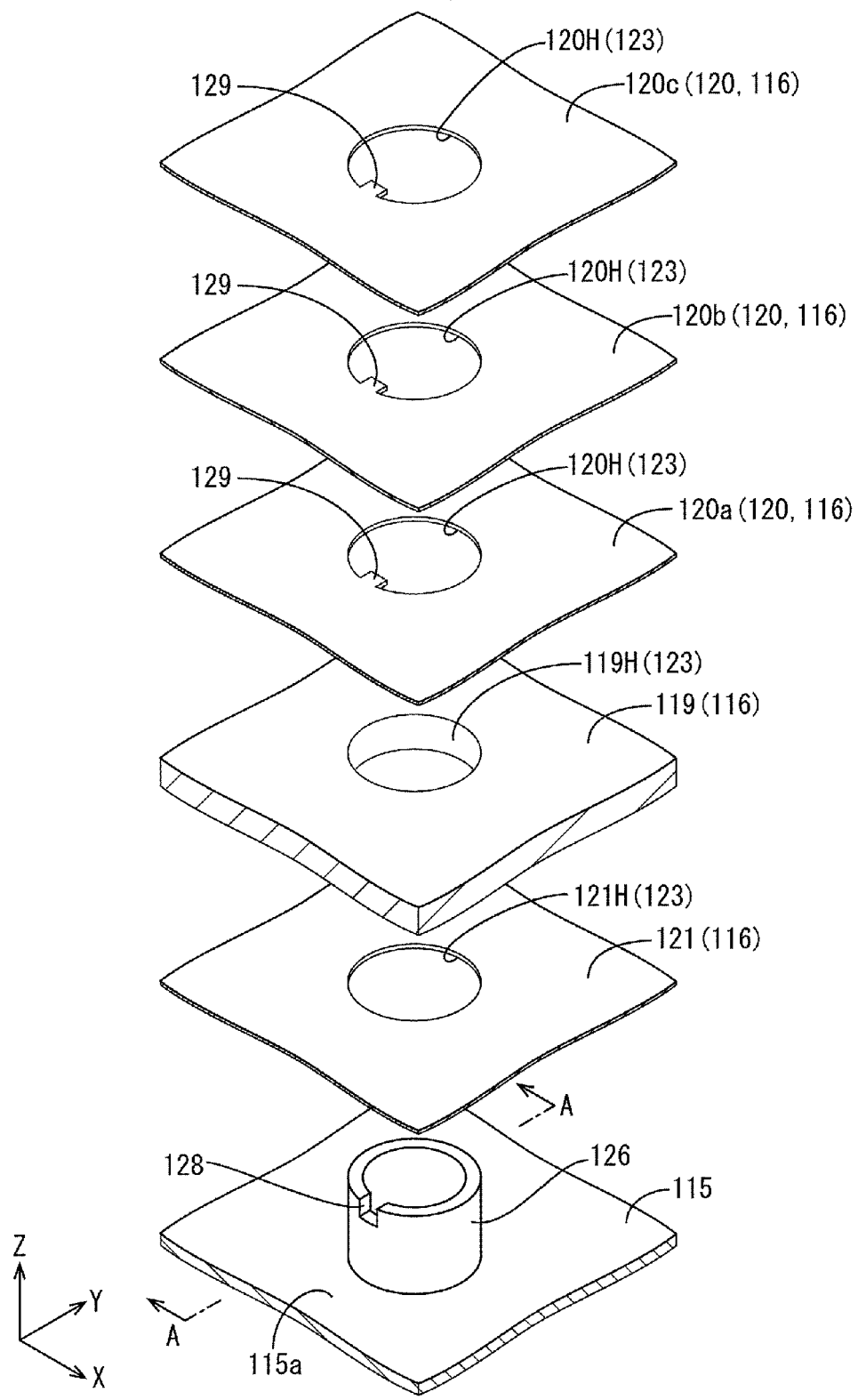
FIG. 6 is an exploded perspective view of an optical member and a restricting member according to a second embodiment of the present technology.
Figure 7:
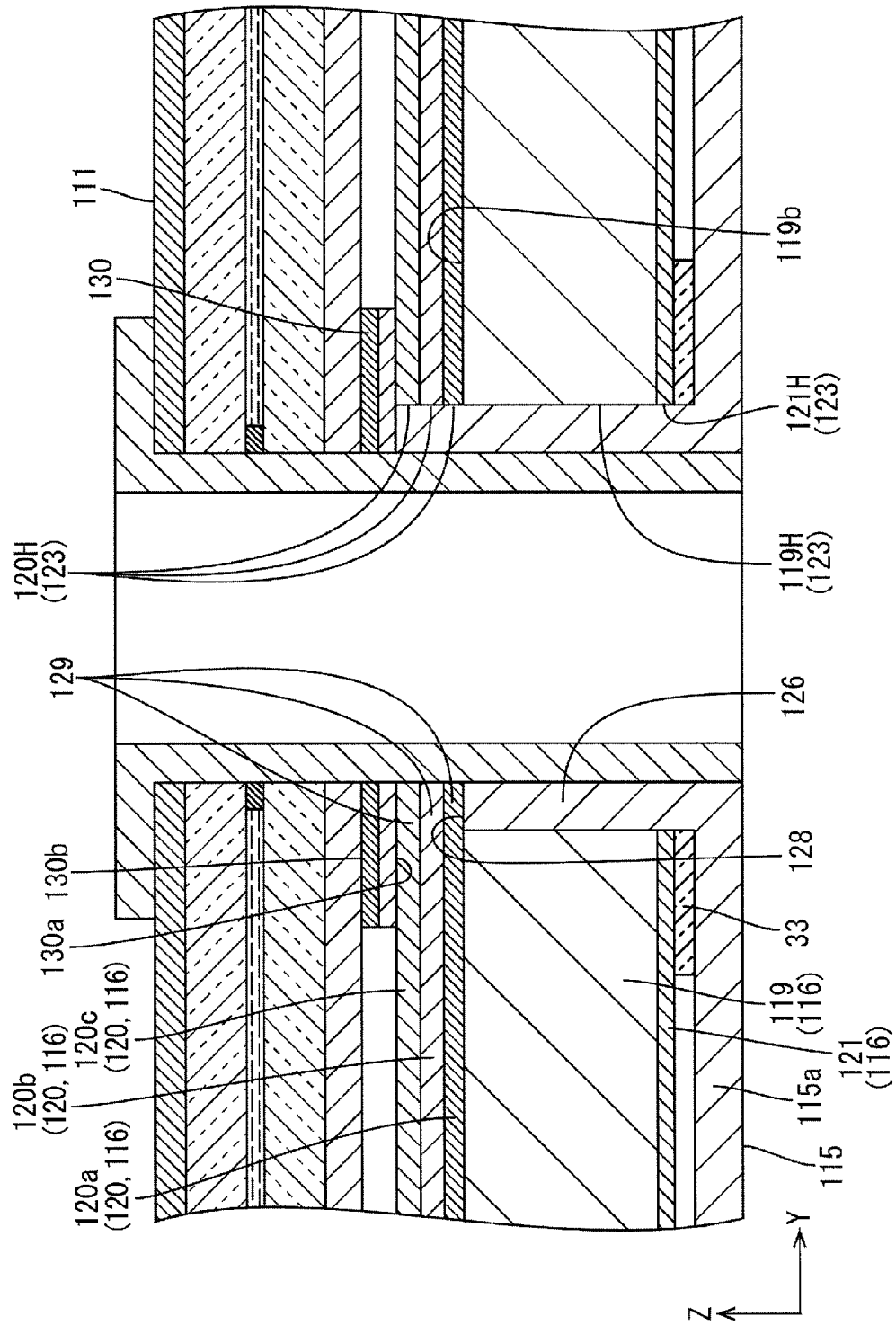
FIG. 7 is a cross-sectional view taken along line A-A in FIG. 6.

Each of optical sheets 120 included in the optical member 116 of the present embodiment (a diffuser sheet 120a, a first prism sheet 120b, and a second prism sheet 120c) has an optical member-side projection portion 129, selectively, as illustrated in FIGS. 6 and 7. Namely, a light guide plate 119 and a reflection sheet 121 do not have the optical member-side projection portion 129 and only the optical sheets 120 have the optical member-side projection portion 129. The light guide plate 119 has a light guide plate-side through hole 119H and the reflection sheet 121 has a reflection sheet-side through hole 121H and the through holes 119H, 121H form a part of a through hole 123. An inner peripheral surface of the light guide plate-side through hole 119H and the reflection sheet-side through hole 121H has a plan view true circular shape that is simpler than that of an optical sheet-side through hole 120H of the optical sheet 120 having the optical member-side projection portion 129. Particularly, the light guide plate 119 is manufactured with injection molding and a molding shape formed on a molding surface of a molding die is simplified and a cost for the molding die is reduced and molding errors are less likely to be caused. Accordingly, a cost for manufacturing the light guide plates 119 is reduced.

A restricting member 126 includes a restricting member-side recessed portion 128, selectively, corresponding with the optical sheet-side through hole 120H of the optical sheets 120. Namely, the restricting member 126 does not have the restricting member-side recessed portion 128 in a portion thereof that is inserted in the light guide plate-side through hole 119H and the reflection sheet-side through hole 121H of the light guide plate 119 and the reflection sheet 121, respectively. The restricting member 126 has the restricting member-side recessed portion 128 only in a portion thereof that is inserted in the optical sheet-side through holes 120H of the optical sheets 120. The restricting member 126 has a projected top end portion projected from a bottom plate portion 115a of a chassis 115, and the projected top end portion has a cut away portion that is the restricting member recessed portion 128 and has a ring shape with ends. The restricting member 126 has a projected basal portion near the bottom plate portion 115a has no restricting member recessed portion 128 and no cut away portion and has an endless loop shape. The projected top end portion of the restricting member 126 having the ring shape with ends has a height dimension that is a total of thickness dimensions of the optical sheets 120. The projected basal portion of the restricting member 126 having an endless loop shape has a height dimension that is a total of thickness dimensions of the light guide plate 191 and the reflection sheet 121.

As illustrated in FIG. 7, a fixing tape 130 has a reflection surface 130a that reflects light and a light blocking surface 130b that blocks light and is an opposite surface to the reflection surface 130a. The reflection surface 130a is attached to the restricting member 126 and the optical sheets 120 (the second prism sheet 120c) and the light blocking surface 130b is attached to a liquid crystal panel 111. Specifically, the fixing tape 130 has the reflecting surface 130a that is a white surface with good light reflection properties and the light blocking surface 130b that is a black surface with good light blocking properties. According to such a configuration, even if light leaks along the inner surface of the through hole of the optical member 116, the light reflects off the reflecting surface 130a of the fixing tape 130 to be directed toward the optical member 116 and used again. With such a configuration, the light use efficiency is improved compared to a configuration of the first embodiment that the front and rear surfaces of the fixing tape are light blocking surfaces. Further, the second embodiment includes a second fixing tape 33 that fixes the reflection sheet 121 and the bottom plate portion 115a of the chassis 115. The second fixing tape 33 includes a substantially transparent substrate made of synthetic resin and adhesive material applied on two surfaces of the substrate.

As described before, according to the present embodiment, the optical member 116 at least includes the light guide plate 119 including a light entrance surface (not illustrated) and a light exit surface 119b, and the optical sheets 120. Light from LEDs (not illustrated) enters the light guide plate 119 through the light entrance surface and the light exits the light guide plate 119 through the light exit surface 119b. The optical sheets 120 are layered on the light exit surface 119b side with respect to the light guide plate 119. The light guide plate 119 has no optical member-side projection portion 129 on the inner peripheral surface of the light guide plate-side through hole 119H (the through hole 123) and the optical sheets 120 selectively have the optical member-side projection portion 129 on the inner peripheral surface of the optical sheet-side through hole 120H (the through hole 123). The restricting member 126 selectively has the restricting member-side recessed portion 128 on the outer peripheral surface of the restricting member 126 opposite the inner peripheral surface of the optical sheet-side through hole 120H (the through hole 123) of the optical sheets 120. According to such a configuration, the optical sheets 120 are not rotated. The light guide plate 119 has no optical member-side projection portion 129 on the inner peripheral surface of the light guide plate-side through hole 119H. Therefore, the shape of the light guide plate-side through hole 119H of the light guide plate 119 is simplified. The light guide plate 119 generally has a thickness dimension greater than that of the optical sheet 120. Therefore, it is difficult to form the light guide plate-side through hole 119H in the light guide plate 119 with punching and a manufacturing cost is likely to be increased to form the light guide plate-side through hole 119H having complicated shape. The shape of the light guide plate-side through hole 119H is simple in the present embodiment, and the manufacturing cost for the light guide plate 119 can be reduced. The optical sheet 120 generally has a thickness dimension smaller than that of the light guide plate 119. Therefore, the optical sheet-side through hole 120H can be easily formed in the optical sheet 120 with punching at a low cost even if the optical sheet-side through hole 120H has a complicated shape.

The fixing tape 130 is disposed between and adhered to the hole edge portion around the through hole 123 of the optical member 116 and the restricting member 126. The fixing tape 130 has a reflection surface 130a and a light blocking surface 130b. The reflection surface 130a reflects light and is adhered to the optical member 116 and the restricting member 126. The light blocking surface 130b blocks light and is an opposite surface to the reflection surface 130a. Accordingly, the fixing tape 130 is disposed between and adhered to the hole edge portion around the through hole 123 in the optical member 116 and the restricting member 126 so that the hole edge portion around the through hole 123 in the optical member 116 is fixed with respect to the restricting member 126. Even if light leaks along the inner surface of the through hole 123 in the optical member 116, the light reflects off the reflection surface 130a of the fixing tape 130 adhered to the optical member 116 and the restricting member 126 to be directed back toward the optical member 116. Accordingly, the light use efficiency is improved. Further, a surface of the fixing tape 130 opposite to the reflection surface 130a is the light blocking surface 130b. Therefore, the hole edge portion around the through hole 123 in the optical member 116 is less likely to be seen directly from the light exit side. Accordingly, unevenness in brightness is less likely to be caused in the exit light near the through hole 123 in the optical member 116.

Third Embodiment

A third embodiment of the present technology will be described with reference to FIGS. 8 and 9. The third embodiment further includes a positioning structure in an optical sheet 220 and a restricting member 226 unlike the second embodiment. Similar configurations, operations, and effects to the second embodiment will not be described.

Figure 8:
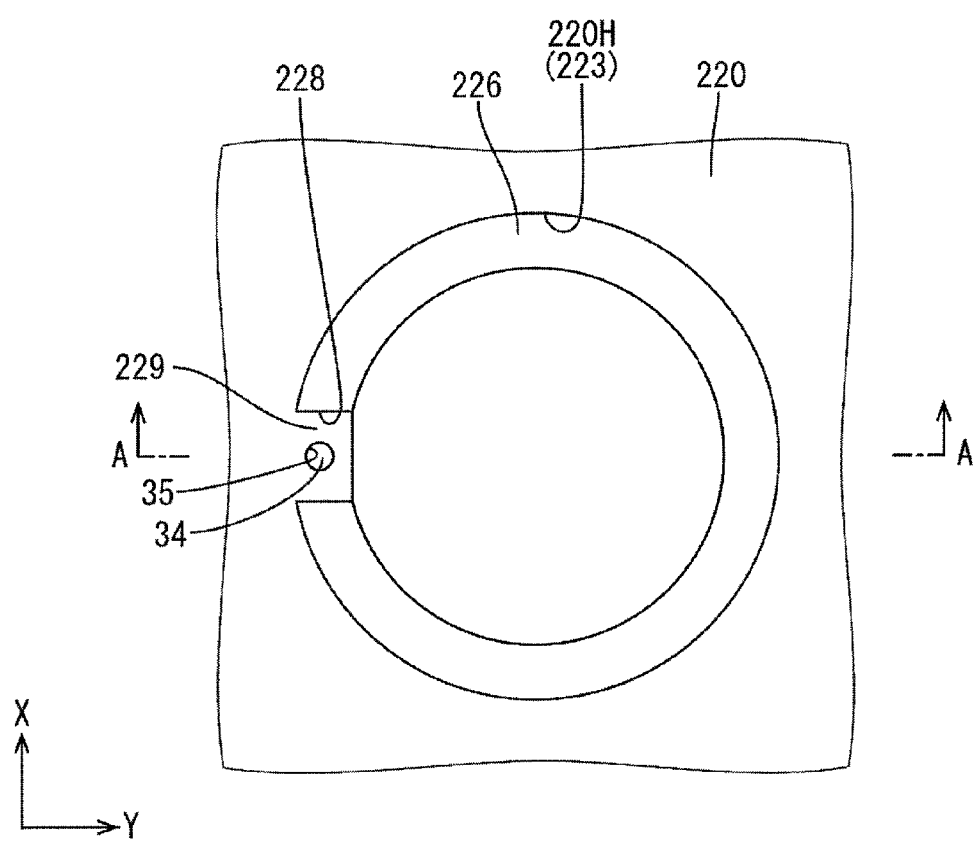
FIG. 8 is a plan view illustrating a planar configuration of a through hole and a restricting member according to a third embodiment of the present technology.
Figure 9:
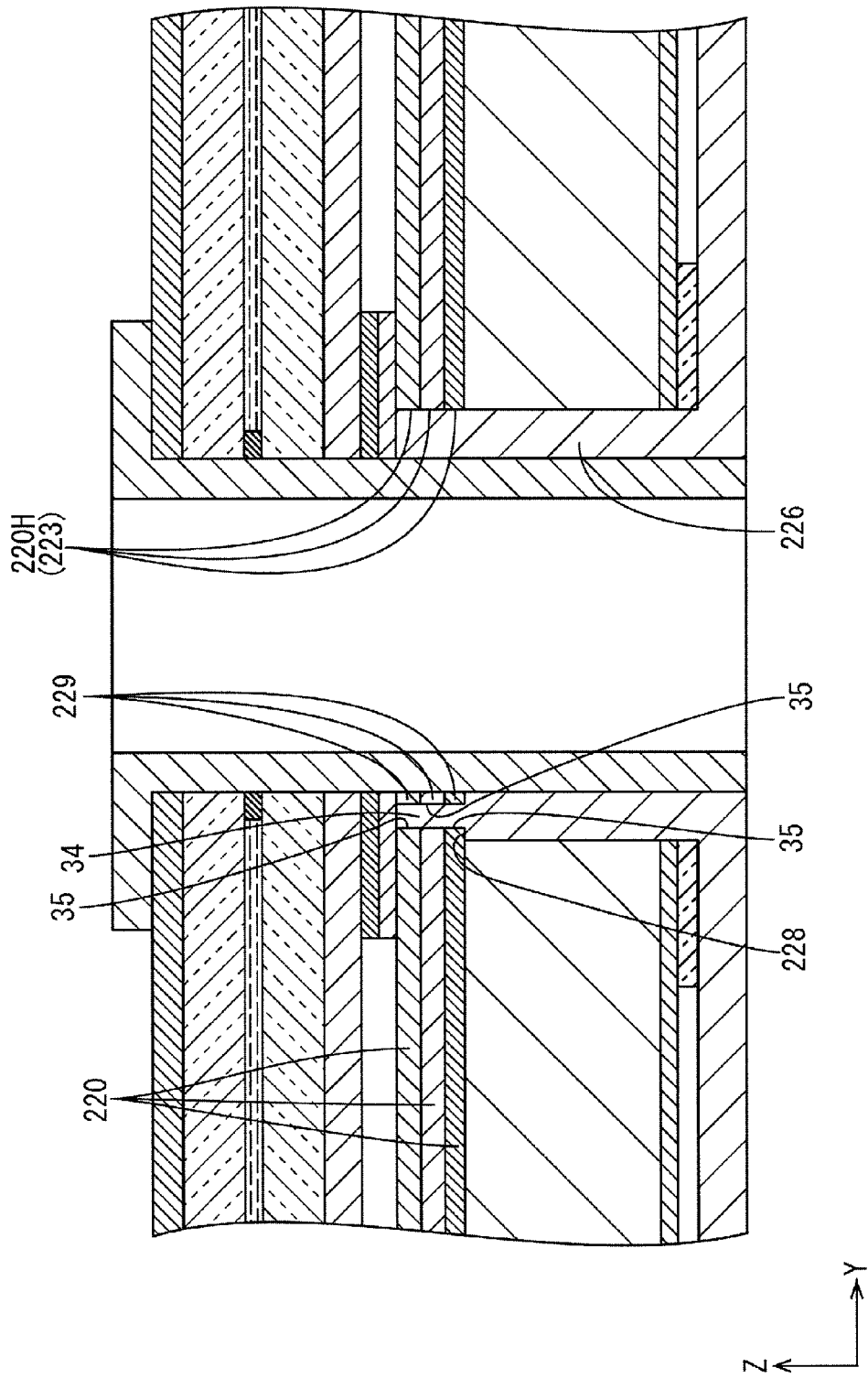
FIG. 9 is a cross-sectional view taken along line A-A in FIG. 8.

As illustrated in FIGS. 8 and 9, the restricting member 226 of the present embodiment includes a positioning pin 34 and an optical member-side projection portion 229 of each optical sheet 220 includes a positioning hole 35 where the positioning pin 34 is inserted. The positioning pin 34 projects from a bottom surface of a restricting member-side recessed portion 229 of the restricting member 226 toward the front-surface side in the Z-axis direction (the thickness direction of an optical member 216). The positioning pin 34 has a post-like shape and is disposed substantially at a center of the bottom surface of the restricting member-side recessed portion 228 of the restricting member 226. The positioning hole 35 is through the optical member-side projection portion 229 of each optical sheet 220 in the thickness direction thereof (the Z-axis direction). The positioning hole 35 is a circular hole in a plan view and substantially at a center of each optical member-side projection portion 229. The positioning holes 229 in the optical member-side projection portions 229 are concentric and communicated with each other.

When the optical sheets 220 are placed on a light guide plate 219, the restricting member 226 is inserted in each optical sheet-side through hole 220H (the through hole 223) and each optical member-side projection portion 229 is fit in the restricting member-side recessed portion 228 and the positioning pin 34 is inserted in the positioning holes 35. Accordingly, the optical sheets 220 are doubly positioned with respect to the direction along a plate surface of the optical sheets 220 and the optical sheets 220 are less likely to be rotated. Therefore, warping or wrinkles is less likely to be generated on each of the optical sheets 220 and unevenness in brightness is less likely to be caused.

According to the present embodiment, as described before, the restricting member 226 has the restricting member-side recessed portion 228 and the positioning pin 34 projecting from the restricting member-side recessed portion 228 in the thickness direction of the optical sheet (optical member) 220. The optical sheet 220 includes the optical member-side projection portion 229 and the positioning hole 35 where the positioning pin 34 is inserted through the optical member-side projection portion 229 in the thickness direction. According to such a configuration, when the restricting member 226 is inserted through the through hole 223, the optical member-side projection portions 229 are fit in the restricting member-side recessed portion 228 and the positioning pin 34 is inserted in the positioning hole 35 so that the optical sheets 220 are doubly positioned.

Fourth Embodiment

A fourth embodiment of the present technology will be described with reference to FIGS. 10 to 13. The fourth embodiment differs from the second embodiment in that arrangement and the number of restricting member-side recessed portions 328 and optical member-side projection portions 329. Similar configurations, operations, and effects to the second embodiment will not be described.

Figure 10:
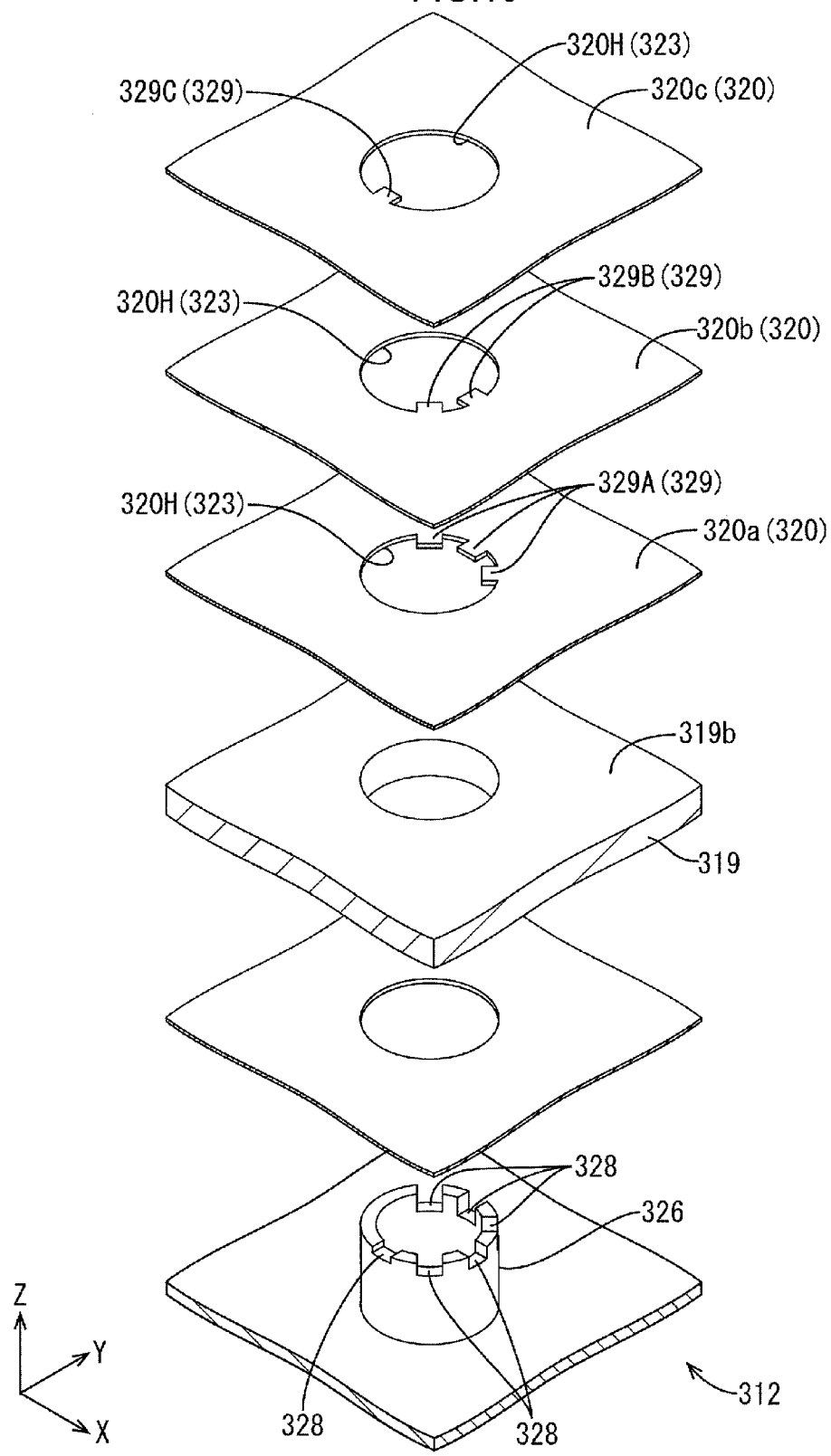
FIG. 10 is an exploded perspective view of optical members and a restricting member according to a fourth embodiment of the present technology.
Figure 11:
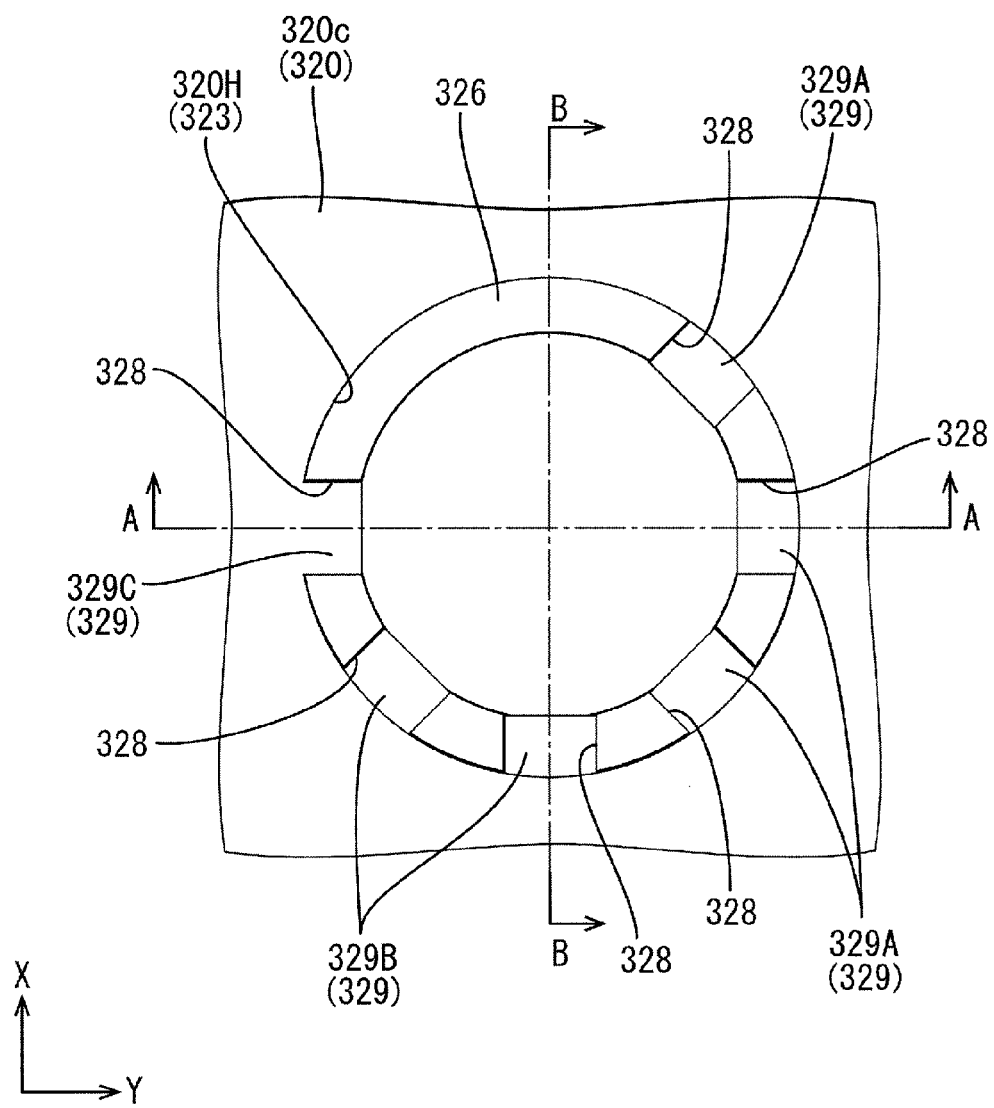
FIG. 11 is a plan view illustrating a planar configuration of the through hole and the restricting member.

As illustrated in FIGS. 10 and 11, each of optical sheets 320 has different arrangement and a different number of optical member-side projection portions 329 according to the present embodiment. Specifically, among the optical sheets 320, a diffuser sheet 320a includes three optical member-side projection portions 329, and a first prism sheet 320b includes two optical member-side projection portions 329, and a second prism sheet 320c includes one optical member-side projection portion 329. According to such a configuration, each of the optical sheets 320 is easily identified based on the number and the arrangement of the optical member-side projection portions 329. Therefore, the optical sheets 320 are less likely to be layered in a wrong order in a mounting process. The six optical member-side projection portions 329 included in the optical sheets 320 in total are arranged at an interval and adjacent to each other in a circumferential direction of an optical sheet-side through hole 320H. Namely, the optical member-side projection portions 329 are not overlapped each other and each interval between the adjacent optical member-side projection portions 329 is substantially equal. Hereinafter, if the optical member-side projection portions 329 are distinguished from each other, "A" is added to the numeral applied to the optical member-side projection portions of the diffuser sheet 320a, "B" is added to the numeral applied to the optical member-side projection portions of the first prism sheet 320b, and "C" is added to the numeral applied to the optical member-side projection portion of the second prism sheet 320c. The optical member-side projection portions are generally represented by the numeral without alphabets.

Figure 12:
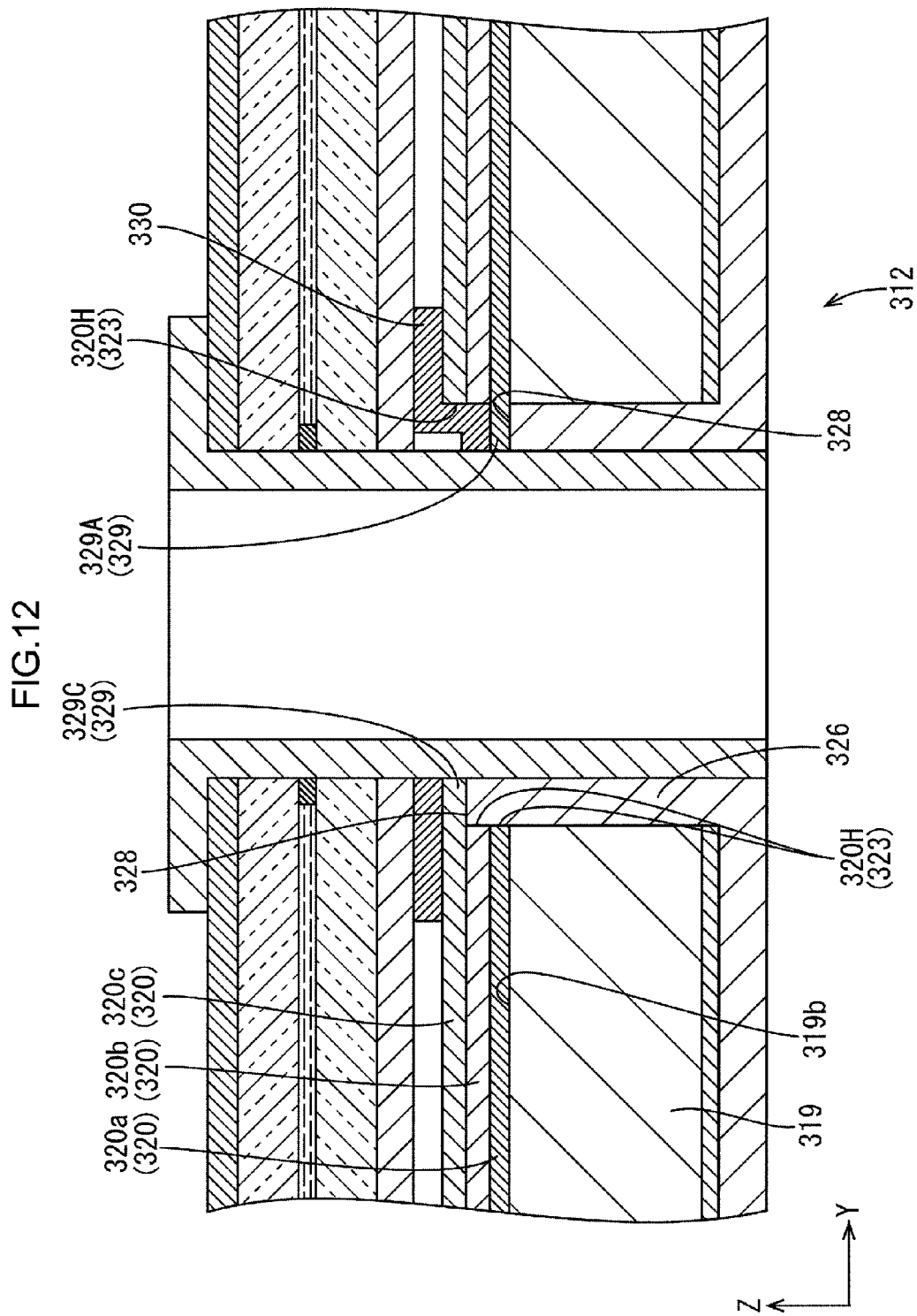
FIG. 12 is a cross-sectional view taken along line A-A in FIG. 11.
Figure 13:
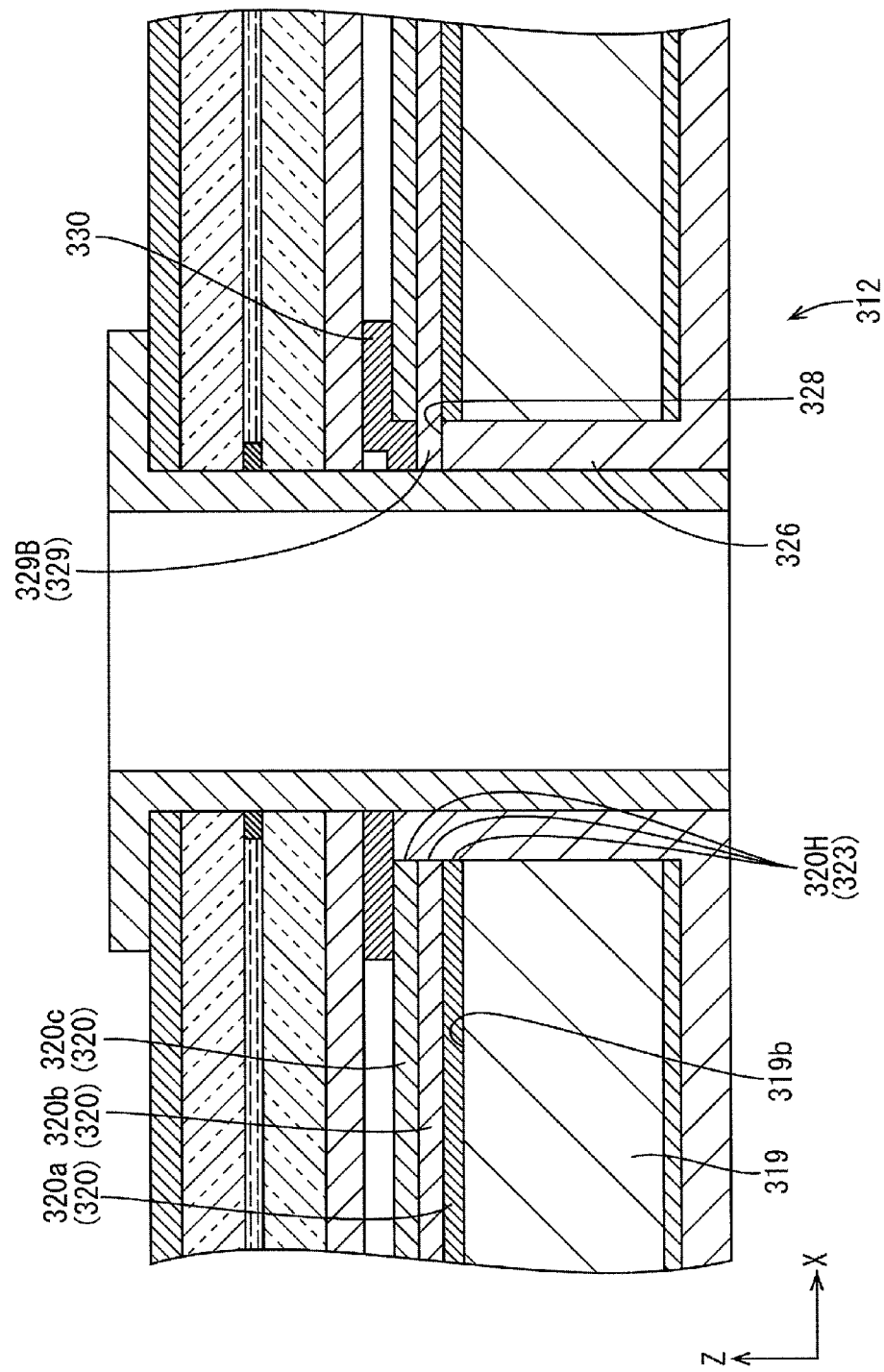
FIG. 13 is a cross-sectional view taken along line B-B in FIG. 11.

The restricting member 326 has six restricting member-side recessed portions 328 that are arranged at intervals with respect to a circumferential direction thereof. The intervals between adjacent restricting member-side recessed portions 328 are substantially equal to each other. As illustrated in FIGS. 12 and 13, the six restricting member-side recessed portion 328 have different depth dimensions depending on the position thereof. Specifically, the three restricting member-side recessed portions 328 that receive the three optical member-side projection portions 329A of the diffuser sheet 320a have a greatest depth dimension and have bottom surfaces that are on a same plane as a light exit surface 319b of a light guide plate 319. The two restricting member-side recessed portions 328 that receive the two respective optical member-side projection portions 329B of the first prism sheet 320b have a second greatest depth dimension. The restricting member-side recessed portion 328 that receives the optical member-side projection portion 329C of the second prism sheet 320c has a smallest depth dimension. With such a configuration, portions of a fixing tape 330 adhered to the respective optical member-side projection portions 329A, 329B of the diffuser sheet 320a and the first prism sheet 320b are recessed further than portions of the fixing tape 330 adhered to the restricting member 326 and the second prism sheet 320c, respectively.

As described before, according to the present embodiment, the optical sheets (the optical members) 320 are layered on each other and differ from each other in at least one of the number of, a planar shape of, and a planar arrangement of the optical member-side projection portions 329. Accordingly, at least one of the number, the planar shape, and the planar arrangement of the optical member-side projection portions 329 differs in every optical sheet 320 and therefore, each of the optical sheets 320 can be easily identified. Accordingly, the optical sheets 320 are less likely to be layered in a wrong order in a process of manufacturing backlight devices 312.

Fifth Embodiment

A fifth embodiment of the present technology will be described with reference to FIGS. 14 to 18. In the fifth embodiment, arrangement and the number of restricting member-side recessed portions 428 and optical member-side projection portions 429 are altered from those in the fourth embodiment. Similar configurations, operations, and effects to the fourth embodiment will not be described.

Figure 14:
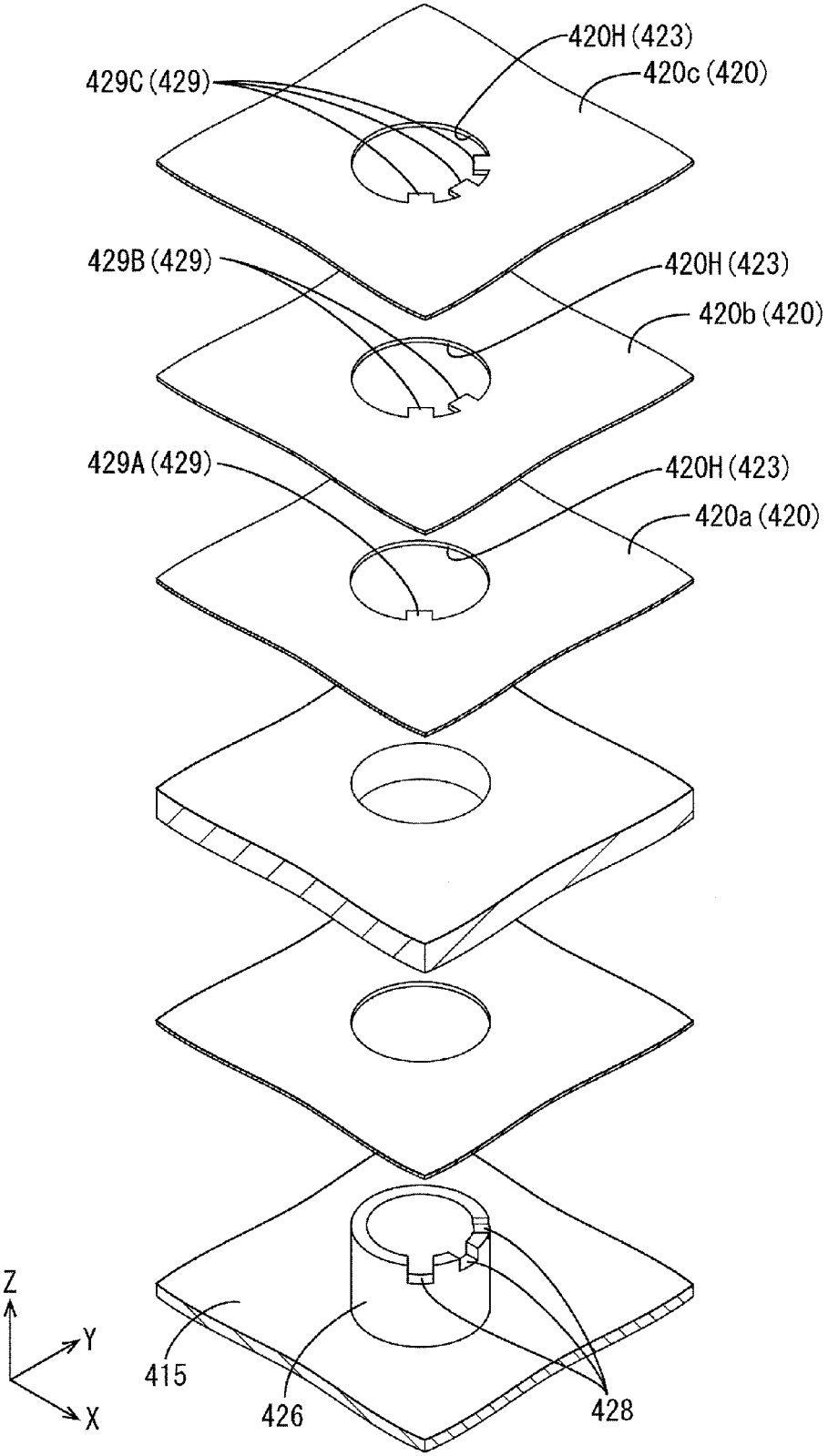
FIG. 14 is an exploded perspective view of optical members and a restricting member according to a fifth embodiment of the present technology.
Figure 15:
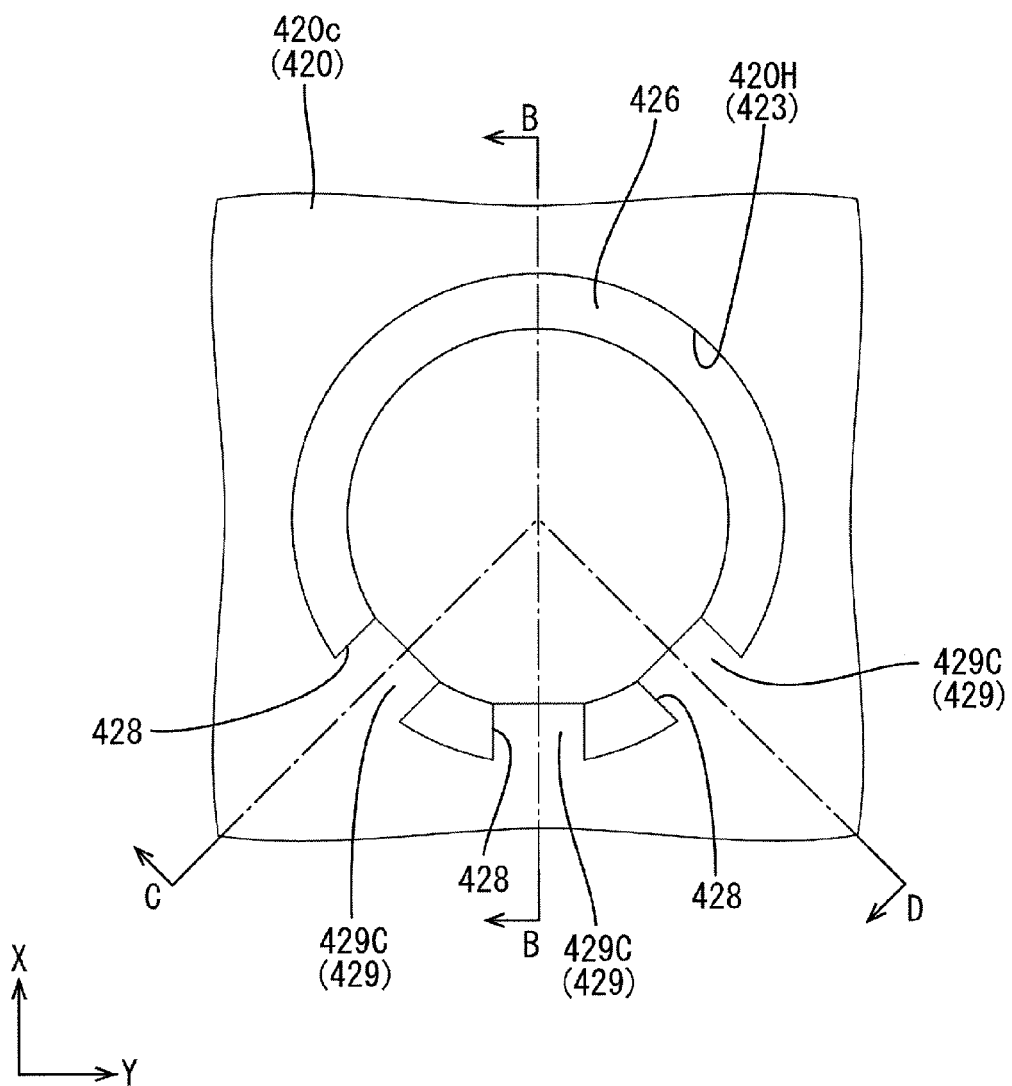
FIG. 15 is a plan view illustrating a planar configuration of the through hole and the restricting member.

As illustrated in FIGS. 14 and 15, among optical sheets 420 of the present embodiment, a diffuser sheet 420a includes an optical member-side projection portion 429A, a first prism sheet 420b includes two optical member-side projection portions 429B, and a second prism sheet 420c includes three optical member-side projection portions 429C. The optical sheets 420 are arranged such that the optical member-side projection portions 429 are arranged asymmetrically with respect to an asymmetric line passing through a center of an optical sheet-side through hole 420H (a through hole 423) and parallel to the Y-axis direction. As described in the first embodiment, the optical sheet-side through hole 420H is formed in the optical sheets 420 to be closer to a side opposite to the LEDs (not illustrated) from a middle portion of the optical sheets 429 with respect to the Y-axis direction (refer FIG. 2). If the optical sheets 420 are turned over with respect to front-rear surfaces thereof in mounting the optical sheets 420 and the optical sheet-side through hole 420H is fit to the restricting member 426, the optical member-side projection portions 429 are not fit in the restricting member-side recessed portions 428. The optical member-side projection portions 429 are in contact with the restricting member 426 and the optical sheets 420 are not mounted in a lighting device correctly. Accordingly, the optical sheets 420 are less likely to be mounted erroneously in the lighting device with being turned over with respect to the front-rear surfaces.

Figure 16:
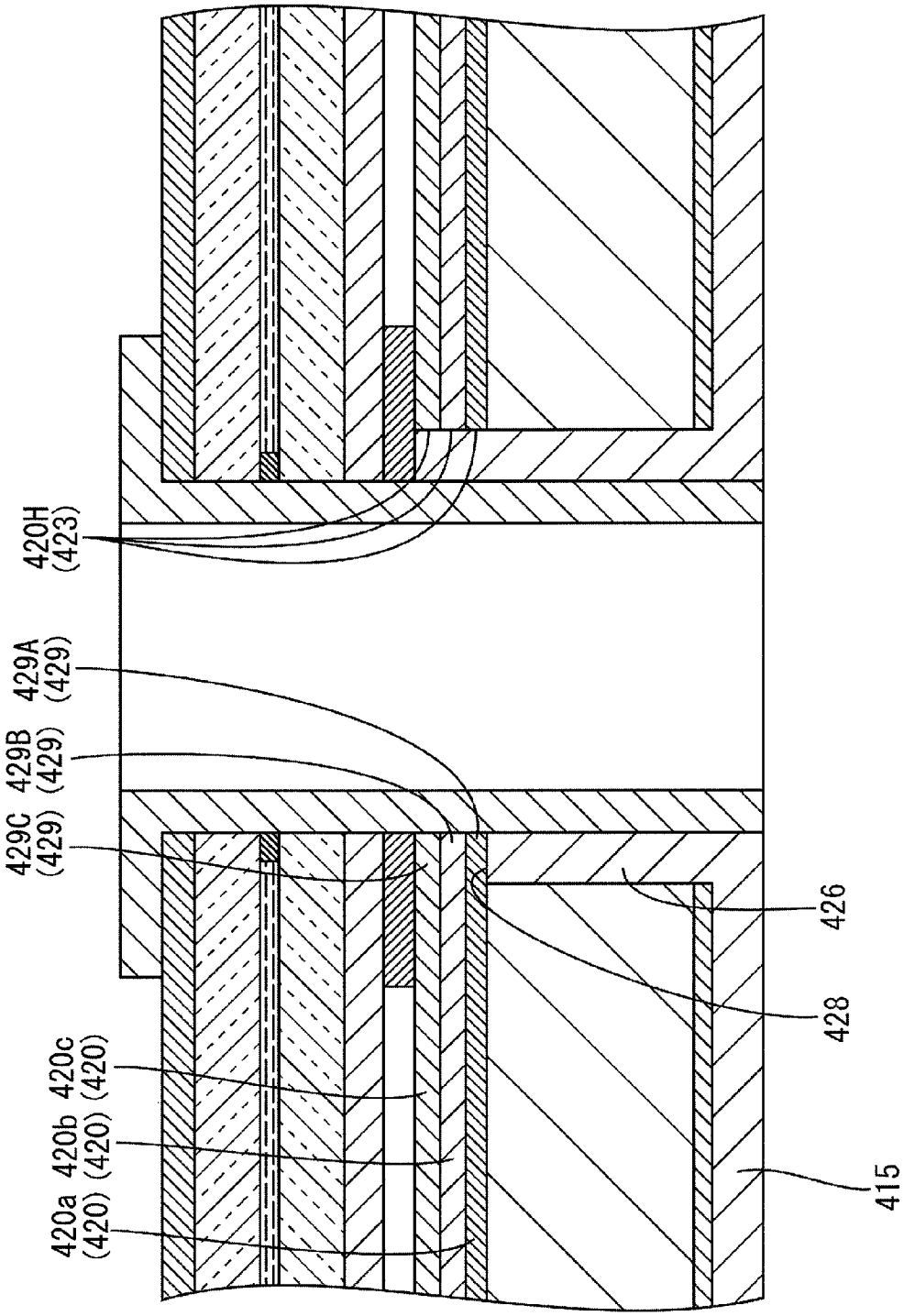
FIG. 16 is a cross-sectional view taken along line C-B in FIG. 15.
Figure 17:
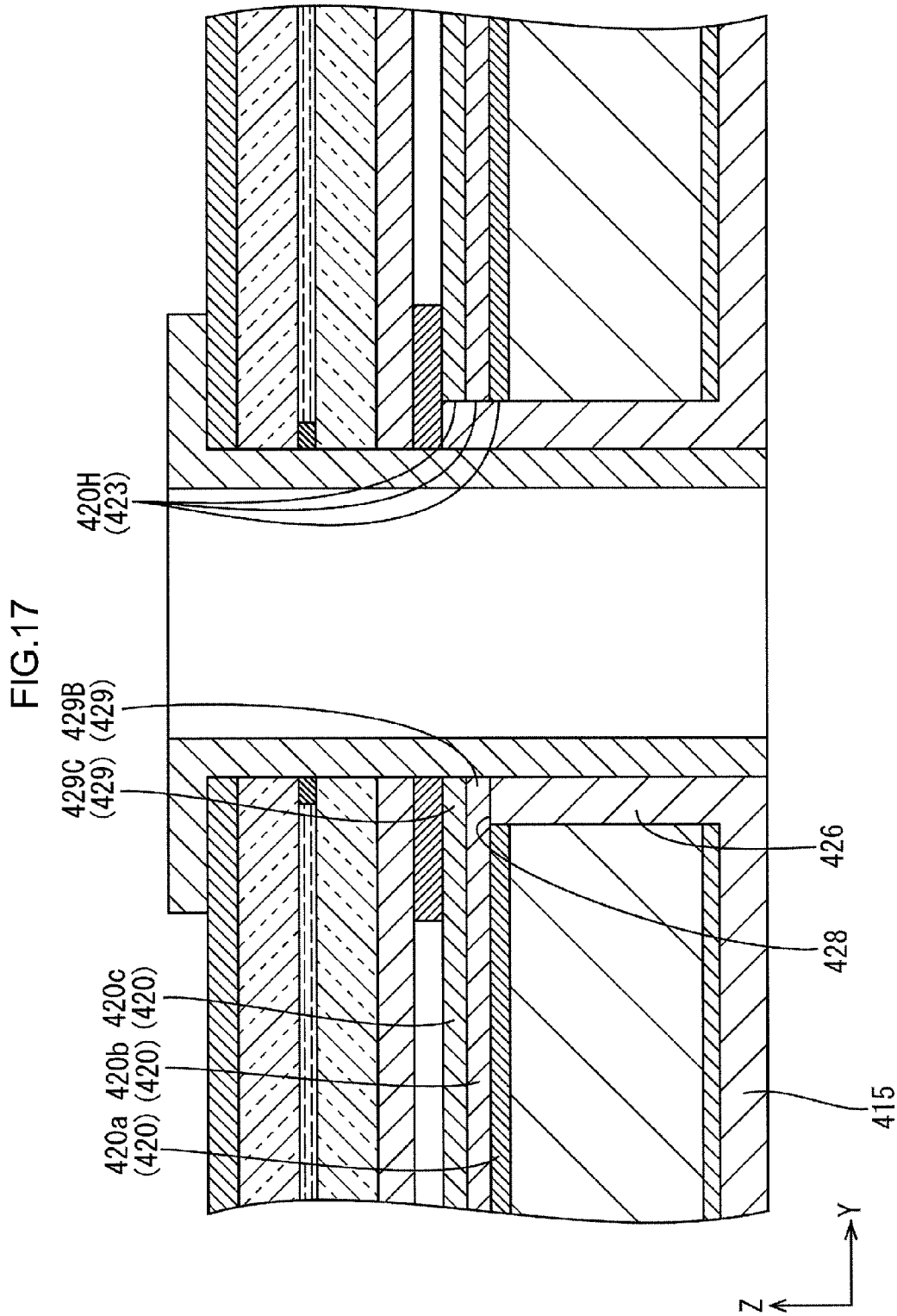
FIG. 17 is a cross-sectional view taken along line B-B in FIG. 15.
Figure 18:
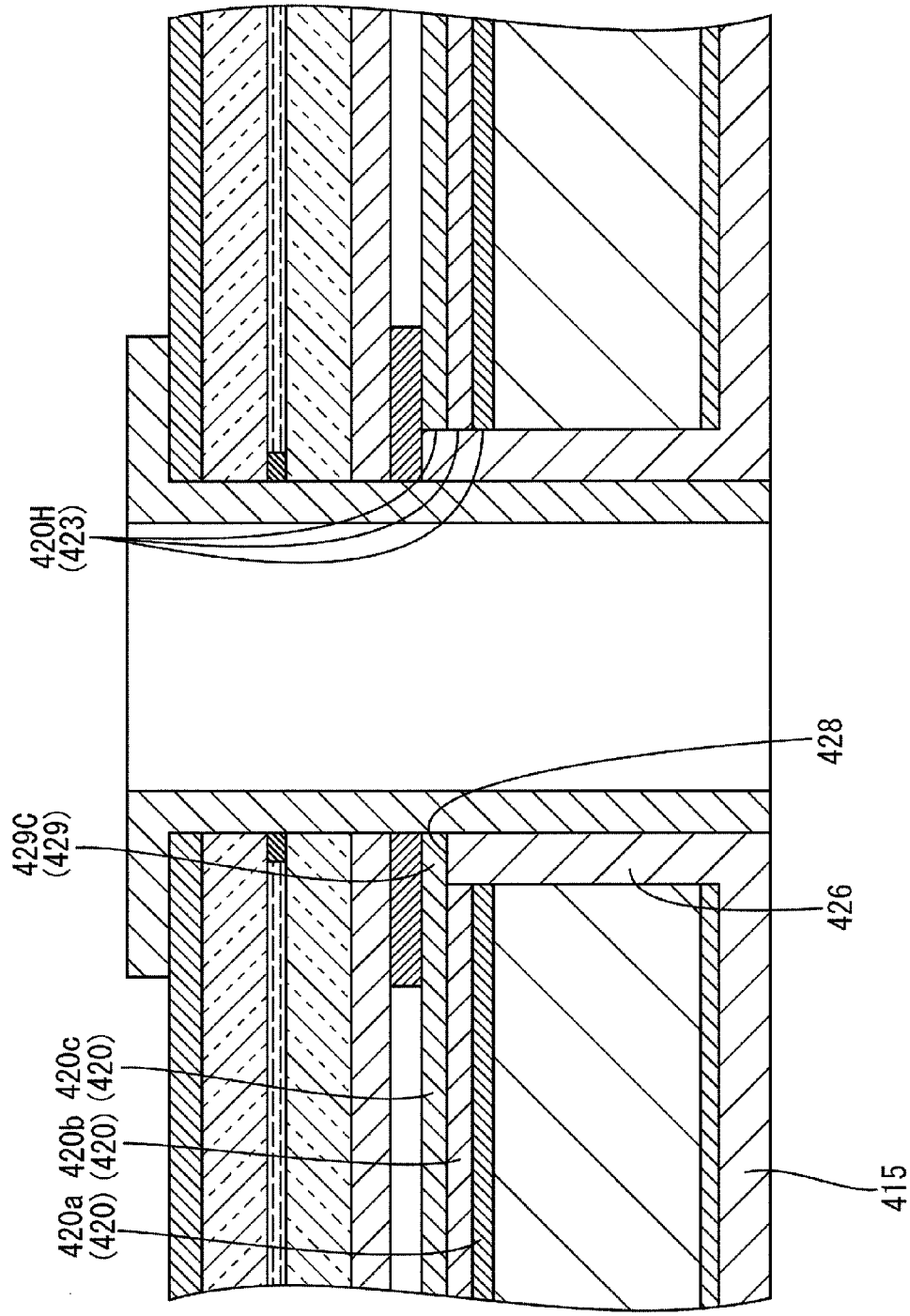
FIG. 18 is a cross-sectional view taken along line D-B in FIG. 15.

As illustrated in FIGS. 16 to 18, some of the optical member-side projection portions 429 of the optical sheets 420 are overlapped each other. Specifically, the optical member-side projection portion 429A of the diffuser sheet 420a overlaps one of the two optical member-side projection portions 429B of the first prism sheet 420b and one of the three optical member-side projection portions 429C of the second prism sheet 420c. The two optical member-side projection portions 429B of the first prism sheet 420b overlap two of the three optical member-side projection portions 429C of the second prism sheet 420c. A restricting member 426 includes three restricting member-side recessed portions 428 disposed at intervals in a circumferential direction thereof. The three optical member-side projection portions 429 of the respective three optical sheets 420 are overlapped each other and the overlapped three optical member-side projection portions 429 are commonly fit in one of the three restricting member-side recessed portions 428. The two optical member-side projection portions 429 of the first prism sheet 420b and the second prism sheet 420c are overlapped each other and the overlapped two optical member-side projection portions 429 are commonly fit in another one of the three restricting member-side recessed portions 428. One of the optical member-side projection portions 429C of the second prism sheet 420c does not overlap the optical member-side projections 429 of other optical sheets 420 and the non-overlapped optical member-side projection portion 429C is fit in the other one of the three restricting member-side recessed portions 428. Thus, the restricting member 426 of the present embodiment includes the smaller number of restricting member-side recessed portions 428 compared to the fourth embodiment and the shape of the restricting member 426 is simplified. Therefore, the restricting member 426 and the chassis 415 are easily manufactured.

As described before, according to the present embodiment, the optical sheets (the optical member) 420 are overlapped each other and some of the optical member-side projection portions 429 included in the optical sheets 420 are disposed on a same plane. The optical member-side projection portions 429 that are disposed on the same plane are commonly fit in one of the restricting member-side recessed portions 428 of the restricting member 426. Accordingly, the restricting member-side recessed portions 428 include one that commonly receives the optical member-side projection portions 429 that are disposed on the same plane so that the configuration of the restricting member 426 is less likely to be complicated. Therefore, the restricting member 426 is easily manufactured.

The optical sheets 420 include the optical member-side projection portions 429 asymmetrically with respect to an asymmetric line passing through a center of the optical sheet-side through hole 420H (the through hole 423). Accordingly, if the optical sheets 420 are mounted with being turned over with respect to the front and rear surfaces, the optical member-side projection portions 429 may not be fit in the restricting member-side recessed portions 428. Therefore, the optical sheets 420 are less likely to be mounted erroneously with being turned over with respect to the front and rear surfaces.

Sixth Embodiment

A sixth embodiment of the present technology will be described with reference to FIGS. 19 to 21. The sixth embodiment includes a stopper portion 36 in a restricting member 526 instead of the fixing tape of the first embodiment. Similar configurations, operations, and effects to the first embodiment will not be described.

Figure 19:
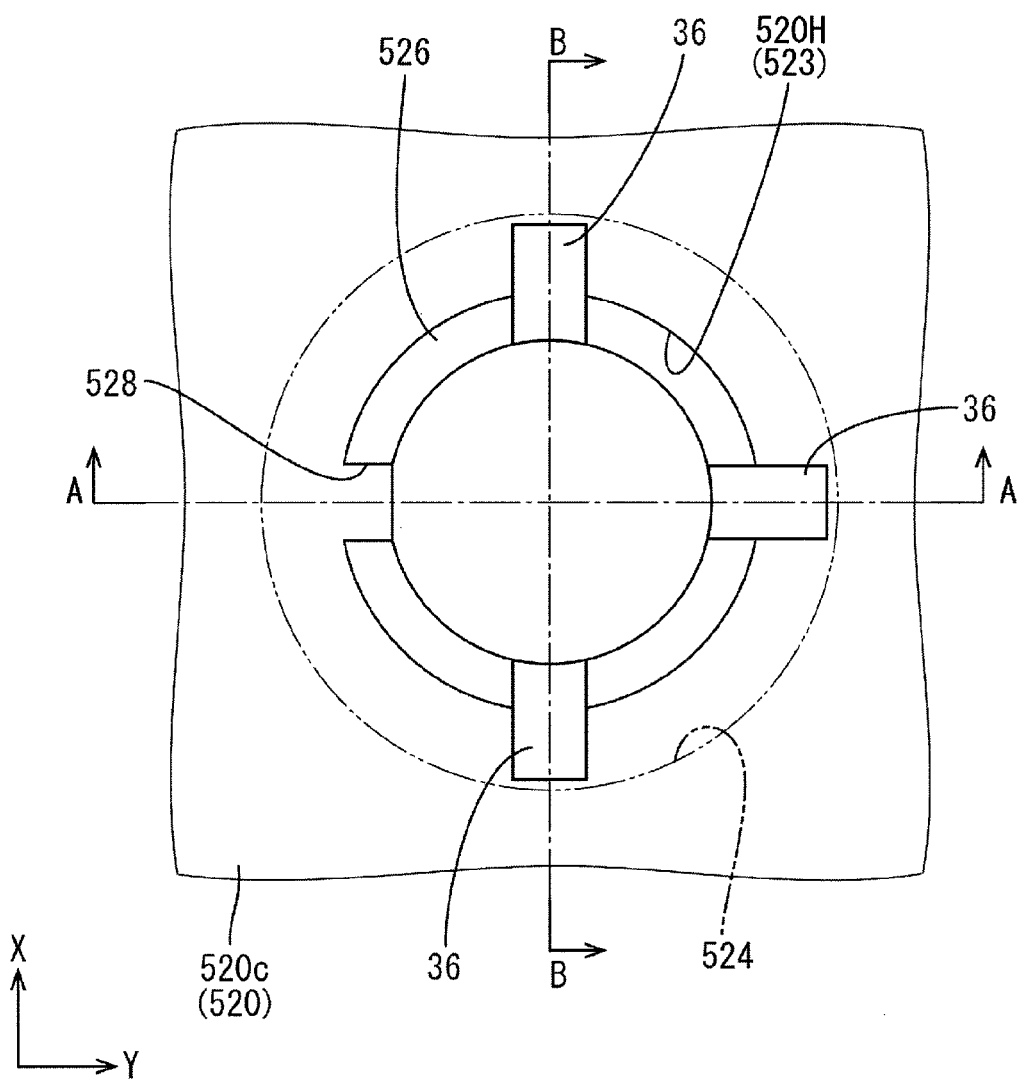
FIG. 19 is a plan view illustrating a planar configuration of a through hole and a restricting member according to a sixth embodiment of the present technology.
Figure 20:
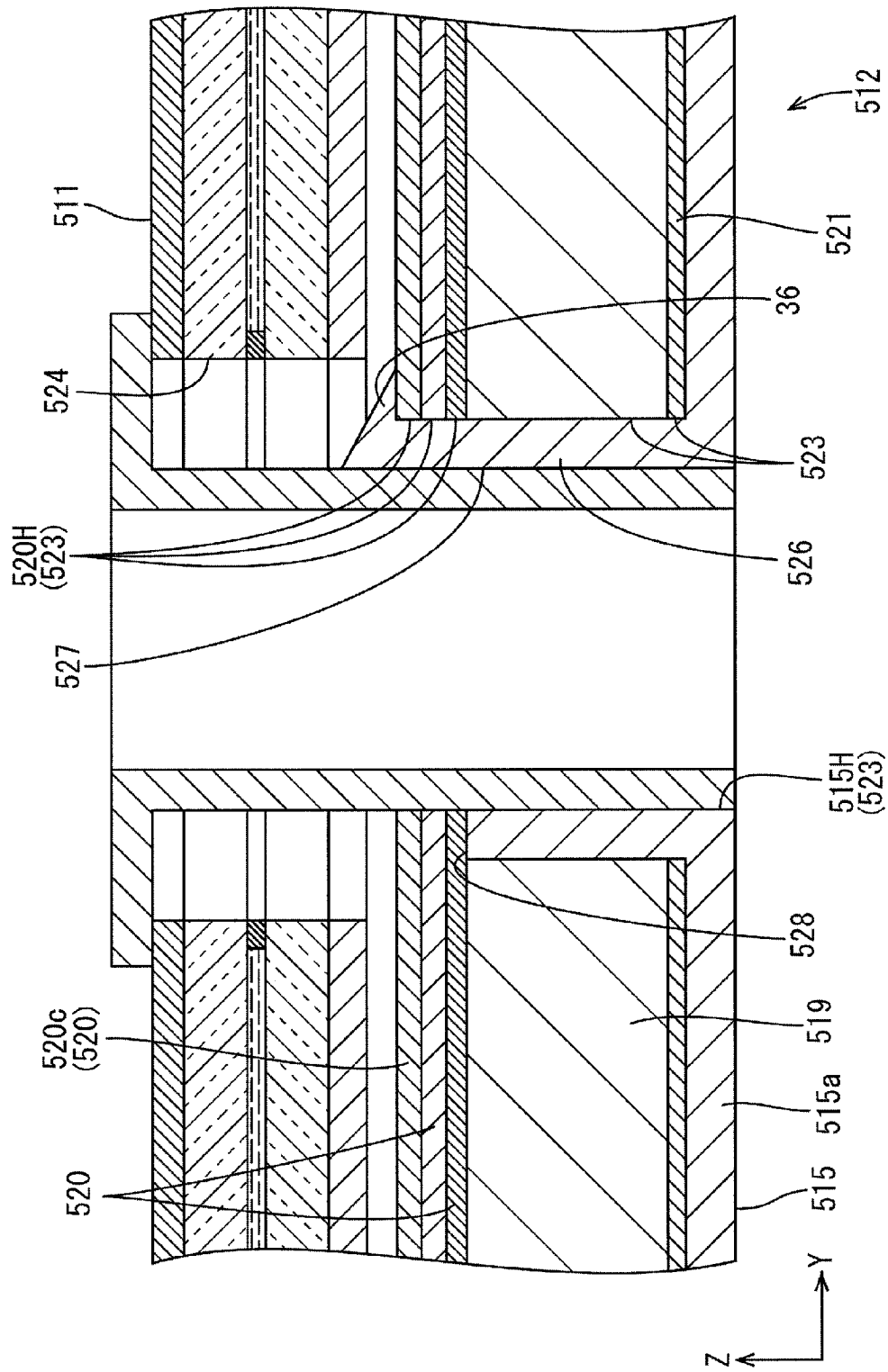
FIG. 20 is a cross-sectional view taken along line A-A in FIG. 19.
Figure 21:
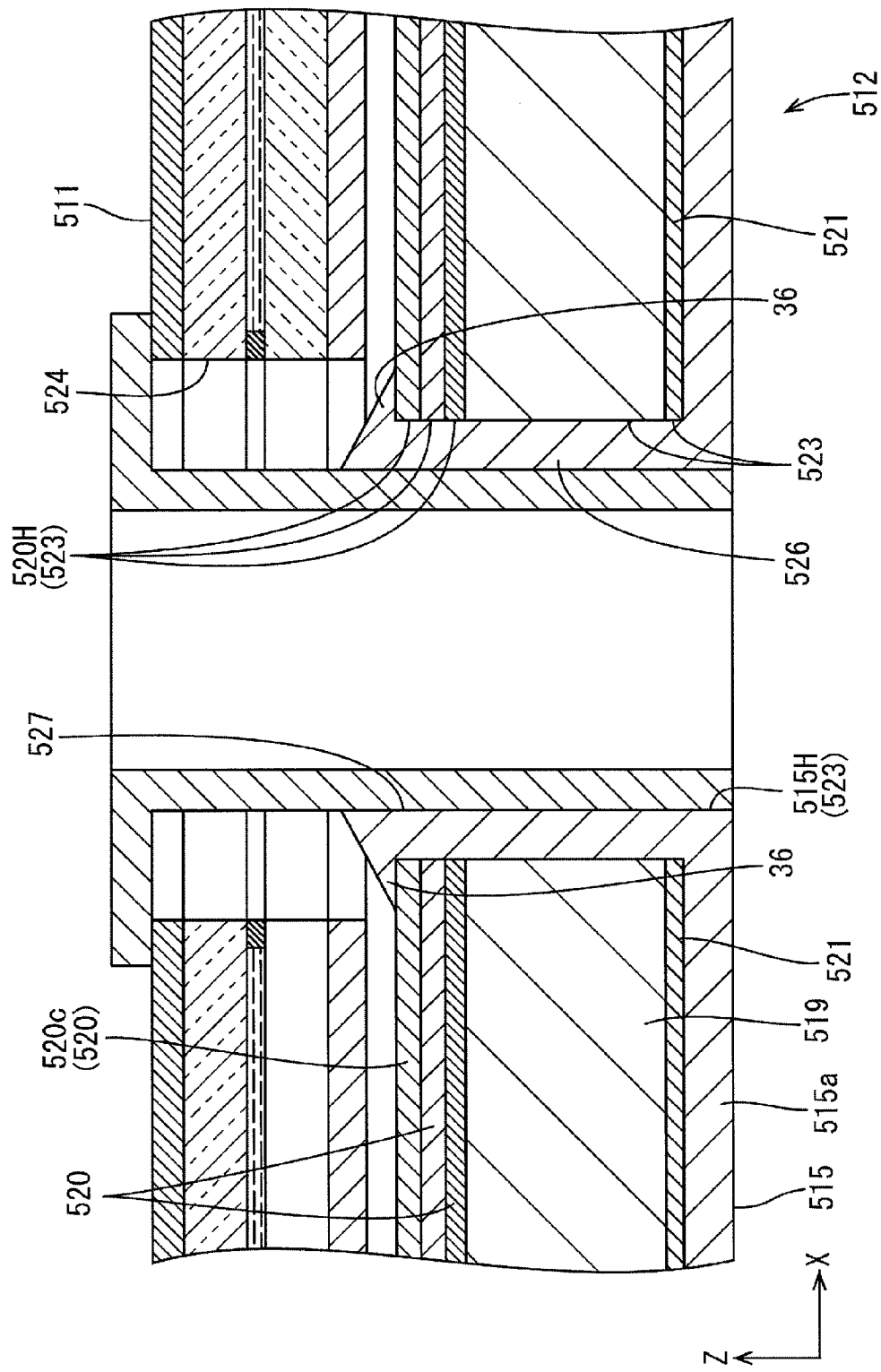
FIG. 21 is a cross-sectional view taken along line B-B in FIG. 19.

As illustrated in FIGS. 19 to 21, the restricting member 526 of the present embodiment integrally includes the stopper portion 36. The stopper portion 36 is stopped by a hole edge portion around the optical sheet-side through hole 520H (a through hole 523) of an optical sheet 520 from a front-surface side (a light exit side). Accordingly, the number of parts and the number of mounting steps may be reduced compared to that in the first embodiment. The restricting member 526 extends from a bottom plate portion 515a of a chassis 515 and includes the stopper portion 46 at an extended distal end portion thereof. The stopper portion 46 projects outward from an outer peripheral surface of the restricting member 526. The restricting member 526 includes three stopper portions 36. One of the stopper portions 36 is away from a restricting member-side recessed portion 528 at an angle interval of approximately 180 degrees. The other two of the stopper portions 36 are away from the restricting member-side recessed portion 528 at an angle interval of approximately 90 degrees. Each of the stopper portions 36 is stopped by an hole edge portion around the optical sheet-side through hole 520H of a second prism sheet 520c that is closest to the front surface. The stopper portions 36 are stopped by the hole edge portion from a front-surface side. Accordingly, the optical sheets 20 that are layered on each other, the light guide plate 519, and the reflection sheet 521 are fixed. The liquid crystal panel 511 includes a panel-side through hole 524 in an area of the backlight device 512 overlapping the through hole 523 and the stopper portions 36. In FIG. 19, the panel-side through hole 524 is illustrated by a two-dot chain line.

As described before, the present embodiment includes the chassis (the support member) 515 supporting the optical sheets (the optical member) from a side opposite to the light exit side, and the chassis 515 includes the chassis-side through hole (the support member-side through hole) 515H that is communicated with the through hole 523. The restricting member 526 has a communication hole 527 and the chassis 515 includes the restricting member 526 such that the communication hole 527 is communicated with the chassis-side through hole 515H. The fixing member is the stopper member 36 that is included in the restricting member 526 and stopped by the hole edge portion around the optical sheet-side through hole 520H (the through hole 423) of the optical sheets 520 from the light exit side. According to such a configuration, the optical sheets 520 are supported by the chassis 515 from the side opposite to the light exit side, and the stopper member 36, which is the fixing member included in the restricting member 526 of the chassis 514, is stopped by the hole edge portion around the optical sheet-side through hole 520H from the light exit side to fix the optical sheets 520. The number of parts is reduced and the number of mounting steps in manufacturing the backlight device 512 is reduced compared to a configuration that the fixing member is provided separately from the restricting member 526. Thus, a manufacturing cost is reduced.

Seventh Embodiment

A seventh embodiment of the present technology will be described with reference to FIGS. 22 to 24. The seventh embodiment includes the configuration of the first embodiment, a frame 37, and a restricting member 626 that is a separate component from a chassis 615. Similar configurations, operations, and effects to the first embodiment will not be described.

Figure 22:
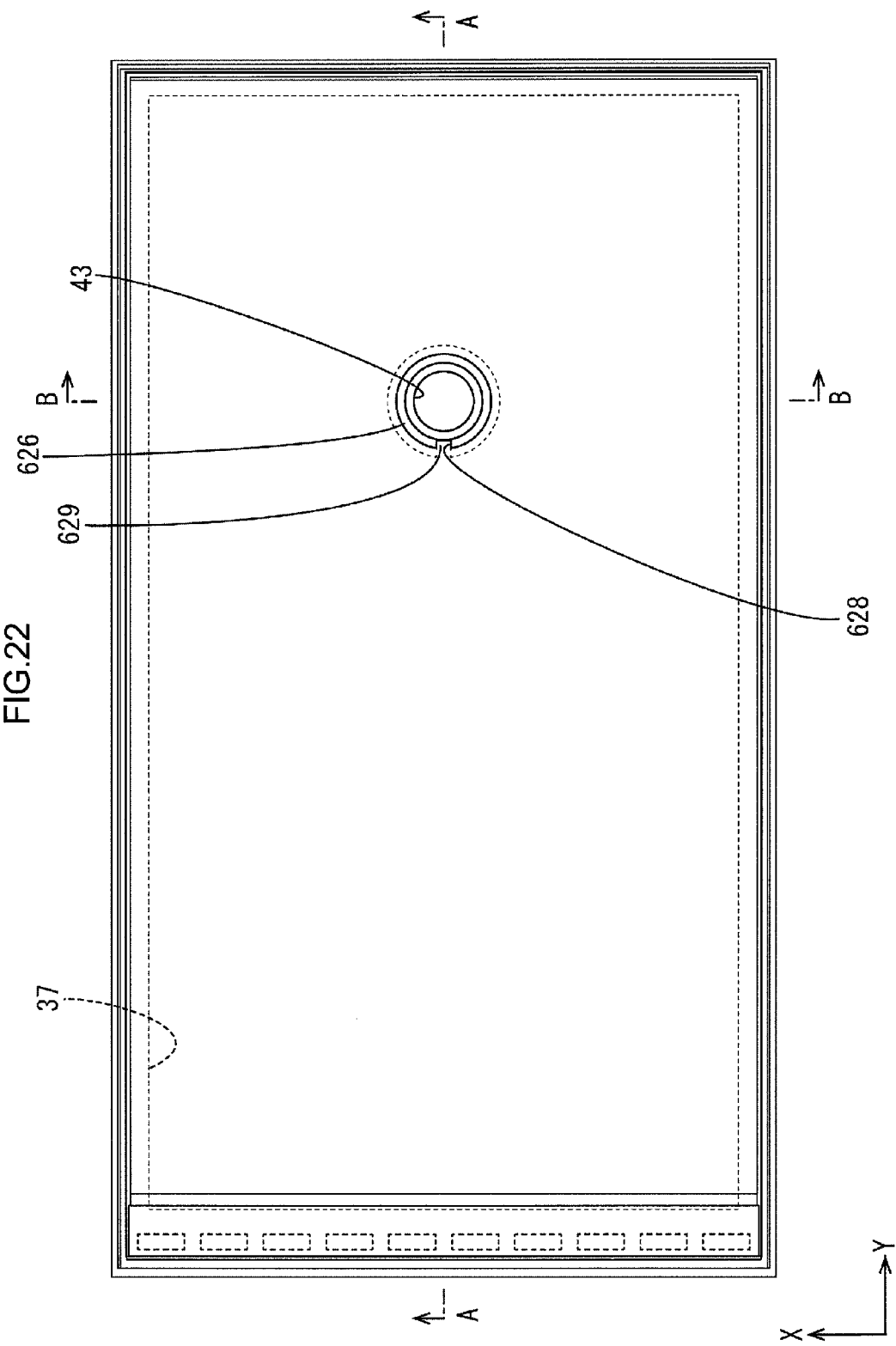
FIG. 22 is a plan view of a backlight device according to a seventh embodiment of the present technology.
Figure 23:
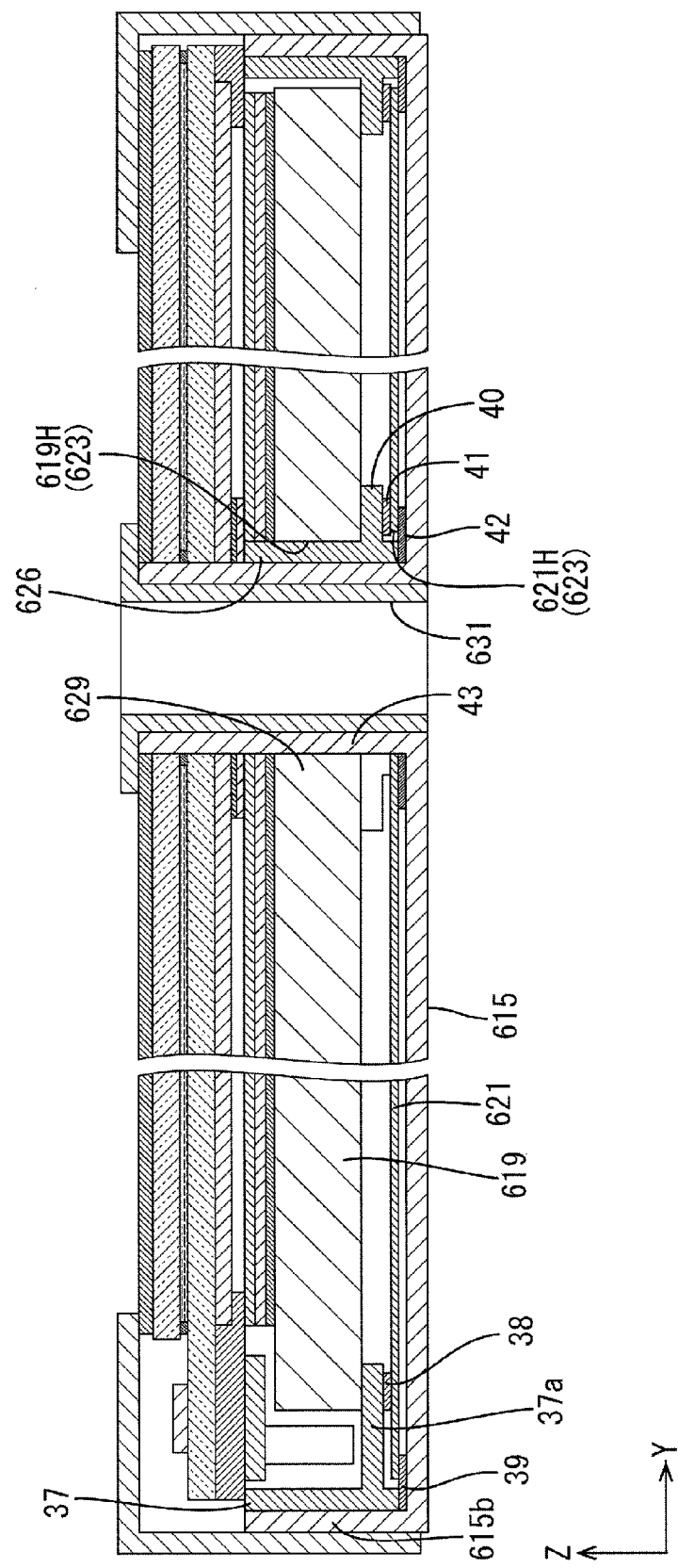
FIG. 23 is a cross-sectional view taken along line A-A in FIG. 22.
Figure 24:
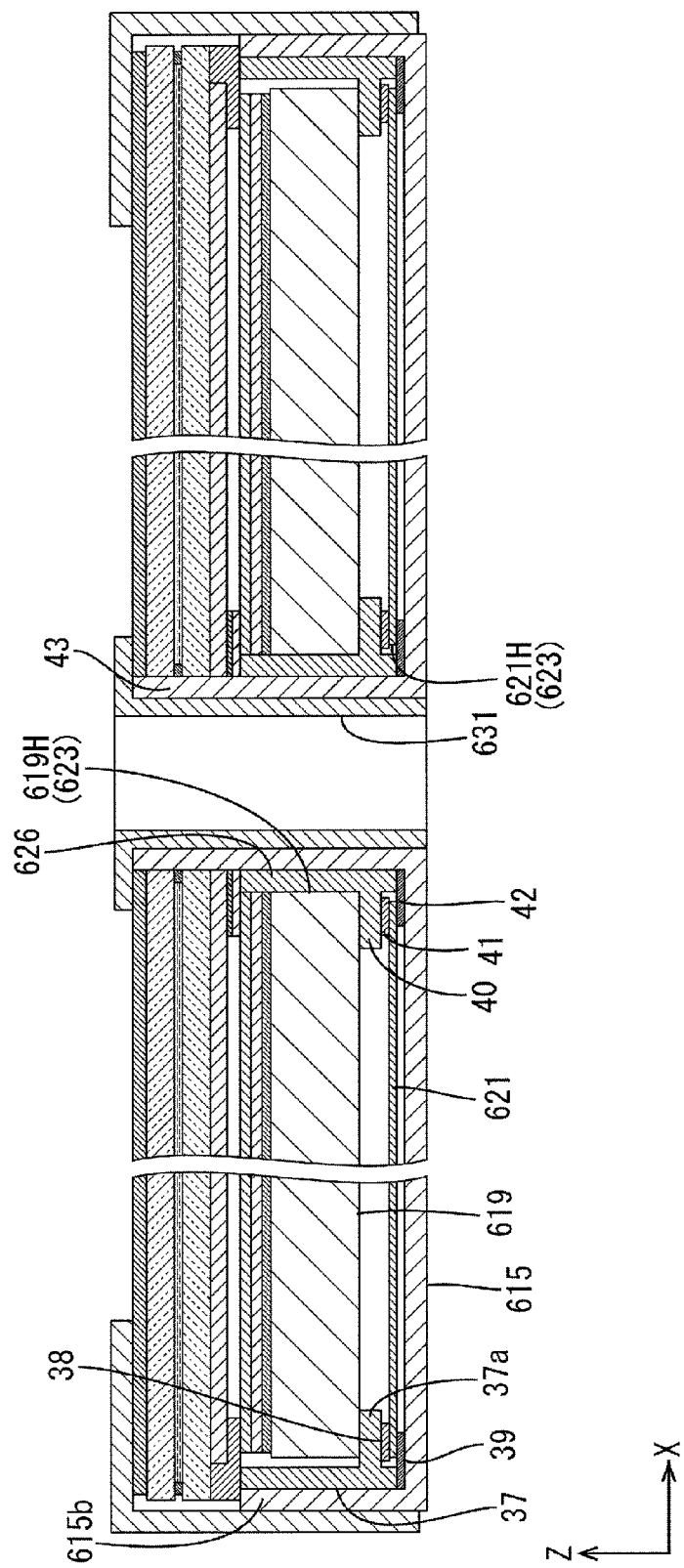
FIG. 24 is a cross-sectional view taken along line B-B in FIG. 22.

The frame 37 is made of synthetic resin and, as illustrated in FIGS. 22 to 24, the frame 37 is a rectangular frame having an outer shape smaller than that of the chassis 615 and greater than that of the light guide plate 619. The frame 37 is arranged within the chassis 615 and is surrounded by four side plate portions 615b and surrounds the light guide plate 619 from an outer peripheral side thereof. The frame 37 includes a light guide plate support portion 37a that extends from an inner surface of the frame 37 and supports the light guide plate 619 from the rear-surface side. The light guide plate support portion 37a has a frame shape similar to the frame 37 and supports the light guide plate 619 at an entire periphery thereof from the rear-surface side. A first reflection sheet fixing tape 38 is provided on a rear surface (opposite side to the light guide plate 619 side) of the light guide plate support portion 37a. A reflection sheet 621 is fixed by the first reflection sheet fixing tape 38. The first reflection sheet fixing tape 38 includes a base member having a frame shape similar to the light guide support portion 37a and an adhesive material disposed on both surfaces of the base member.

The restricting member 626 is made of synthetic resin similarly to the frame 27 and is a separate component from the chassis 615. The restricting member 626 includes a restricting member-side recessed portion 628 and has a substantially tubular shape as a whole. The restricting member 626 includes a light guide plate hole edge support portion 40 that projects outward from an outer peripheral surface thereof and supports a hole edge portion around a light guide plate-side through hole 619H (the through hole 623) of the light guide plate 619 from the rear-surface side. The light guide plate hole edge support portion 40 has substantially a flange shape and supports a portion of the hole edge portion in the light guide plate 619 excluding an optical member-side projection portion 629 from the rear-surface side. A second reflection sheet fixing tape 41 is provided on a rear surface of the light guide plate hole edge support portion 40 and the second reflection sheet fixing tape 41 fixes the hole edge portion around the reflection sheet-side through hole of the reflection sheet 621. The second reflection sheet fixing tape 41 includes a substantially ring-shaped base member and an adhesive material disposed on both surfaces of the base member. A second chassis fixing tape 42 is provided on a rear surface-side with respect to the restricting member 626 to fix the restricting member 626 and the reflection sheet 621 to the chassis 615. The second chassis fixing tape 42 includes a substantially ring-shaped base member and an adhesive material disposed on both surfaces of the base member. The chassis 615 includes a restricting member mounting tubular portion 43 for receiving the restricting member 626. The restricting member mounting tubular portion 43 has a tubular shape smaller than that of the restricting member 626. The restricting member 626 is on an outer peripheral side with respect to the restricting member mounting tubular portion 43 and a cap member 631 is on an inner peripheral side with respect to the restricting member mounting tubular portion 43.

Eighth Embodiment

An eighth embodiment of the present technology will be described with reference to FIGS. 25 and 26. In the eighth embodiment, a restricting member 726 has a height dimension different from that of the first embodiment. Similar configurations, operations, and effects to the first embodiment will not be described.

Figure 25:
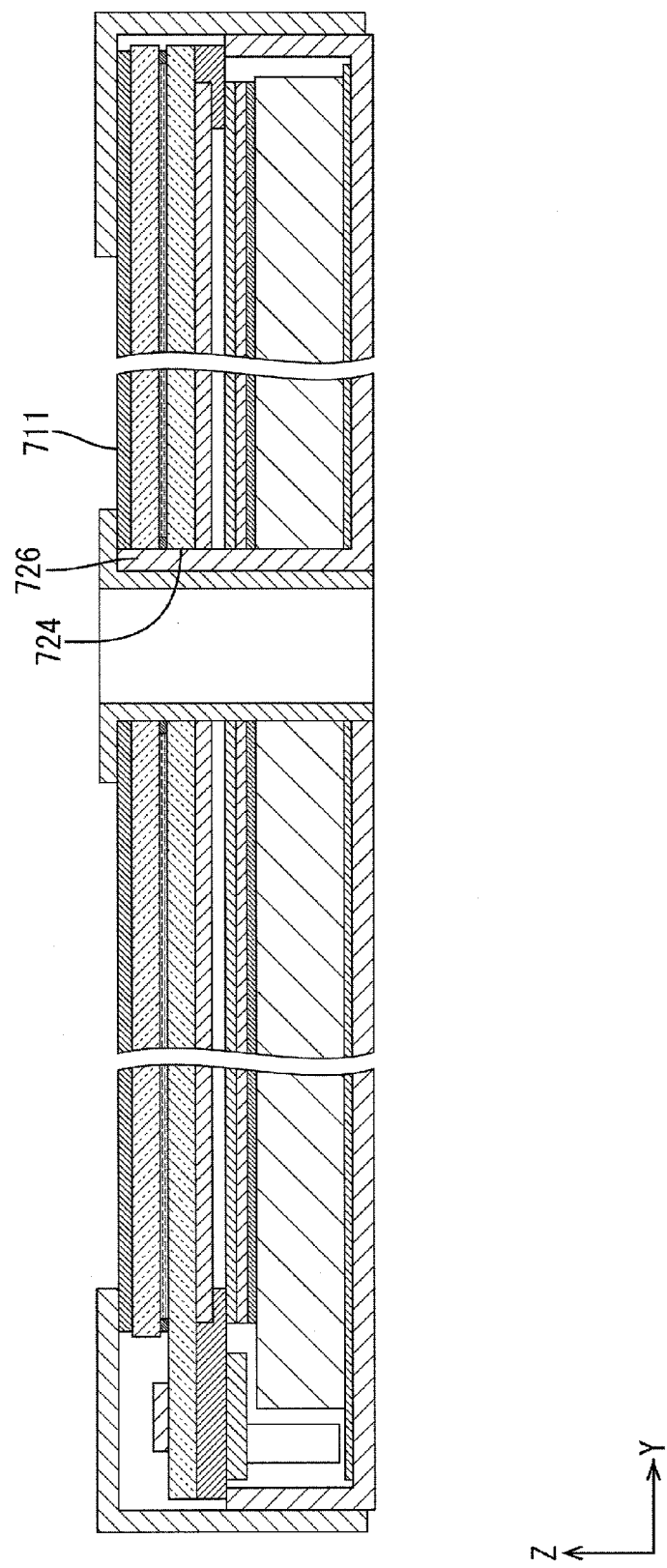
FIG. 25 is a cross-sectional view of a liquid crystal display device according to an eighth embodiment of the present technology taken along a long-side direction thereof.
Figure 26:
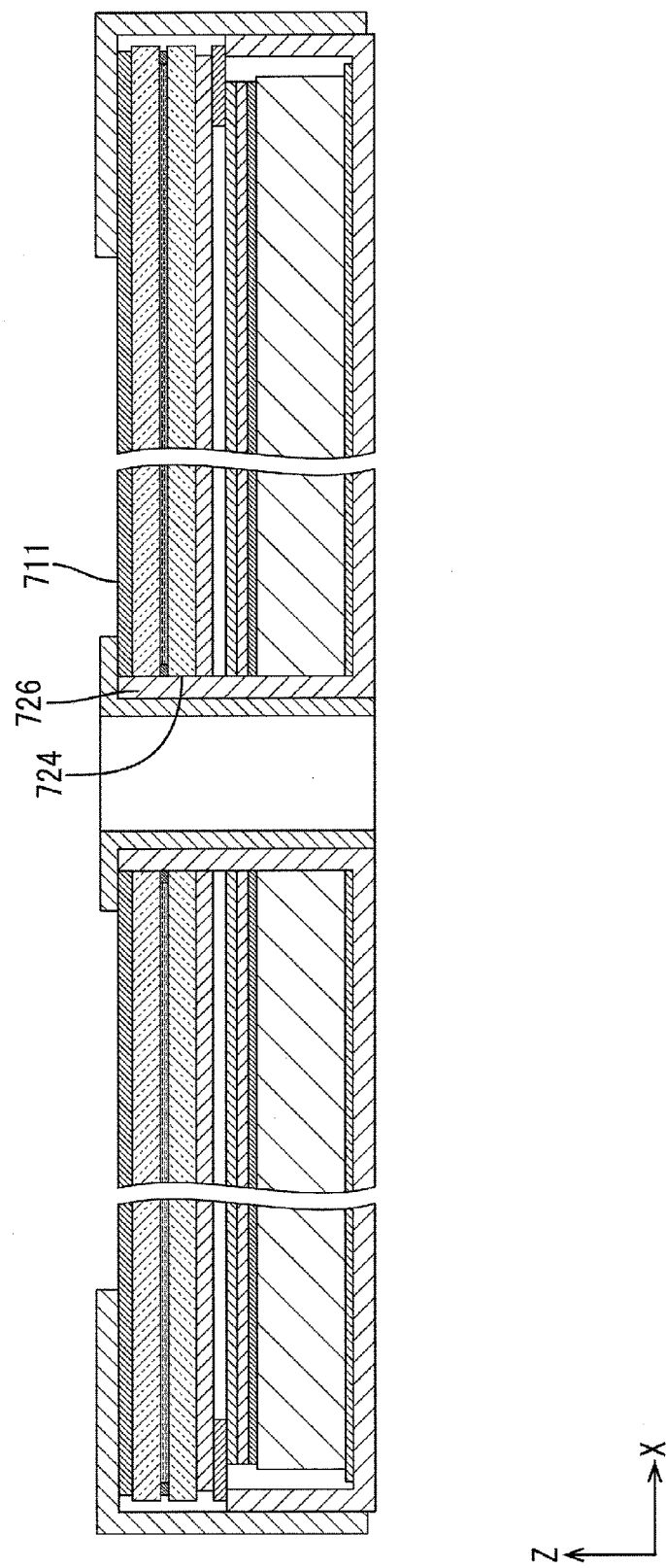
FIG. 26 is a cross-sectional view of the liquid crystal display device taken along a short-side direction thereof.

As illustrated in FIGS. 25 and 26, the restricting member 726 has an extended distal end portion that is inserted in a panel-side through hole 724 of a liquid crystal panel 711. Specifically, the restricting member 726 has a height dimension such that the extended distal end portion is substantially on a same plane as a front-side plate surface of the liquid crystal panel 711. A fixing tape is not described in the present embodiment.

Ninth Embodiment

A ninth embodiment of the present technology will be described with reference to FIGS. 27 and 28. The ninth embodiment includes a restricting member-side recessed portion 828 that is formed in an area different from that of the first embodiment. Similar configurations, operations, and effects to the first embodiment will not be described.

Figure 27:
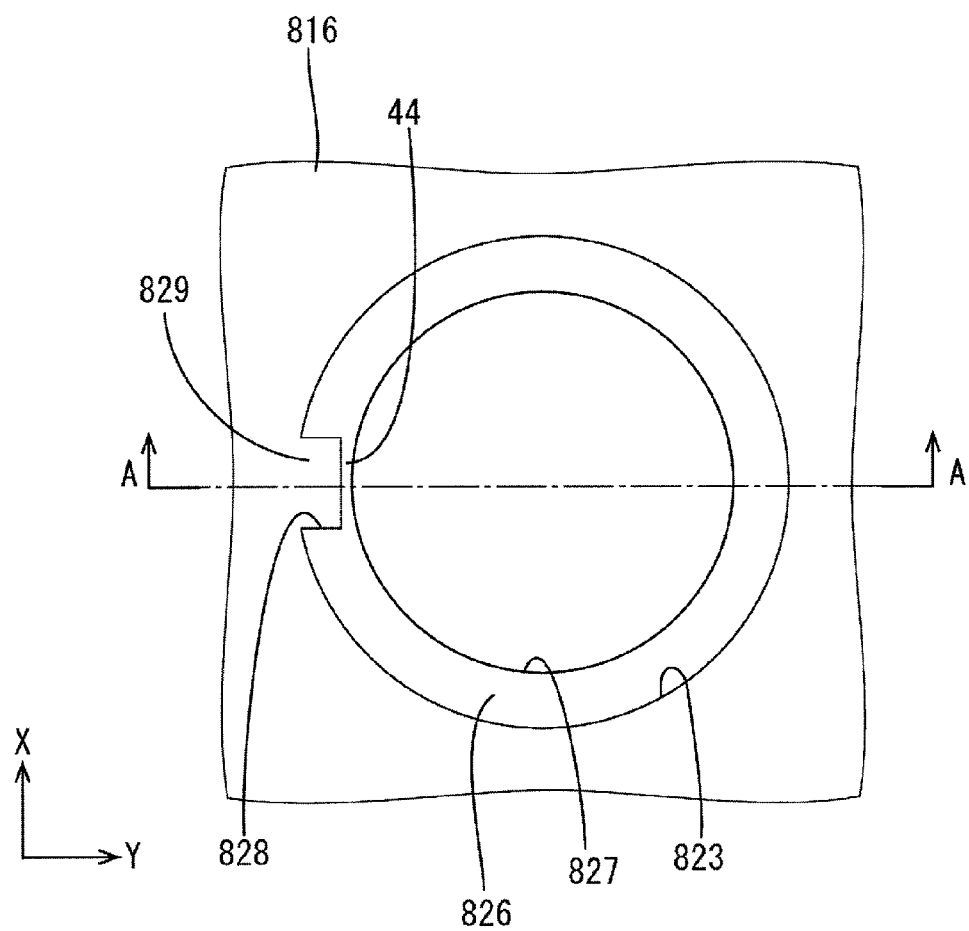
FIG. 27 is a plan view illustrating a planar configuration of a through hole and a restricting member according to a ninth embodiment of the present technology.
Figure 28:
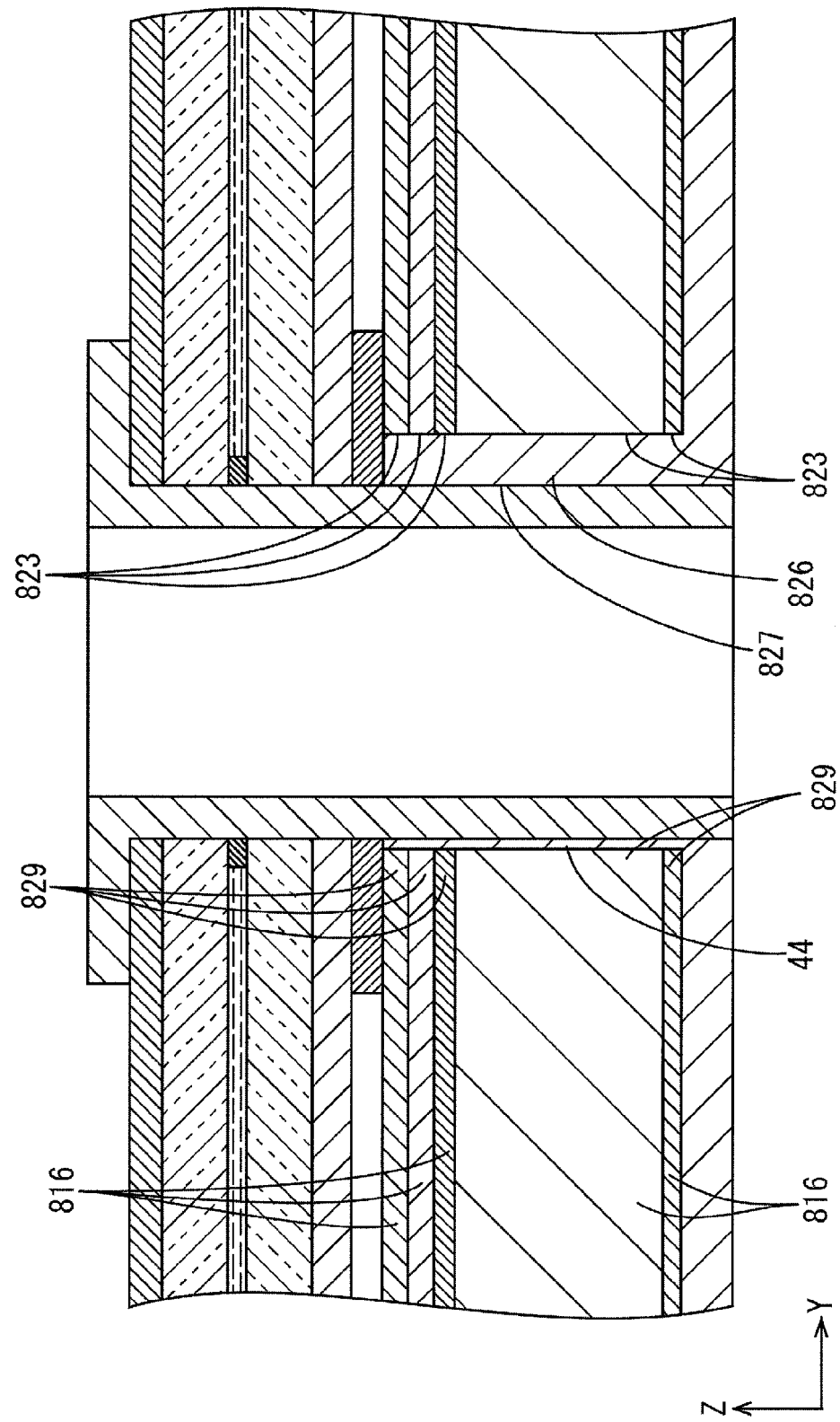
FIG. 28 is a cross-sectional view taken along line A-A in FIG. 27.

As illustrated in FIGS. 27 and 28, the restricting member-side recessed portion 828 of the present embodiment is not communicated with a communication hole 827 of the restricting member 826 and has a thin wall portion 44. Thus, the restricting member 826 has an endless ring shape that is not disconnected in a circumferential direction thereof. The thin wall portion 44 has a light blocking property similar to that of other portion of the restricting member 826 (where the restricting member-side recessed portion 828 is not formed) even with having a thickness smaller than that of the other portion of the restricting member 826. With such a configuration, even if light leaks along an inner surface of the through hole 823 of the optical member 816, especially along the optical member-side projection portion 819, the leaking light may be blocked by the thin wall portion 44. Therefore, the leaking light is less likely to leak toward the communication hole 827.

As described before, according to the present embodiment, an optical member 816 includes an optical member-side projection portion 829 and the restricting member 816 includes the restricting member-side recessed portion 828 having the thin wall portion 44. The restricting member-side recessed portion 828 is formed by recessing a part of an outer peripheral surface of the restricting member 826 without having an opening communicating with the communication through hole 827. With such a configuration, the restricting member 826 including the restricting member-side recessed portion 828 has the thin wall portion 44, and therefore, the through hole 824 of the optical member 816 is surrounded by the restricting member 826 over an entire periphery. Thus, light is less likely to leak through the inner surface of the through hole 823 to outside.

Tenth Embodiment

A tenth embodiment of the present technology will be described with reference to FIGS. 29 to 32. According to the tenth embodiment, an optical sheet 920 includes an optical member-side projection portion 929 having a planar shape different from that of the second embodiment. Similar configurations, operations, and effects to the second embodiment will not be described.

Figure 29:
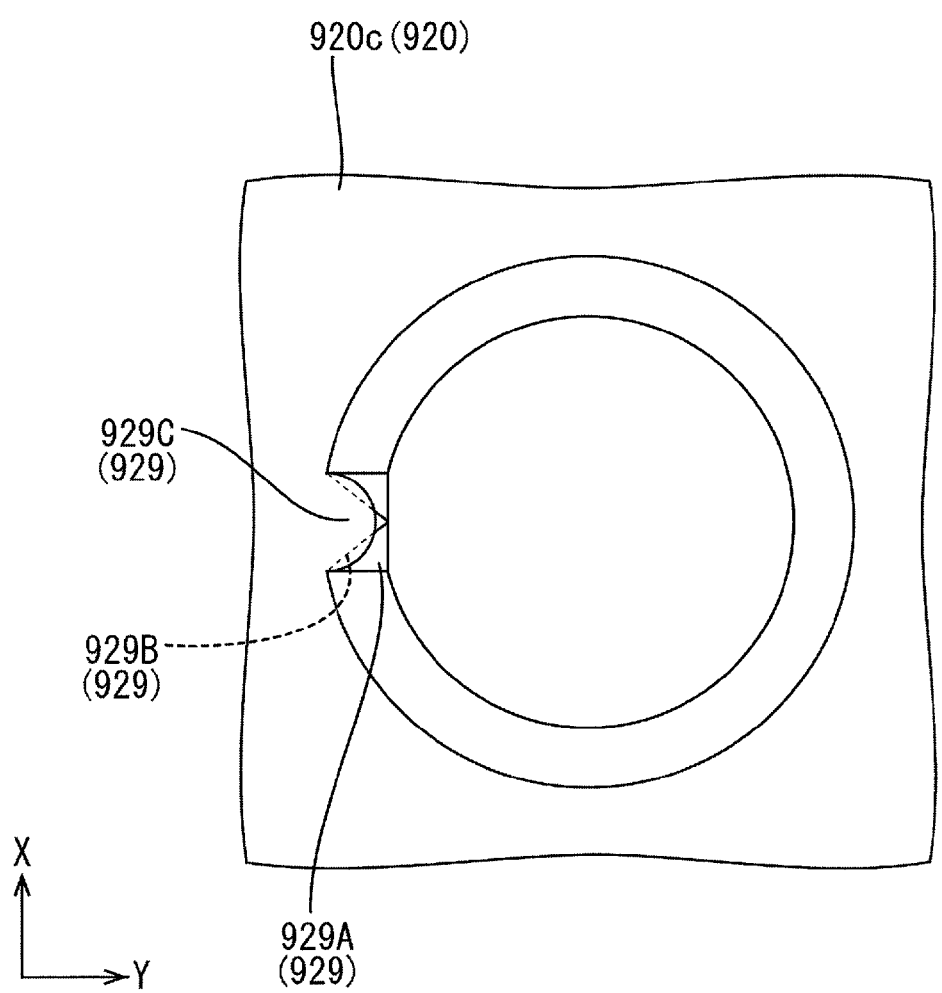
FIG. 29 is a plan view illustrating a planar configuration of a through hole and a restricting member according to a tenth embodiment of the present technology.
Figure 30:
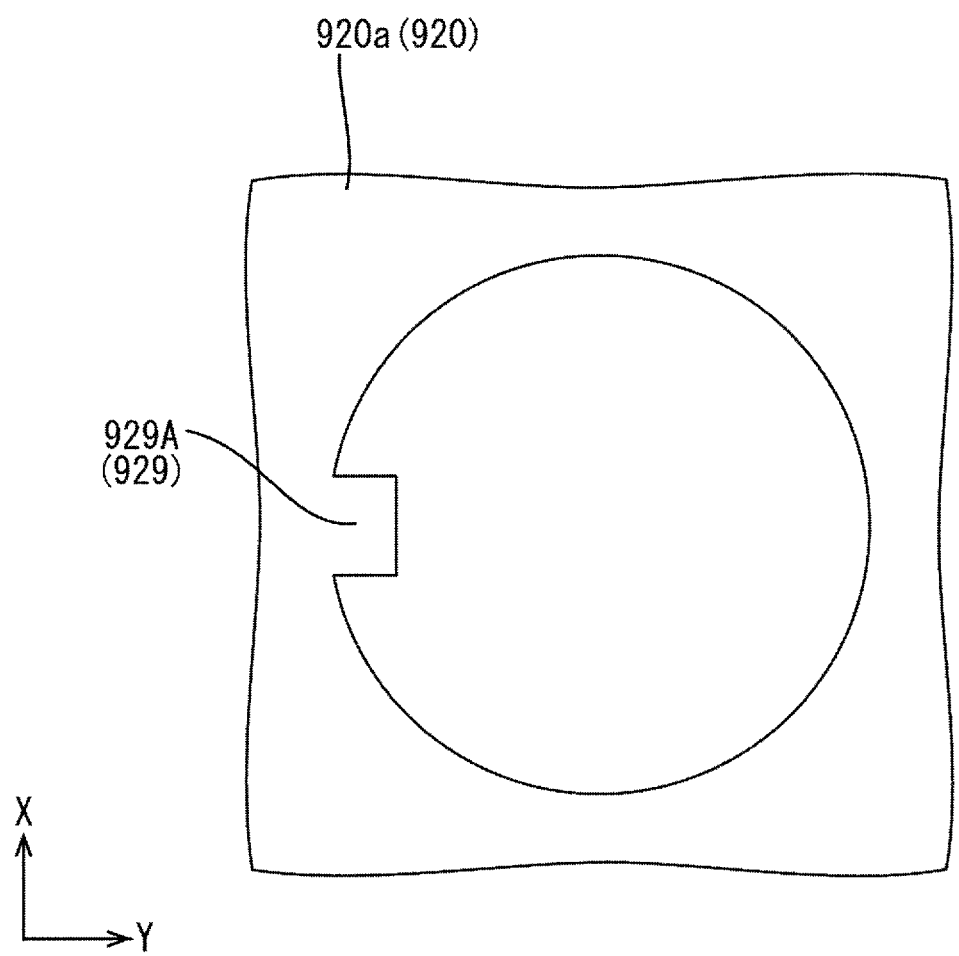
FIG. 30 is a plan view illustrating a planar configuration of an optical sheet-side through hole in a diffuser sheet.
Figure 31:
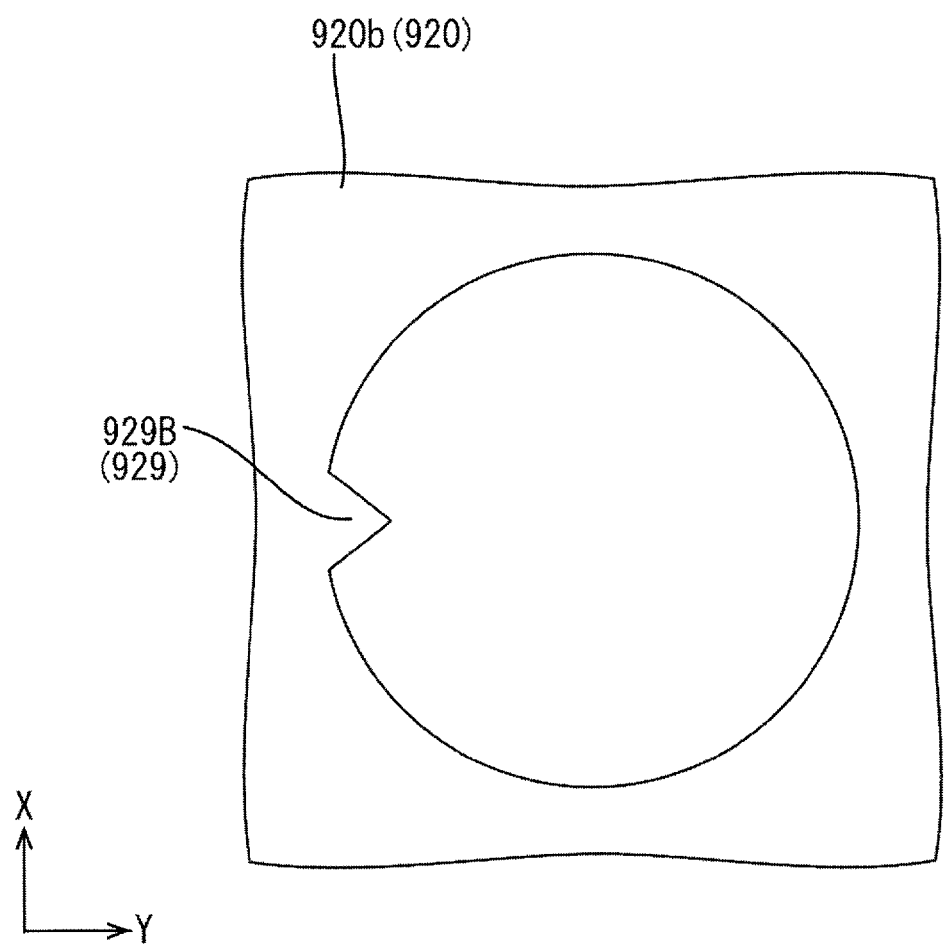
FIG. 31 is a plan view illustrating a planar configuration of the optical sheet-side through hole in a first prism sheet.
Figure 32:
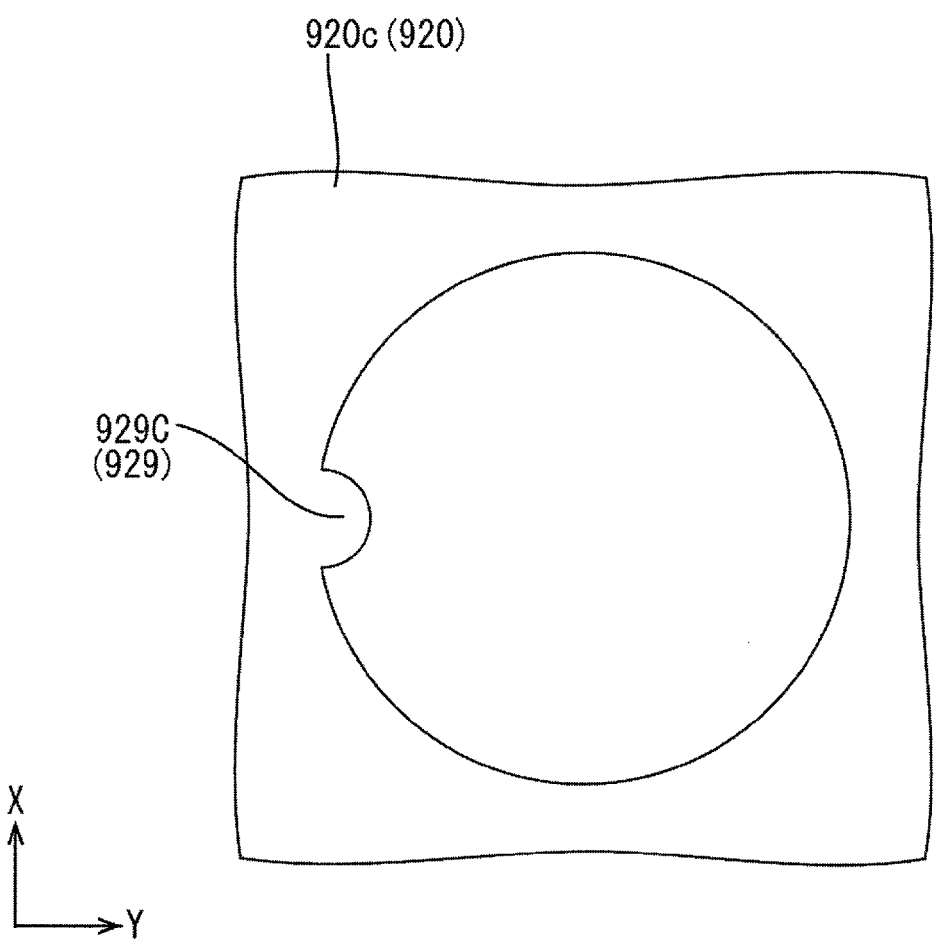
FIG. 32 is a plan view illustrating a planar configuration of the optical sheet-side through hole in a second prism sheet.

As illustrated in FIGS. 29 to 32, the optical sheet 920 of the present embodiment includes optical member-side projection portions 929 having different planar shapes. Hereinafter, if the optical member-side projection portions 929 are distinguished from each other, "A" is added to the numeral applied to the optical member-side projection portion of a diffuser sheet 920a, "B" is added to the numeral applied to the optical member-side projection portion of a first prism sheet 920b, and "C" is added to the numeral applied to the optical member-side projection portion of a second prism sheet 920c. The optical member-side projection portions are generally represented by the numeral without alphabets. As illustrated in FIGS. 29 and 30, the optical member-side projection portion 929A included in the diffuser sheet 920a of the optical sheet 920 has a square plan view shape. As illustrated in FIGS. 29 and 31, the optical member-side projection portion 929A included in the first prism sheet 920b has a triangular plan view shape. As illustrated in FIGS. 29 and 32, the optical member-side projection portion 929A included in the second prism sheet 920c has a semi-circular plan view shape. According to such a configuration, each of the optical sheets 920 can be identified according to a planar shape of the optical member-side projection portion 929. Therefore, the optical sheets 920 are less likely to be layered in a wrong order. Further, as illustrated in FIG. 29, after the optical sheets 920 are layered on each other, a layered order is seen based on the layered optical member-side projection portions 929. Therefore, the layered order can be visually checked after the optical sheets 920 are layered.

Eleventh Embodiment

An eleventh embodiment of the present technology will be described with reference to FIGS. 33 and 34. According to the eleventh embodiment, arrangement of a restricting member-side recessed portion 1028 and an optical member-side projection portion 1029 differs from that of the first embodiment. Similar configurations, operations, and effects to the first embodiment will not be described.

Figure 33:
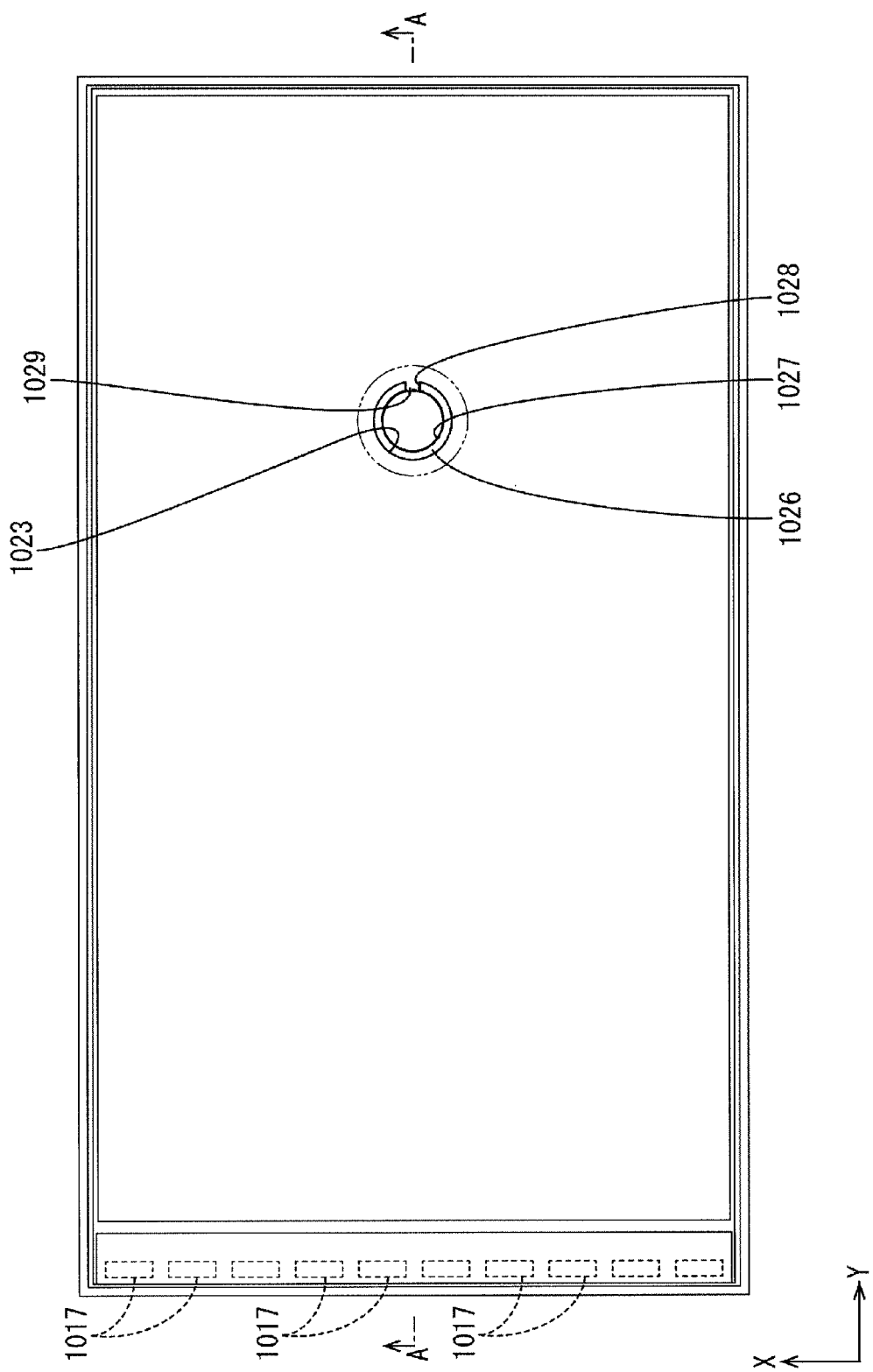
FIG. 33 is a plan view of a backlight device according to an eleventh embodiment of the present technology.
Figure 34:
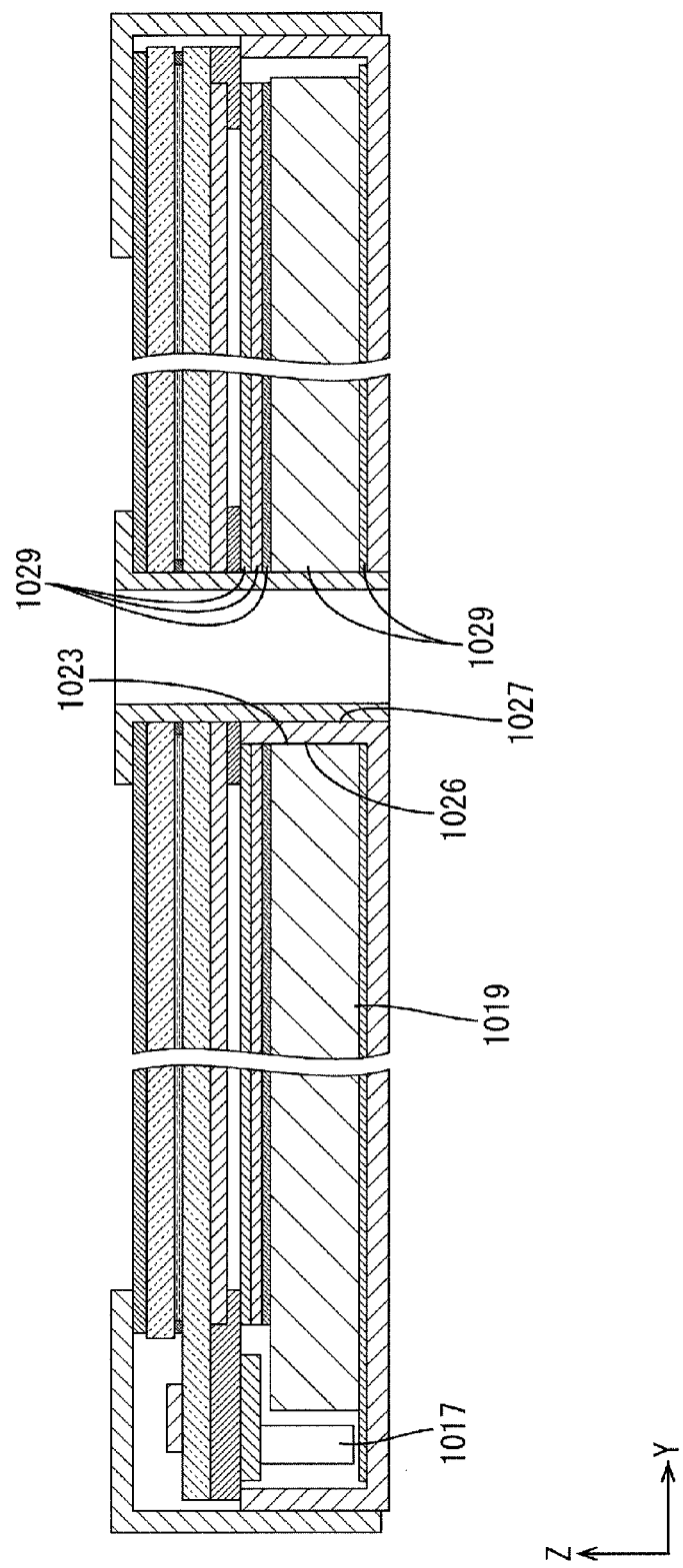
FIG. 34 is a cross-sectional view taken along line A-A in FIG. 33.

As illustrated in FIGS. 33 and 34, the restricting member-side recessed portion 1028 and the optical member-side projection portion 1029 are included in a restricting member 1026 and a through hole 1023, respectively, on a side opposite to an LED 1017 side with respect to the Y-axis direction. According to such a configuration, the restricting member-side recessed portion 1028 is not arranged opposite the LEDs 1017. Therefore, light traveling within a light guide plate 1019 is less likely to transmit through the restricting member-side recessed portion 1028 and leak toward a communication hole 1027 of a restricting member 1026.

Twelfth Embodiment

A twelfth embodiment of the present technology will be described with reference to FIGS. 35 and 36. According to the twelfth embodiment, a restricting member 1126 has a shape different from that of the eighth embodiment. Similar configurations, operations, and effects to the eighth embodiment will not be described.

Figure 35:
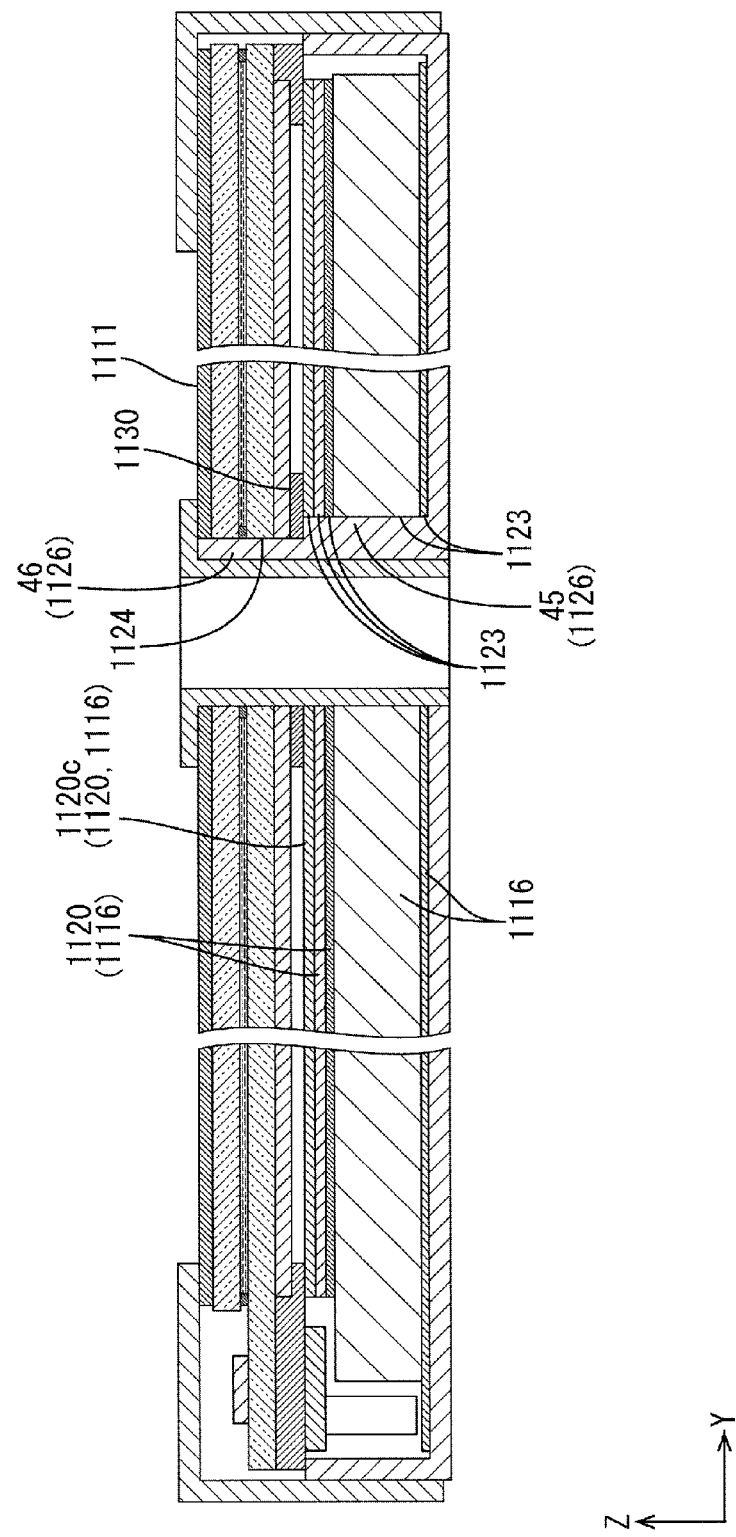
FIG. 35 is a cross-sectional view of a liquid crystal display device according to a twelfth embodiment of the present technology taken along a long-side direction thereof.
Figure 36:
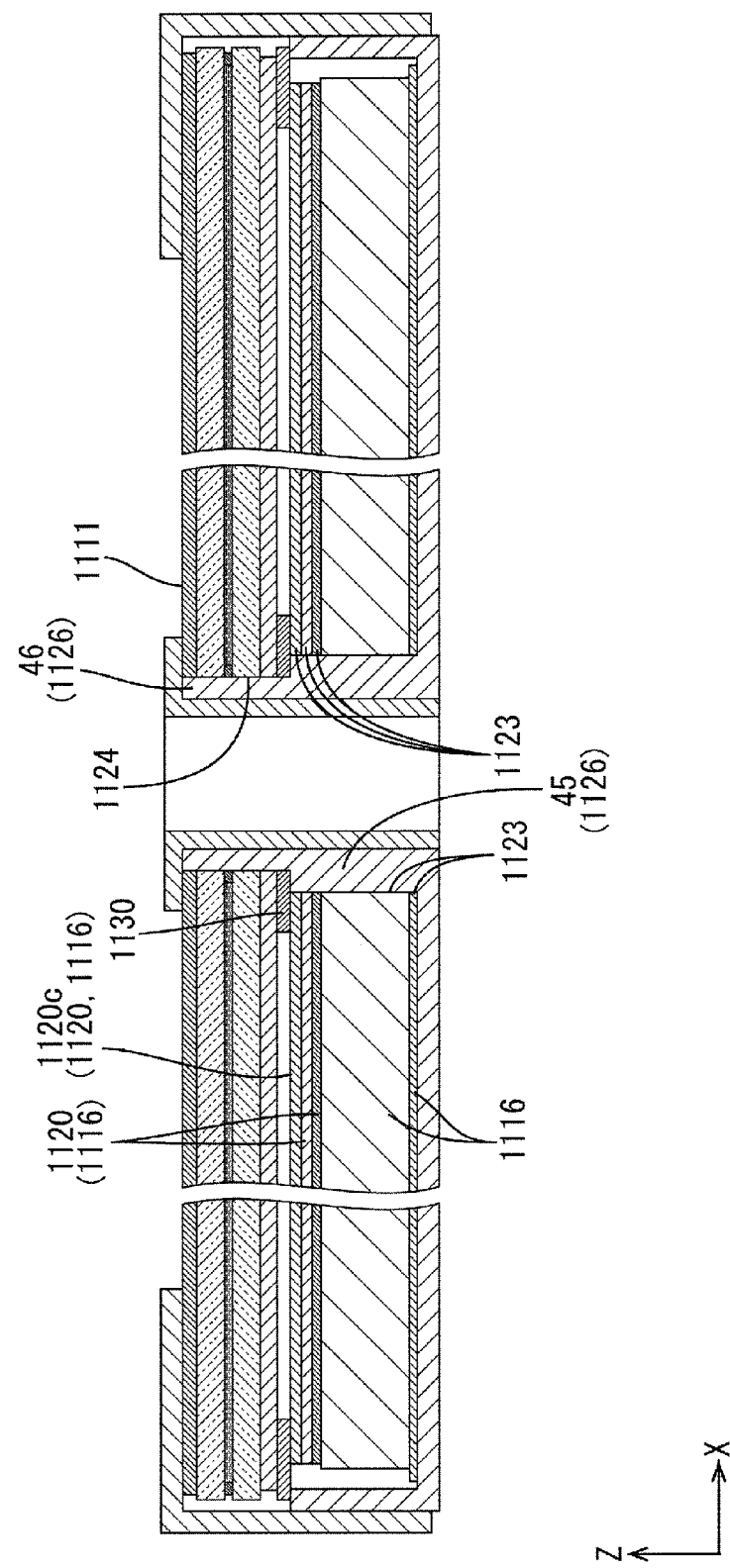
FIG. 36 is a cross-sectional view of the liquid crystal display device taken along a short-side direction thereof.

As illustrated in FIGS. 35 and 36, the restricting member 1126 of the present embodiment is configured to have two different diameter dimensions. Specifically, the restricting member 1126 includes a large diameter portion 45 and a small diameter portion 46. The large diameter portion 45 has a relatively large outer diameter dimension and is inserted in a through hole 1123 of an optical member 1116. The small diameter portion 46 has a relatively small outer diameter dimension and is inserted in a panel-side through hole 1124 of a liquid crystal panel 1111. Accordingly, the through hole 1123 of the optical member 1116 has a diameter dimension that is slightly smaller than the outer diameter dimension of the large diameter portion 45 and greater than the diameter dimension of the panel-side through hole 1124 of the liquid crystal panel 1111. The large diameter portion 45 has a front-side surface that is on a same plane as a plate surface of a second prism sheet 1120c that is on a most front-surface side among the optical sheets 1120 and a fixing tape 1130 is fixed to the front-side surface of the large diameter portion 45. Thus, the optical member 1116 is fixed.

Thirteenth Embodiment

A thirteenth embodiment of the present technology will be described with reference to FIG. 37. According to the thirteenth embodiment, the number of through holes 1223 and restricting members 1226 is altered from that of the first embodiment. Similar configurations, operations, and effects to the first embodiment will not be described.

Figure 37:
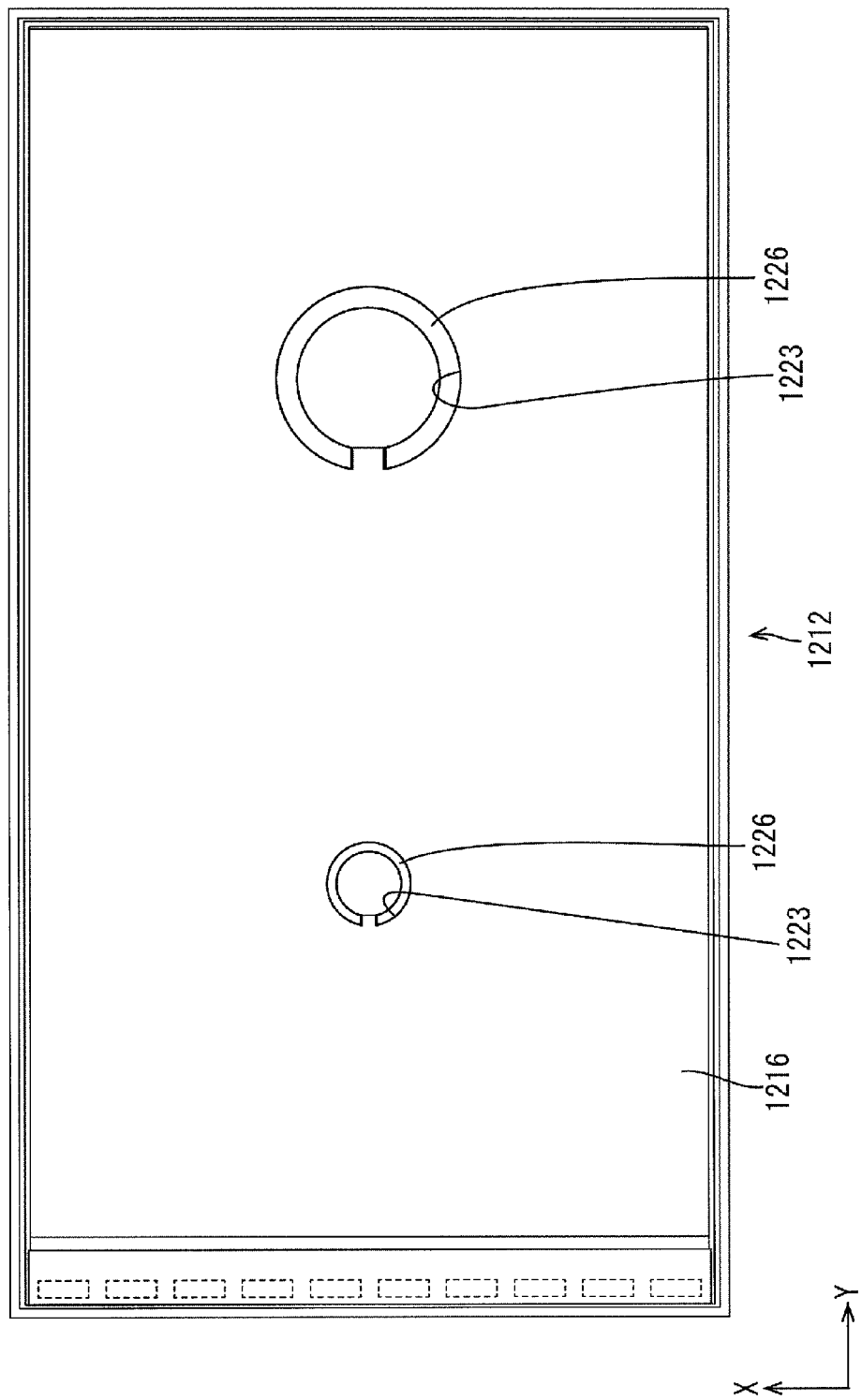
FIG. 37 is a plan view of a backlight device according to a thirteenth embodiment of the present technology.

As illustrated in FIG. 37, a backlight device 1212 of the present embodiment includes two through holes 1223 that are through an optical member 1216 and two restricting members 1226 that are inserted in the respective through holes 1223. The two through holes 1223 are arranged in different positions with respect to the Y-axis direction in the optical member 1216 and have different diameter dimensions. Accordingly, the two restricting members 1216 are arranged in different positions with respect to the Y-axis direction and have different diameter dimensions.

Fourteenth Embodiment

A fourteenth embodiment of the present technology will be described with reference to FIGS. 38 and 39. According to the fourteenth embodiment, a convex-concave configuration of an optical member 1316 for anti-rotation is inverted from that of the first embodiment. Similar configurations, operations, and effects to the first embodiment will not be described.

Figure 38:
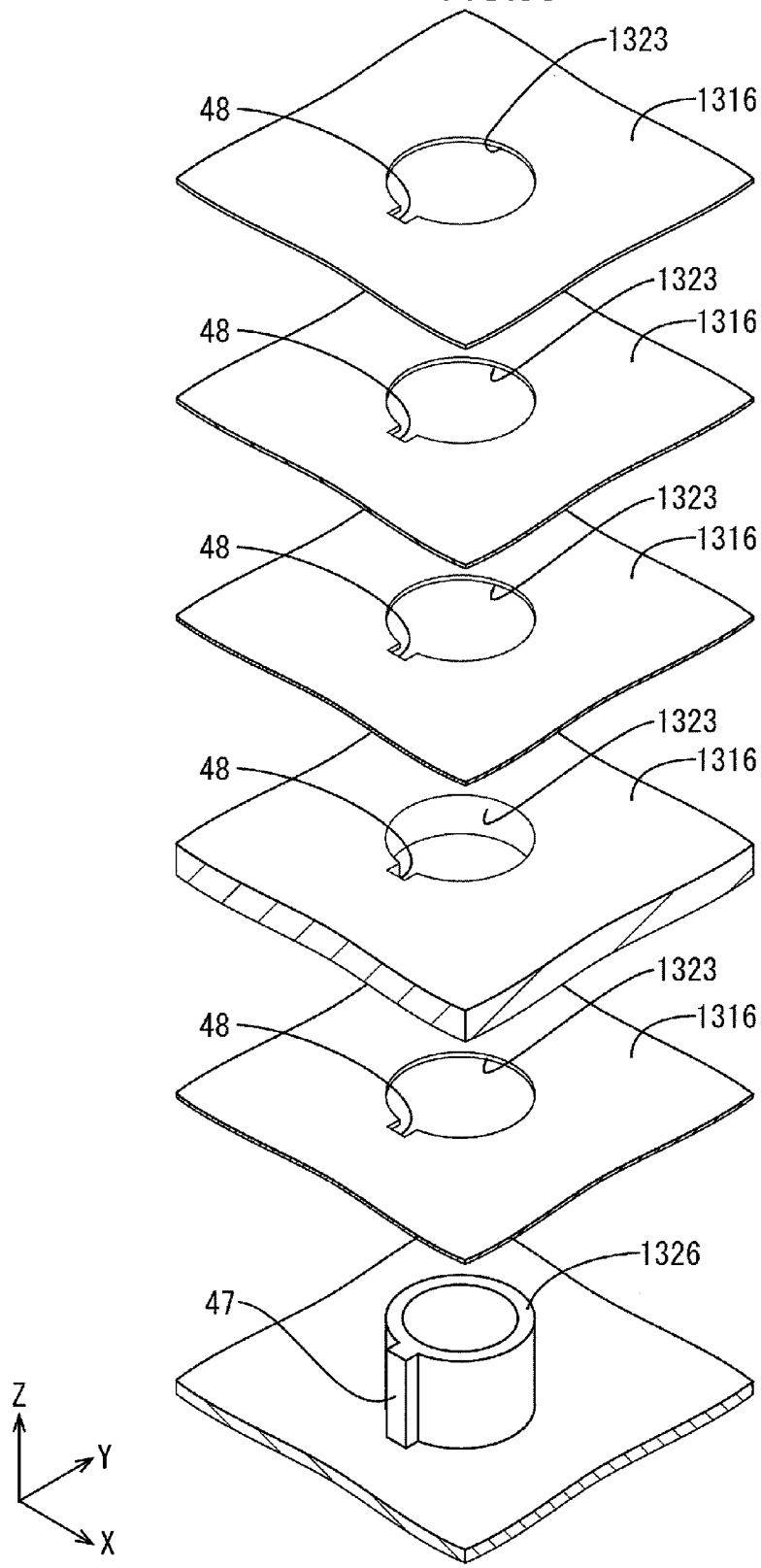
FIG. 38 is an exploded perspective view of an optical member and a restricting member according to a fourteenth embodiment of the present technology.

As illustrated in FIGS. 38 and 39, a restricting member 1326 includes a restricting member-side projection portion 47 that projects from a part of an outer peripheral surface of the restricting member 1326 with respect to the circumferential direction. An optical member 1316 includes an optical member-side recessed portion 48 that is recessed from a part of an inner peripheral surface of a through hole 1323 with respect to the circumferential direction. Specifically, the restricting member-side projection portion 47 has a substantially rectangular plan view shape and has a square pole shape having a height dimension same as that of the restricting member 1326. Namely, the restricting member-side projection portion 47 projects from the restricting member 1326 and extends over an entire height of the restricting member 1326. The optical member-side recessed portion 48 has a substantially rectangular plan view shape and is formed by cutting off a part of a hole edge portion around the through hole 1323 with respect to the circumferential direction. The optical member-side recessed portion 48 is fit to the restricting member-side projection portion 47 when the restricting member 1326 is inserted in the through hole 1323 of the optical member 1316. Accordingly, the optical member 1316 is restricted from rotating by the restricting member 1326 and is positioned with respect to the circumferential direction of the through hole and the restricting member 1326.

According to the present embodiment, as described before, the optical member 1316 includes the optical member-side recessed portion 48 that is recessed from a part of the inner peripheral surface of the through hole 1323 with respect to the circumferential direction. The restricting member 1326 includes the restricting member-side projection portion 47 that projects from a part of the outer peripheral surface of the restricting member 1326 with respect to the circumferential direction and the restricting member-side projection portion 47 is fit in the optical member-side recessed portion 48. According to such a configuration, if the restricting member 1326 is inserted in the through hole 1323 of the optical member 1316, the restricting member-side projection portion 47 that projects from a part of the outer peripheral surface of the restricting member 1326 with respect to the circumferential direction is fit in the optical member-side recessed portion 48 that is recessed from a part of the inner peripheral surface of the through hole 1323 with respect to the circumferential direction. Accordingly, the optical member 1316 is restricted from rotating by the restricting member 1326 and is positioned with respect to the circumferential direction of the through hole 1323.

The optical members 1316 are overlapped with each other and the optical member-side recessed portions 48 of the respective optical members 1316 are in a same planar arrangement. The restricting member-side projection portion 47 of the restricting member 1326 is commonly fit in the optical member-side recessed portions 48 having the same planar arrangement. According to such a configuration, the restricting member-side projection portion 47 is commonly fit in the optical member-side recessed portions 48 having the same planar arrangement. Therefore, a configuration of the restricting member 1326 is less likely to be complicated, and the restricting member 1326 is easily manufactured.

Fifteenth Embodiment

A fifteenth embodiment of the present technology will be described with reference to FIG. 40. According to the fifteenth embodiment, a panel-side through hole 1424 is formed in a liquid crystal panel 1411 and a forming area of the panel-side through hole 1424 is altered from that of the first embodiment. Similar configurations, operations, and effects to the first embodiment will not be described.

Figure 40:
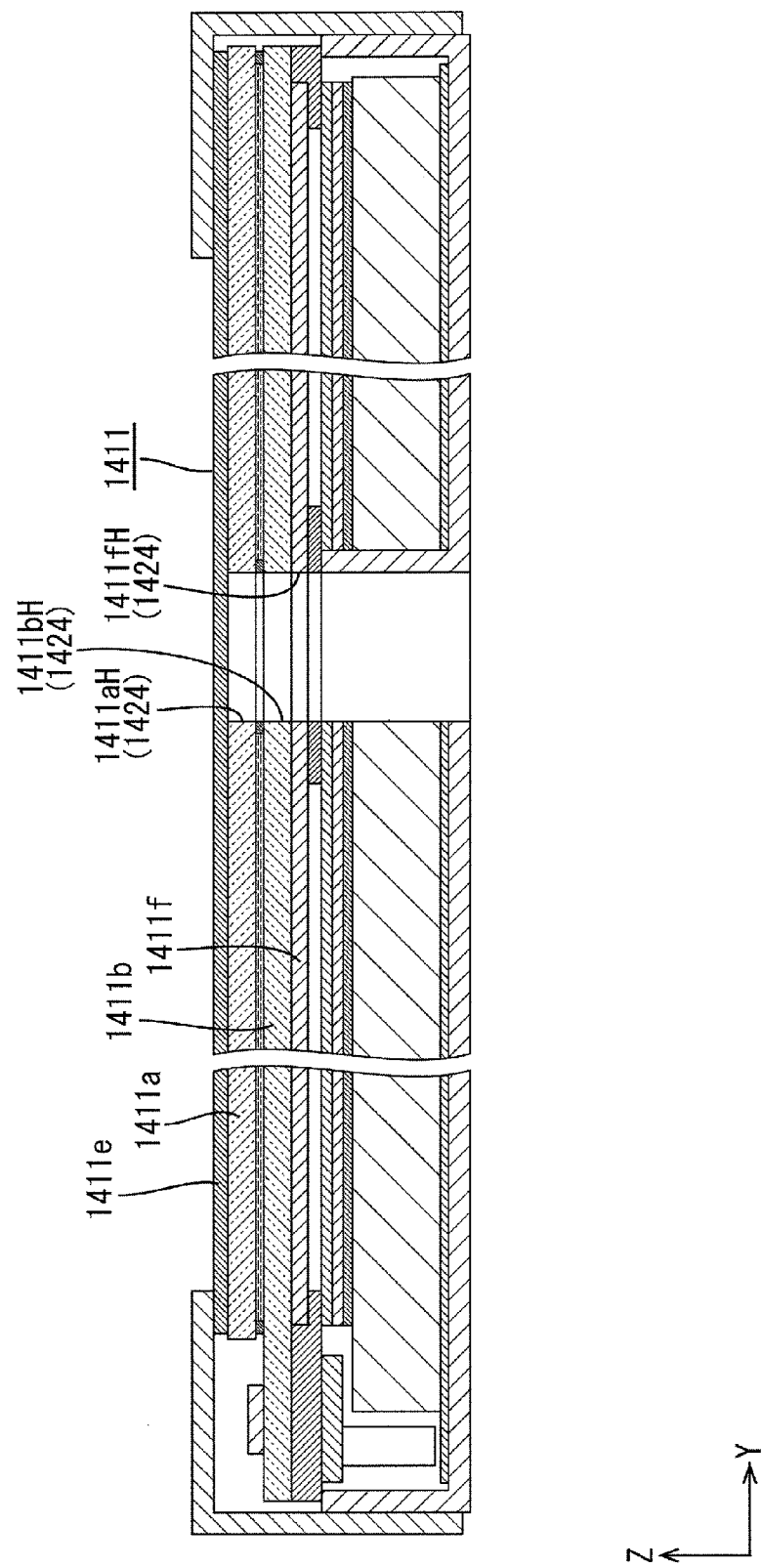
FIG. 40 is a cross-sectional view of a liquid crystal display device according to a fifteenth embodiment of the present technology taken along a long-side direction thereof.

As illustrated in FIG. 40, the liquid crystal panel 1411 of the present embodiment includes a pair of substrates 1411a, 1411b and a polarizing plate 1411f on a rear-surface side. The substrates 1411a, 1411b and the polarizing plate 1411f selectively include a panel-side through hole 1424. Namely, the panel-side through hole 1424 is not formed in a polarizing plate 1411e on a front-surface side. The panel-side through hole 1424 includes substrate-side through holes 1411aH, 1411bH through the substrates 1411a, 1411b and a polarizing plate-side through hole 1411fH through the polarizing plate 1411f on the rear-surface side that are communicated with each other.

Sixteenth Embodiment

A sixteenth embodiment of the present technology will be described with reference to FIG. 41. According to the sixteenth embodiment, a panel-side through hole 1524 is formed in a liquid crystal panel 1511 and a forming area of the panel-side through hole 1524 is altered from that of the first embodiment. Similar configurations, operations, and effects to the first embodiment will not be described.

Figure 41:
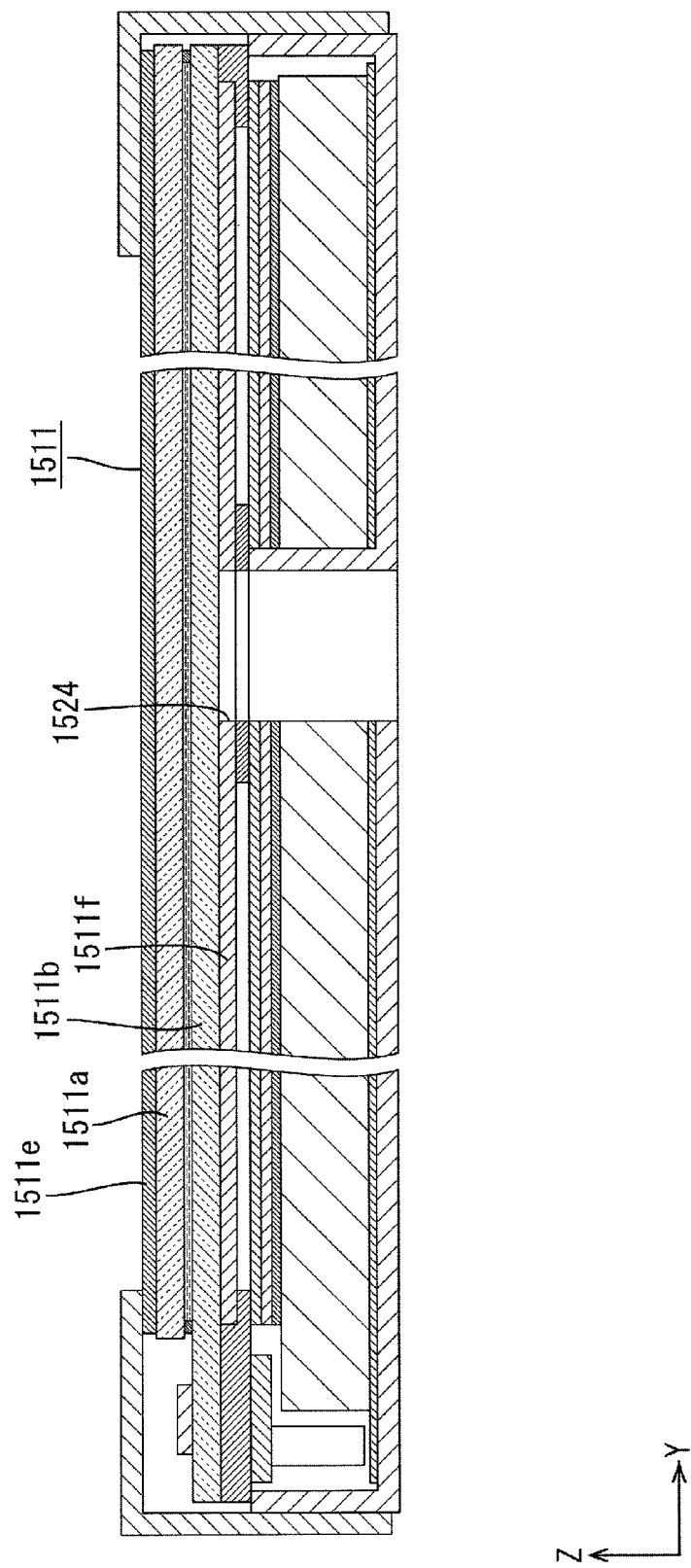
FIG. 41 is a cross-sectional view of a liquid crystal display device according to a sixteenth embodiment of the present technology taken along a long-side direction thereof.

As illustrated in FIG. 41, in the liquid crystal panel 1511 of the present embodiment, a panel-side through hole 1524 is selectively formed only in a polarizing plate 1511f on a rear-surface side. Namely, the panel-side through hole 1524 is not formed in a pair of substrates 1511a, 1511b and a polarizing plate 1511e on a front-surface side. The liquid crystal panel 1511 does not include the panel-side through hole in the substrates 1511a, 1511b and does not include a through hole-side sealing member. Therefore, a manufacturing cost is reduced.

Seventeenth Embodiment

A seventeenth embodiment of the present technology will be described with reference to FIG. 42. According to the seventeenth embodiment, unlike the first embodiment, a panel-side through hole is not formed in a liquid crystal panel 1611. Similar configurations, operations, and effects to the first embodiment will not be described.

Figure 42:
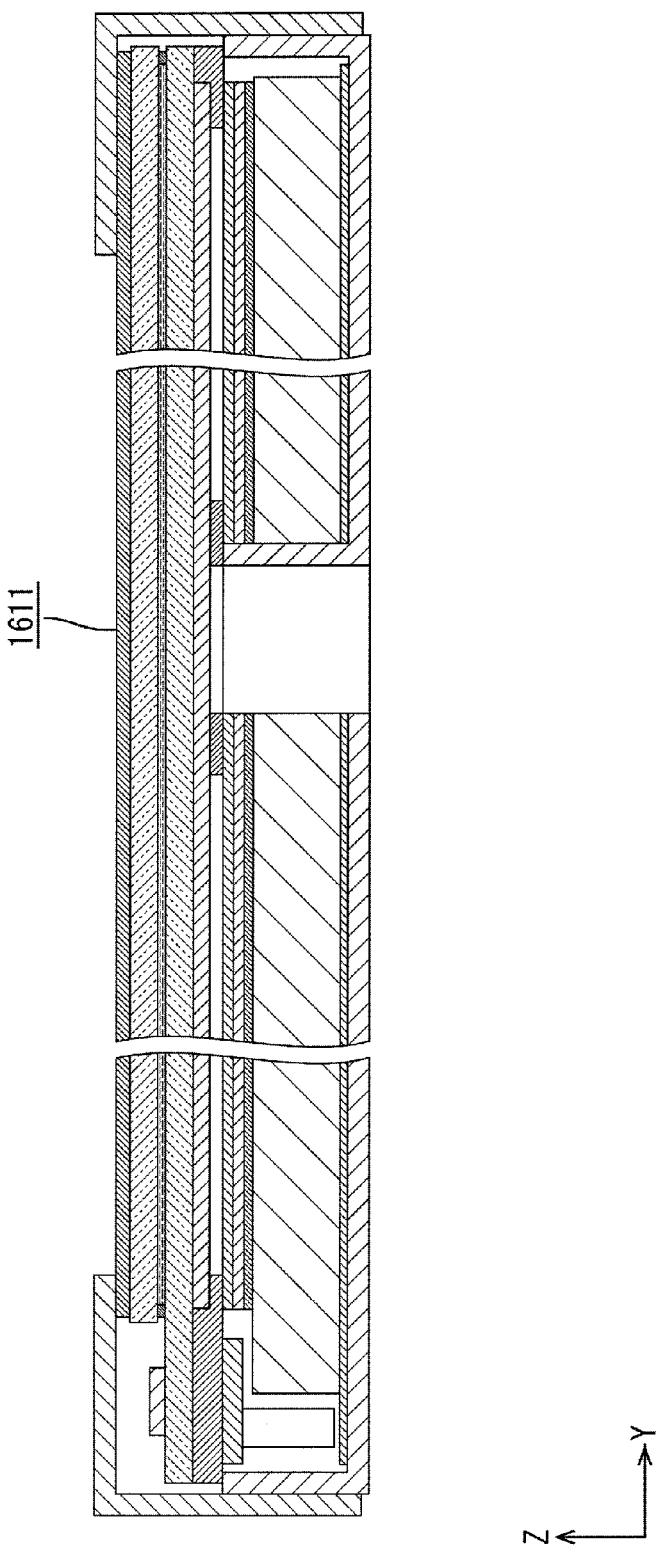
FIG. 42 is a cross-sectional view of a liquid crystal display device according to a seventeenth embodiment of the present technology taken along a long-side direction thereof.

As illustrated in FIG. 42, the liquid crystal panel 1611 of the present embodiment does not include the panel-side through hole of the first embodiment.

Other Embodiments

The present invention is not limited to the embodiment described above with reference to the drawings and the following embodiments may be included in the technical filed of the present technology.

Figure 43:
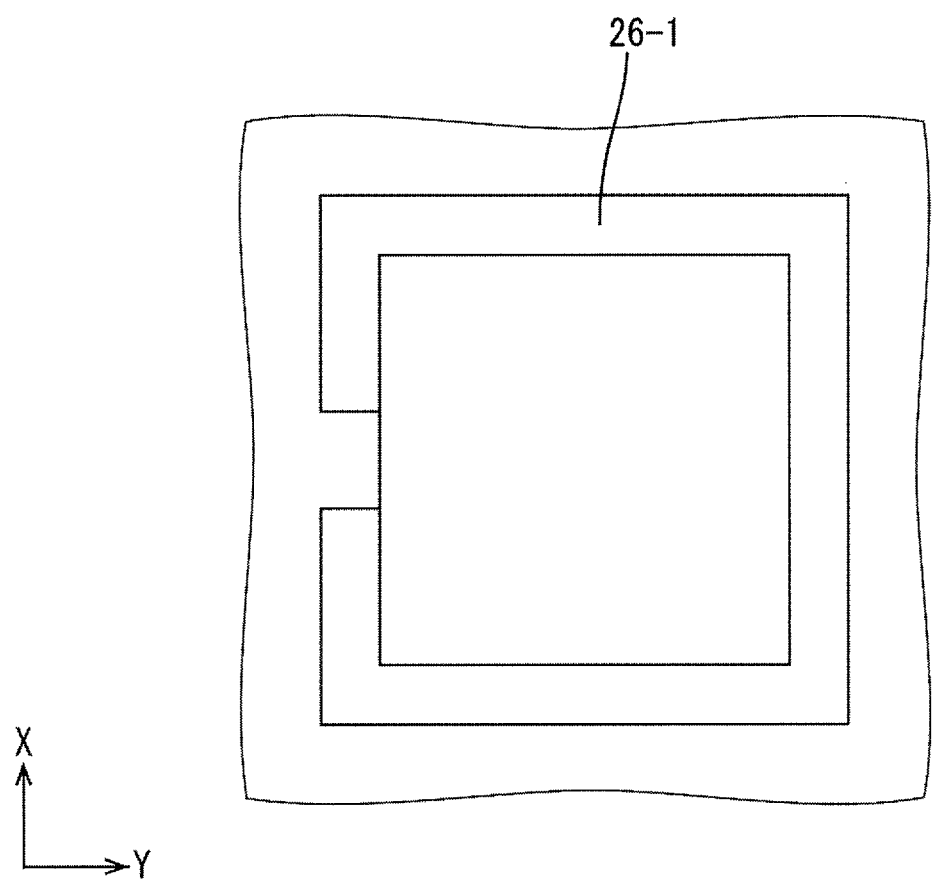
FIG. 43 is a plan view illustrating a planar configuration of a vicinity of a restricting member according to another embodiment (1) of the present technology.

(1) Other than each of the above embodiments, a planar shape of the restricting member may be altered, if necessary. For example, as illustrated in FIG. 43, a restricting member 26-1 may have a square planar shape.

Figure 44:
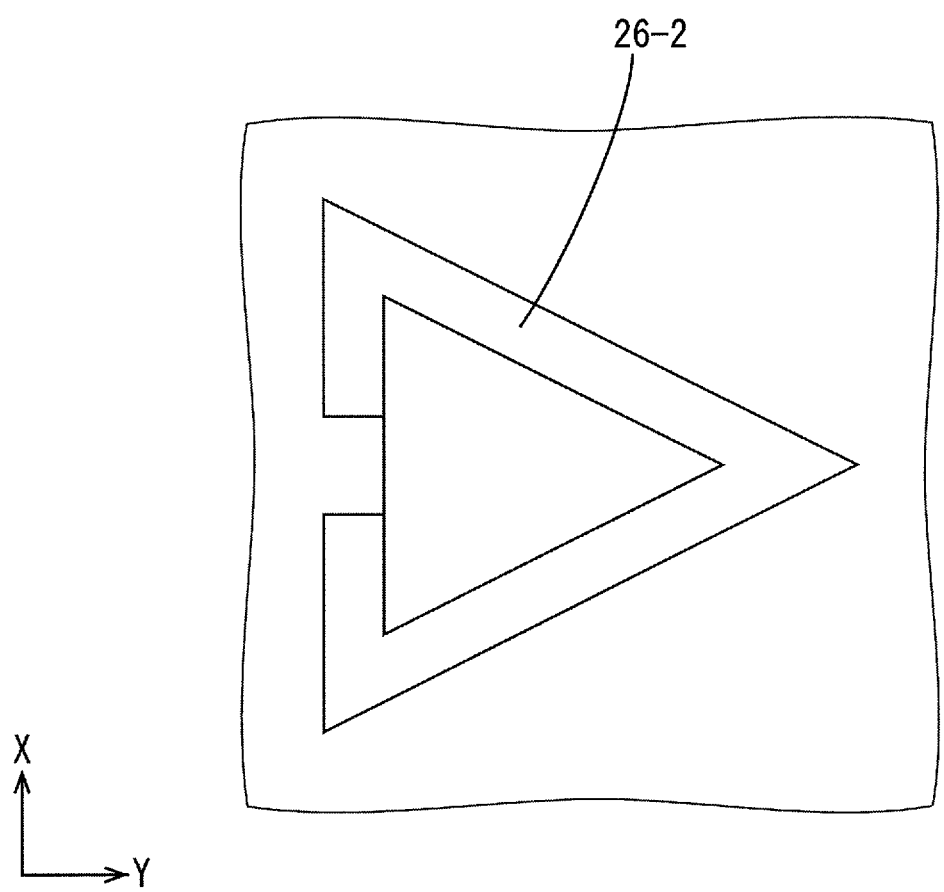
FIG. 44 is a plan view illustrating a planar configuration of a vicinity of a restricting member according to another embodiment (2) of the present technology.

(2) Other than the embodiment (1), for example, as illustrated in FIG. 44, a restricting member 26-2 may has a triangular planar shape. Further, a planar shape of a restricting member may be a trapezoidal shape, a parallelogram, a diamond shape, an ellipse, a semicircular shape, an oval shape, a semi-elliptical shape, a polygonal shape such as a pentagon or other polygonal shapes.

Figure 45:
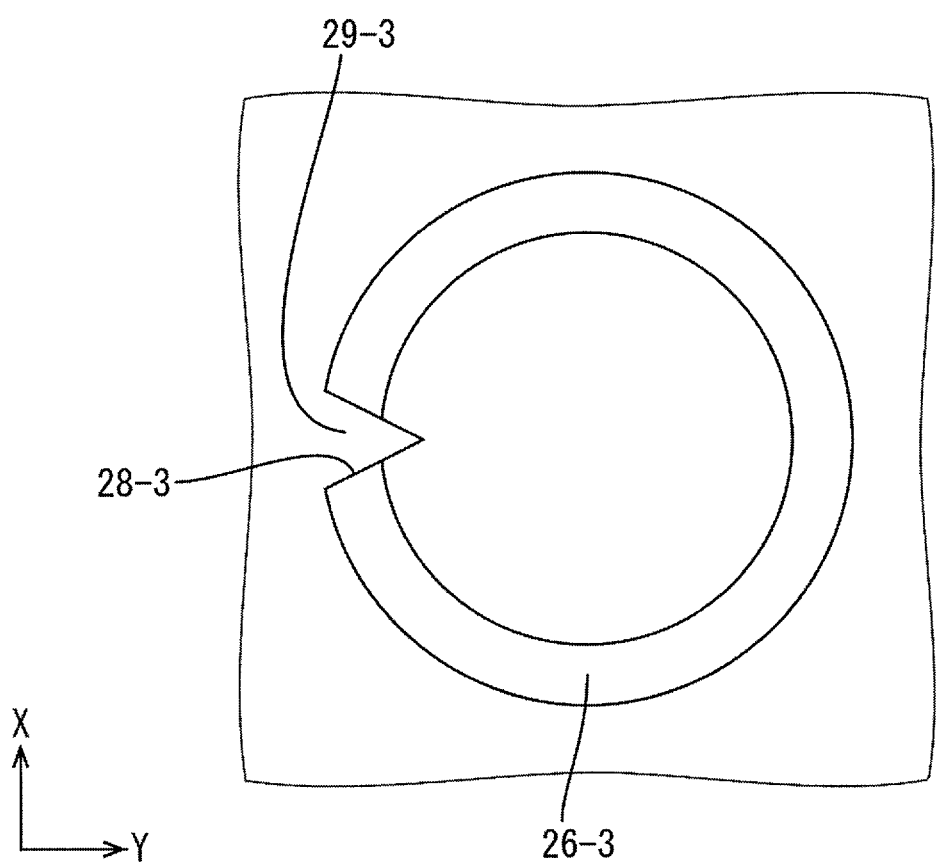
FIG. 45 is a plan view illustrating a planar configuration of a vicinity of a restricting member according to another embodiment (3) of the present technology.

(3) Other than each of the above embodiments, a planar shape of the optical member-side projection portion may be altered. For example, as illustrated in FIG. 45, an optical member-side projection portion 29-3 may have a triangular planar shape. Accordingly, a restricting member-side recessed portion 28-3 of a restriction member 26-3 may have sloped side edges.

Figure 46:
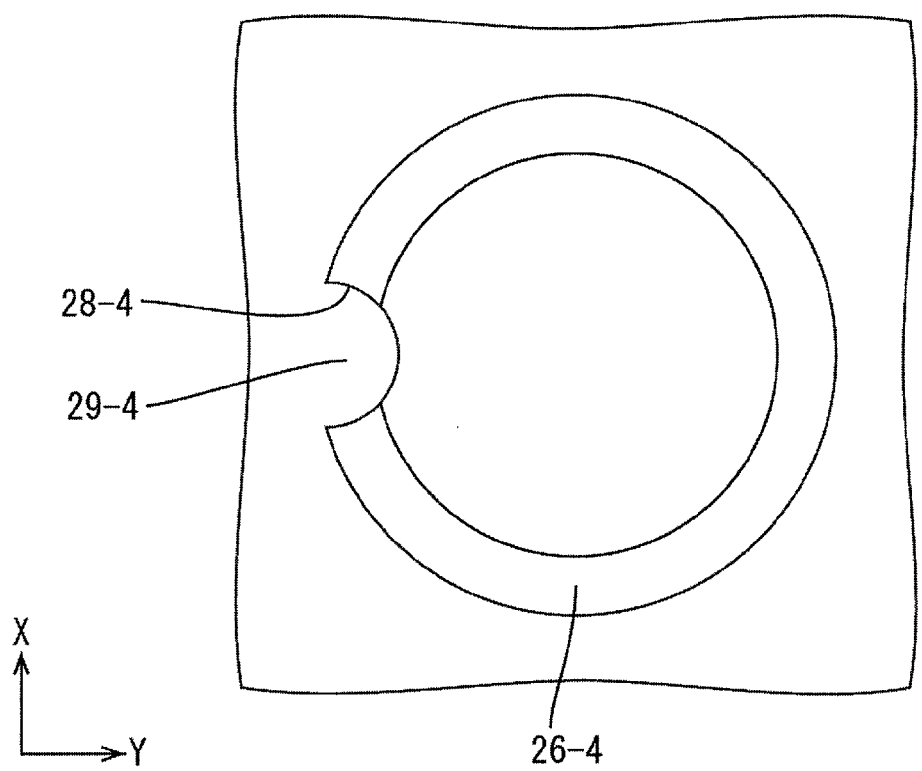
FIG. 46 is a plan view illustrating a planar configuration of a vicinity of a restricting member according to another embodiment (4) of the present technology.

(4) Other than the embodiment (3), for example, as illustrated in FIG. 46, an optical member-side projection portion 29-4 may have a semicircular planar shape. Accordingly, a restricting member-side recessed portion 28-4 of a restriction member 26-4 may have an arched side edge.

Figure 47:
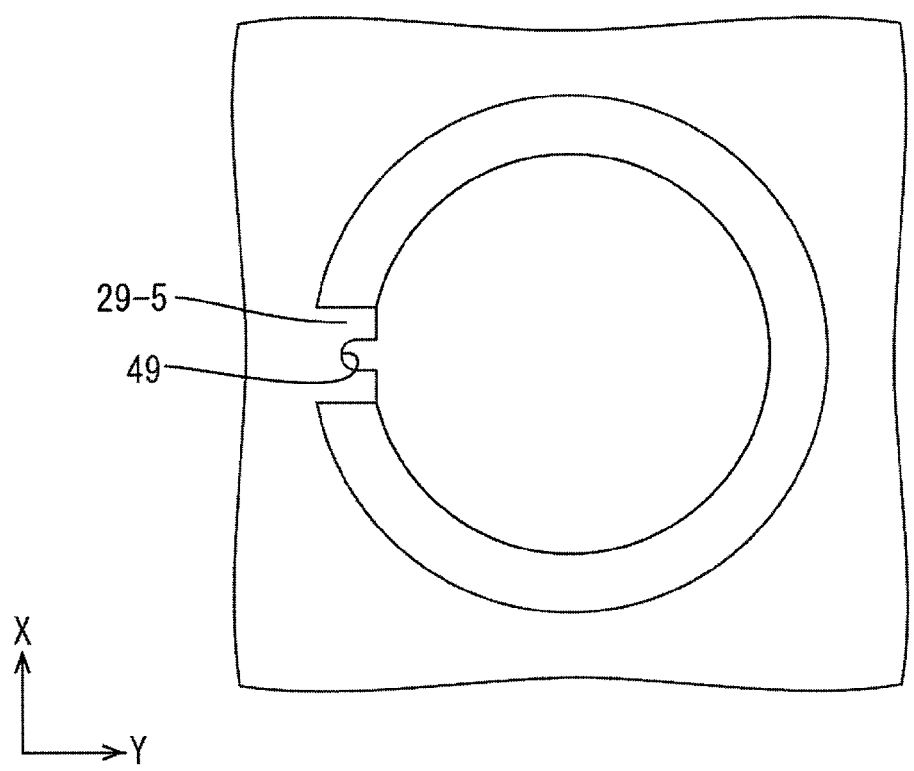
FIG. 47 is a plan view illustrating a planar configuration of a vicinity of a restricting member according to another embodiment (5) of the present technology.

(5) Other than the embodiments (3) and (4), for example, as illustrated in FIG. 47, an optical member-side projection portion 29-5 may have a square planar shape with a semicircular recessed portion 49 at an edge thereof.

Figure 48:
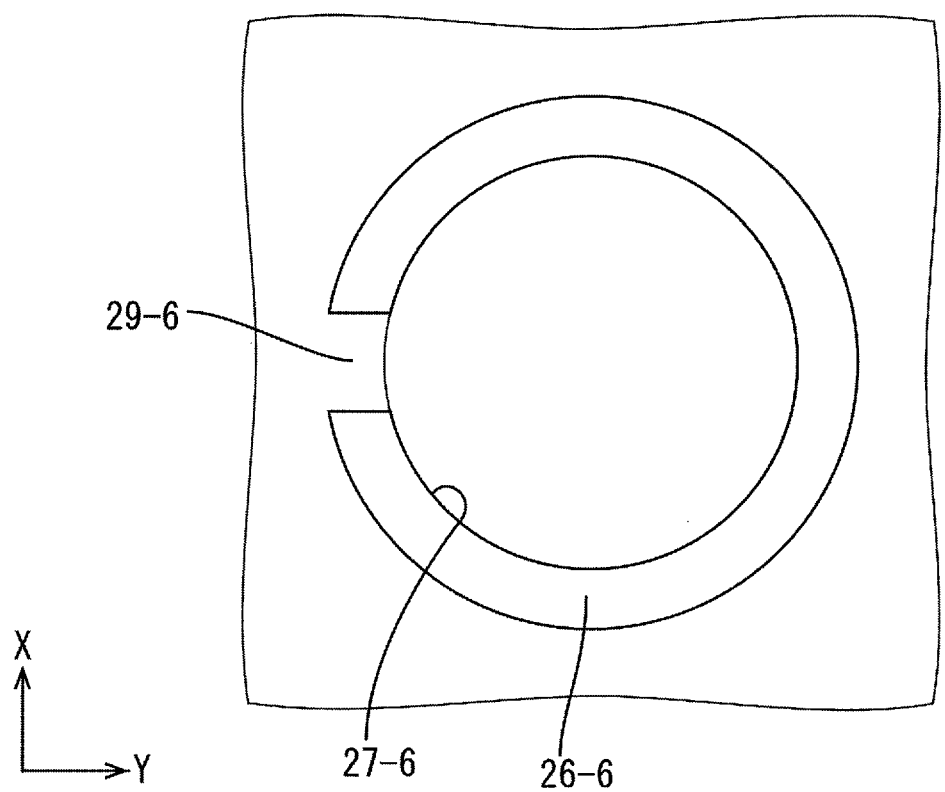
FIG. 48 is a plan view illustrating a planar configuration of a vicinity of a restricting member according to another embodiment (6) of the present technology.

(6) Other than the embodiments (3) to (5), for example, as illustrated in FIG. 48, an optical member-side projection portion 29-6 may have a fan-like planar shape with a distal end surface extending along a peripheral surface of a communication hole 27-6 of a restricting member 26-6.

(7) In each of the above embodiments, each of the optical sheets, the light guide plate, and the reflection sheet has the through hole. For example, a through hole may not be formed in the optical sheets or may not be formed in a part of the optical sheets (for example, the second prism sheet on a front-surface side).

(8) In each of the above embodiments, the restricting member is inserted in the through hole from a rear-surface side. The restricting member may be inserted in the through hole from a front-surface side. Specifically, each of the embodiments (except for the seventh embodiment) may not include the restriction member of the chassis and the cap member that is inserted in the through hole of the optical member may be used as a restricting member.

(9) Other than each of the above embodiments, the number, the planar arrangement, or the planar shape of the restricting member-side recessed portions (the restricting member-side projection portions) and the optical member-side projection portions (the optical member-side recessed portions) may be altered if necessary.

(10) Other than each of the embodiments, the number, a kind, or a layered order of the optical sheets may be altered if necessary. For example, the number of the optical sheets may be two or less or four or more. The optical sheet may include only one prism sheet or three or more prism sheets. The optical sheet may include two or more diffuser sheets. A reflection type polarizing sheet may be used as the optical sheet.

(11) Each of the above embodiments includes the cap member inserted in the panel-side through hole. The cap member may not be included. In such a configuration, a ring-shaped light blocking tape may be attached to a hole edge portion around a panel-side through hole of a liquid crystal panel from a front-surface side. Thus, light may be blocked by the hole edge portion around the panel-side through hole.

(12) In the third embodiment, the positioning hole is included only in the optical sheet. In a configuration that the light guide plate and the reflection sheet include the optical member-side projection portion, a positioning hole may be formed in the optical sheet, the light guide plate, and the reflection sheet. The number, a planar arrangement, or a planar shape of the positioning pin and the positioning hole may be altered.

(13) Other than the sixth embodiment, the number, a planar arrangement, a planar shape, or a cross-sectional shape of the stopper portion may be altered if necessary.

(14) In each of the above embodiments, the number of the through holes and the restricting members is one or two. Three or more through holes and restricting members may be provided.

(15) In the thirteenth embodiment, the two through holes and the two restricting members are included and each of the through holes has a different diameter dimension (plan-view size) and each of the restricting members has a different diameter dimension. Through holes may have a same diameter dimension (a plan view size) or restricting members may have a same diameter dimension.

(16) The configuration of the fourteenth embodiment (the restricting member-side projection portion and the optical member-side recessed portions) may be selectively combined with any one of the second to the thirteenth embodiments, and the fifteenth to the seventeenth embodiments.

(17) In each of the above embodiments, one of the short side edge surfaces of the light guide plate is the light entrance surface. A light guide plate including one of long side edge surfaces as a light entrance surface may be included in the present technology. A light guide plate including two short side edge surfaces as light entrance surfaces may be included in the present technology. Further, a light guide plate including two long side edge surfaces as light entrance surfaces may be included in the present technology. A light guide plate including any three of edge surfaces as light entrance surfaces or a light guide plate including all of four edge surfaces as light entrance surfaces may be included in the present technology.

(18) In each of the above embodiments, the LED board is formed of a film substrate. However, an LED board may be formed of a plate having a certain thickness.

(19) In each of the above embodiments, the LEDs are used as the light source. However, organic ELs may be used as the light source.

(20) In each of the above embodiments, the color portions of the color filter included in the liquid crystal panel include three color portions of R, G, and B. However, the color portions may include four color portions or more.

(21) In each of the above embodiments, the liquid crystal display device is mounted in a dashboard of a vehicle. However, the present technology may be applied to a liquid crystal display used in a different device. Specifically, a liquid crystal display device may be arranged on a player's side (a front side) with respect to a rotation reel of a slot machine such that a through hole of an optical member and a panel-side through hole of a liquid crystal panel are fit to the rotation reel. Accordingly, the player can clearly and surely see the rotation reel through the through hole and the panel-side through hole.

(22) Other than each of the above embodiments, the present technology may be applied to liquid crystal display devices including a touch panel, a parallax barrier panel, or cover glass.

(23) In each of the above embodiments, the liquid crystal display device of a transmission type is described. The present technology may be applied to a liquid crystal display device of a semi-transmission type.

(24) In each of the above embodiments, the TFTs are used as the switching components of the liquid crystal display device. However, the technology described herein can be applied to liquid crystal display devices using switching components other than TFTs (e.g., thin film diodes (TFDs)). Furthermore, it can be applied to black-and-white liquid crystal display devices other than the color liquid crystal display device.

(25) In each of the above embodiments, the liquid crystal panel is used as the display panel. However, for example, a MEMS (Micro Electro Mechanical Systems) display panel may be used as the display panel. The MEMS display panel displays images by using light from a backlight device. The MEMS display panel includes micro mechanical shutters that are arranged in a matrix in a plane to configure display pixels. Each of the mechanical shutters is controlled to be open and closed to adjust transmission amount of light from the backlight device for every display pixel. Thus, images of certain gradation are displayed.

(26) In each of the above embodiments, the bezel, the cap member, and the chassis are made of metal. However, any of or all of the bezel, the cap member, and the chassis may be made of synthetic resin.

(27) In each of the above embodiments, the liquid crystal panel includes the pixel electrodes on the array board side and includes the counter electrodes on the CF board side. A liquid crystal panel including pixel electrodes and counter electrodes on an array board side may be used. Such a liquid crystal panel may be preferably a FFS (Fringe Field Switching) mode.

EXPLANATION OF SYMBOLS

10: liquid crystal display device (display device), 11, 511, 711, 1111, 1411, 1511, 1611: liquid crystal panel (display panel), 11a, 1411a, 1511a: CF board (base board), 11b, 1411b, 1511b: array board (base board), 11c: liquid crystals, 11d: outer peripheral side sealing member, 12, 312, 512, 1212: backlight device (lighting device), 13: bezel (outer peripheral side holding member), 15, 115, 415, 515, 615: chassis (support member), 15H, 515H: chassis-side through hole (through hole), 16, 116, 816, 1116, 1216, 1316: optical member, 17, 1017: LED (light source), 19, 119, 319, 519, 619, 1019: light guide plate (optical member), 19a: light entrance surface, 19b, 119b, 319b: light exit surface, 19H, 119H, 619H: light guide plate-side through hole (through hole), 20, 120, 220, 320, 420, 520, 920, 1120: optical sheet (optical member), 20a, 120a, 320a, 420a, 920a: diffuser sheet (optical sheet, optical member), 20b, 120b, 320b, 420b, 920b: first prism sheet (optical sheet, optical member), 20c, 120c, 320c, 420c, 520c, 920c, 1120c: second prism sheet (optical sheet, optical member), 20H, 120H, 220H, 320H, 420H, 520H: optical sheet-side through hole (through hole), 21, 121, 521, 621: reflection sheet (optical member), 21H, 121H: reflection sheet-side through hole (through hole), 23, 123, 223, 323, 423, 523, 623, 823, 1023, 1123, 1223: through hole, 24, 524, 724, 1124, 1424, 1524: panel-side through hole, 25: through hole-side sealing member, 26, 126, 226, 326, 426, 526, 626, 726, 826, 1026, 1126, 1226, 1326, 26-1, 26-2, 26-3, 26-4, 26-6: restricting member, 27, 527, 827, 1027, 27-6: communication hole, 28, 128, 228, 328, 428, 528, 628, 828, 1028, 28-3, 28-4: restricting member-side recessed portion, 29, 129, 229, 329, 429, 629, 829, 929, 1029, 29-3, 29-4, 29-5, 29-6: optical member-side projection portion, 30, 130, 330, 1130: fixing tape (fixing member), 31: cap member (through hole-side holding member), 34: positioning pin, 35: positioning hole, 36: stopper portion (fixing member), 47: restricting member-side projection portion, 48: optical member-side recessed portion, 130*a*: reflection surface, 130*b*: light blocking surface

The invention claimed is:

1. A lighting device comprising:
   a light source;
   an optical member that is a sheet and applies optical effects to light from the light source and has a through hole being through a thickness thereof; and
   a restricting member having a communication hole that is communicated with the through hole, the restricting member being inserted in the through hole to be in contact with an inner surface of the through hole to restrict movement of the optical member along a plate surface of the optical member; wherein
   the optical member includes an optical member-side projection portion that is projected from a part of the inner peripheral surface of the through hole with respect to the circumferential direction,
   the restricting member includes a restricting member-side recessed portion that is recessed from a part of the outer peripheral surface with respect to the circumferential direction and open to be communicated with the communication hole and receives the optical member-side projection portion.

2. The lighting device according to claim 1, wherein the optical member includes;
   a light guide plate having a light entrance surface through which light from the light source enters the light guide plate, and a light exit surface through which the light exits the light guide plate, and
   an optical sheet arranged on the light guide plate to be layered on the light exit surface, and
   the optical member-side projection portion is selectively included on the inner peripheral surface of the through hole in the optical sheet so as not to be included on the inner peripheral surface of the through hole of the light guide plate, and
   the restricting member-side recessed portion is selectively included on a part of the outer peripheral surface of the restricting member opposite the inner peripheral surface of the through hole of the optical sheet.

3. The lighting device according to claim 1, wherein
   the restricting member includes a positioning pin projecting from the restricting member-side recessed portion along a thickness of the optical member, and
   the optical member includes a positioning hole that is through the optical member-side projection portion in a thickness direction thereof and the positioning pin is inserted in the positioning hole.

4. The lighting device according to claim 1, wherein
   the optical member includes optical members that are layered on each other, and
   the optical member-side projection portion is included in each of the optical members such that at least one of a number, a planar shape, and a planar arrangement thereof varies among the optical members.

5. The lighting device according to claim 1, wherein
   the optical member includes optical members layered on each other,
   the optical members include optical member-side projection portions, the optical member-side projection portions having a same planar arrangement are included in the optical members, and the restricting member-side recessed portion included in the restricting member commonly receive the optical member-side projection portions having the same planar arrangement.

6. The lighting device according to claim 1, wherein the optical member-side projection portion includes optical member-side recessed portions or optical member-side projection portions that are asymmetrically arranged with respect to an asymmetric line passing through a center of the through hole.

7. The lighting device according to claim 6, further comprising a fixing member that fixes a hole edge portion around the through hole in the optical member with respect to the restricting member.

8. The lighting device according to claim 7, wherein
   the fixing member is adhered to the hole edge portion around the through hole in the optical member and the restricting member,
   the fixing member has a surface that is adhered to the optical member and the restricting member and is a reflection surface that reflects light, and
   the fixing member has a light blocking surface that is opposite to the reflection surface and blocks light.

9. The lighting device according to claim 7, further comprising a support member that supports the optical member from a side opposite to the light exit side, wherein
   the support member includes the restricting member such that the communication hole is through the support member, and
   the fixing member is a stopper portion included in the restricting member and stopped by a hole edge portion around the through hole in the optical member from a light exit side.

10. A display device comprising:
    the lighting device according to claim 1; and
    a display panel arranged on a light exit side with respect to the lighting device and displaying with using light from the lighting device.

11. The display device according to claim 10, wherein the display panel has a panel-side through hole that is communicated with the through hole and through a thickness thereof.

12. The display device according to claim 11, wherein the display panel includes;
    a pair of substrates each having the panel-side through hole,
    liquid crystals sandwiched between the substrates,
    an outer peripheral side sealing member that surrounds the liquid crystals and is between outer peripheral edge portions of the respective substrates to seal the liquid crystals therebetween, and
    a through hole-side sealing member that surrounds the panel-side through hole and is between hole edge portions around the panel-side through hole to seal the liquid crystals therebetween.

13. The display device according to claim 11, further comprising:
    an outer peripheral side holding member that sandwiches and holds an outer peripheral edge portion of the display panel with the lighting device therebetween; and
    a through hole-side holding member that sandwiches and holds a hole edge portion around the panel-side through hole in the display panel with the lighting device therebetween, wherein the through hole-side holding member has a surface that has a light blocking property.

\* \* \* \* \*